United States Patent
Dhuse et al.

(10) Patent No.: US 11,822,532 B2
(45) Date of Patent: Nov. 21, 2023

(54) PER-SEGMENT SECONDARY INDEXING IN DATABASE SYSTEMS

(71) Applicant: Ocient Holdings LLC, Chicago, IL (US)

(72) Inventors: Greg R. Dhuse, Chicago, IL (US); Daniel Coombs, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 17/211,278

(22) Filed: Mar. 24, 2021

(65) Prior Publication Data

US 2022/0114155 A1  Apr. 14, 2022

Related U.S. Application Data

(60) Provisional application No. 63/091,501, filed on Oct. 14, 2020.

(51) Int. Cl.
*G06F 16/22* (2019.01)
*G06F 16/23* (2019.01)

(52) U.S. Cl.
CPC ........ *G06F 16/2291* (2019.01); *G06F 16/221* (2019.01); *G06F 16/2379* (2019.01)

(58) Field of Classification Search
CPC .............. G06F 16/2291; G06F 16/221; G06F 16/2379; G06F 16/2228; G06F 16/22
See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 7,499,907 B2 | 3/2009 | Brown | |
| 7,908,242 B1 | 3/2011 | Achanta | |
| 9,239,794 B1 * | 1/2016 | Merchant | ............ G06F 12/0862 |
| 2001/0051949 A1 | 12/2001 | Carey | |
| 2002/0032676 A1 | 3/2002 | Reiner | |

(Continued)

OTHER PUBLICATIONS

A new high performance fabric for HPC, Michael Feldman, May 2016, Intersect360 Research.

(Continued)

*Primary Examiner* — Vaishali Shah
*Assistant Examiner* — Lana Alagic
(74) *Attorney, Agent, or Firm* — GARLICK & MARKISON; Katherine C. Stuckman; Bruce E. Stuckman

(57) ABSTRACT

A database system operates by: receiving a user-generated secondary indexing hint data for a dataset from a client device, wherein the client device generated the user-generated hint data based on user input in response to at least one prompt displayed by an interactive interface displayed via a display device of the client device; generating a plurality of segments that each include distinct subsets of a plurality of rows of a dataset; automatically selecting, for each of the plurality of segments, a secondary indexing scheme from a plurality of secondary indexing options based on the user-provided secondary indexing hint data; generating a plurality of secondary indexes for each of the plurality of segments in accordance with the corresponding secondary indexing scheme; and storing the plurality of segments and the plurality of secondary indexes in memory.

20 Claims, 42 Drawing Sheets

(56) References Cited

U.S. PATENT DOCUMENTS

| | | | |
|---|---|---|---|
| 2003/0093408 A1* | 5/2003 | Brown | G06F 16/2272 |
| 2004/0162853 A1 | 8/2004 | Brodersen | |
| 2008/0133456 A1 | 6/2008 | Richards | |
| 2008/0288524 A1* | 11/2008 | Dumitru | G06F 16/2272 707/999.005 |
| 2009/0063396 A1* | 3/2009 | Gangarapu | G06F 16/2228 |
| 2009/0063893 A1 | 3/2009 | Bagepalli | |
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219169 A1 | 9/2011 | Zhang | |
| 2012/0109888 A1 | 5/2012 | Zhang | |
| 2012/0151118 A1 | 6/2012 | Flynn | |
| 2012/0185866 A1 | 7/2012 | Couvee | |
| 2012/0254252 A1 | 10/2012 | Jin | |
| 2012/0311246 A1 | 12/2012 | McWilliams | |
| 2013/0332484 A1 | 12/2013 | Gajic | |
| 2014/0047095 A1 | 2/2014 | Breternitz | |
| 2014/0136510 A1 | 5/2014 | Parkkinen | |
| 2014/0188841 A1 | 7/2014 | Sun | |
| 2015/0205607 A1 | 7/2015 | Lindholm | |
| 2015/0244804 A1 | 8/2015 | Warfield | |
| 2015/0248366 A1 | 9/2015 | Bergsten | |
| 2015/0293966 A1 | 10/2015 | Cai | |
| 2015/0310045 A1 | 10/2015 | Konik | |
| 2016/0034547 A1 | 2/2016 | Lerios | |
| 2017/0132286 A1* | 5/2017 | Baranczyk | G06F 16/24544 |
| 2018/0203874 A1* | 7/2018 | Gkoufas | G06F 16/148 |
| 2018/0285399 A1* | 10/2018 | Altizer | G06F 16/2458 |
| 2021/0089537 A1* | 3/2021 | Hanson | G06F 16/221 |
| 2021/0209103 A1* | 7/2021 | Li | G06F 16/24532 |

OTHER PUBLICATIONS

Alechina, N. (2006-2007) B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

\* cited by examiner database system 10 computing device 18 computing device 18 computing device 18 node 37 node 37 node 37

FIG. 18 data for segment 1 (raw segment)

primary organization column (e.g., time stamp)

selected key column (e.g., engine on or off)

| | | | |
|---|---|---|---|
| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a |

FIG. 19 divide segment by columns into data slabs

| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a | data slab

FIG. 20 sort data slabs based on key column(s)

| 1 | a | on | 101 | a2c |
| 4 | d | on | 074 | c4l |
| 5 | e | on | 364 | b5e |
| 7 | g | on | 015 | e8f |
| 2 | b | off | 112 | a1k |
| 3 | c | off | 211 | d5s |
| 6 | f | off | 489 | c4q |
| 8 | h | off | 611 | a1a | sorted data slab segment generator module 2506 segment indexing module 2510

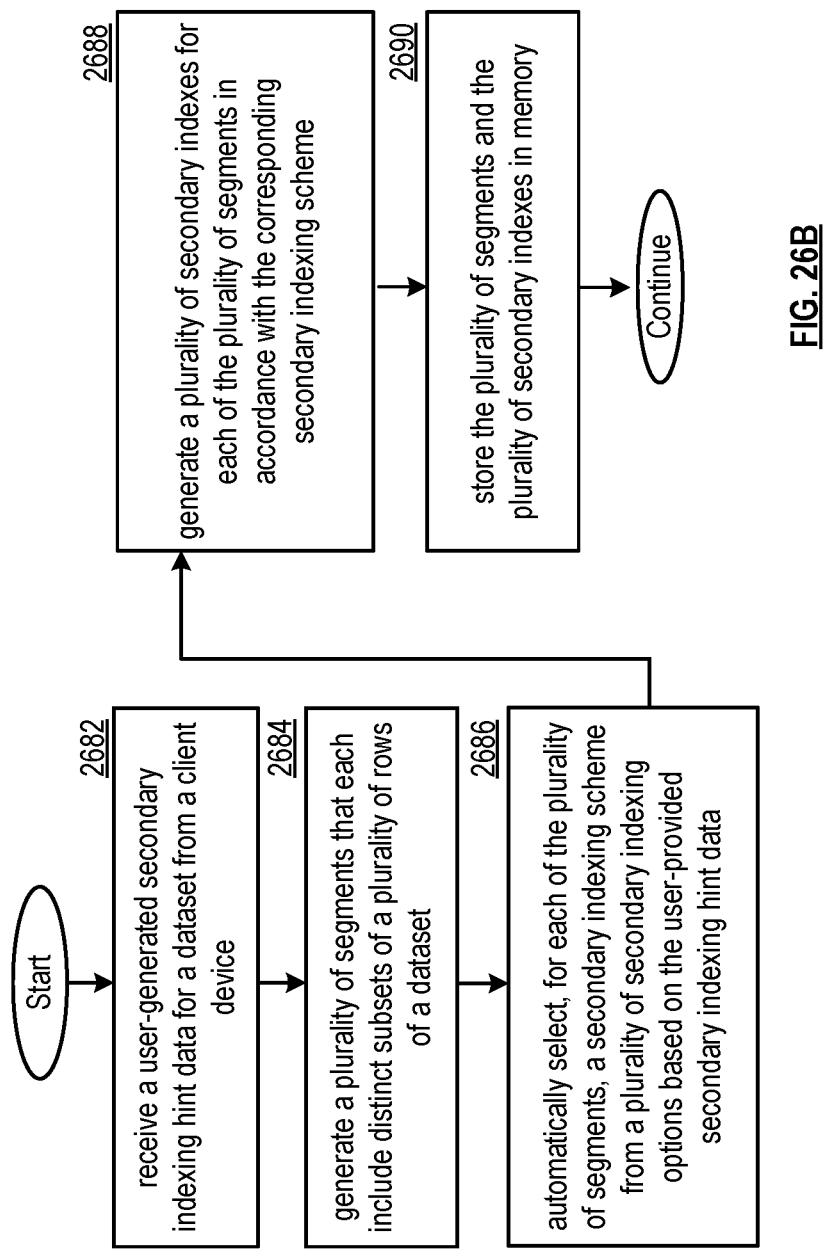

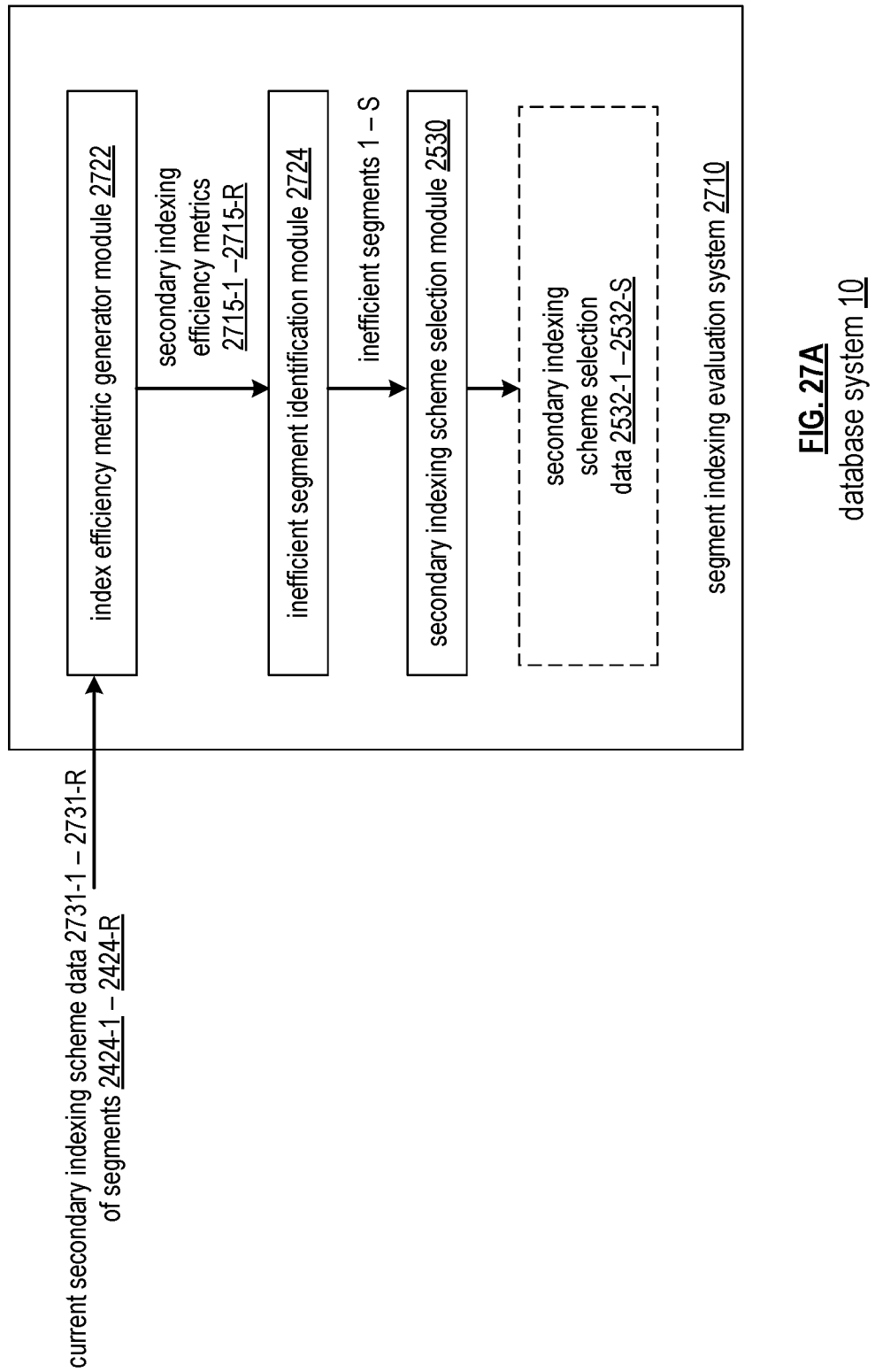

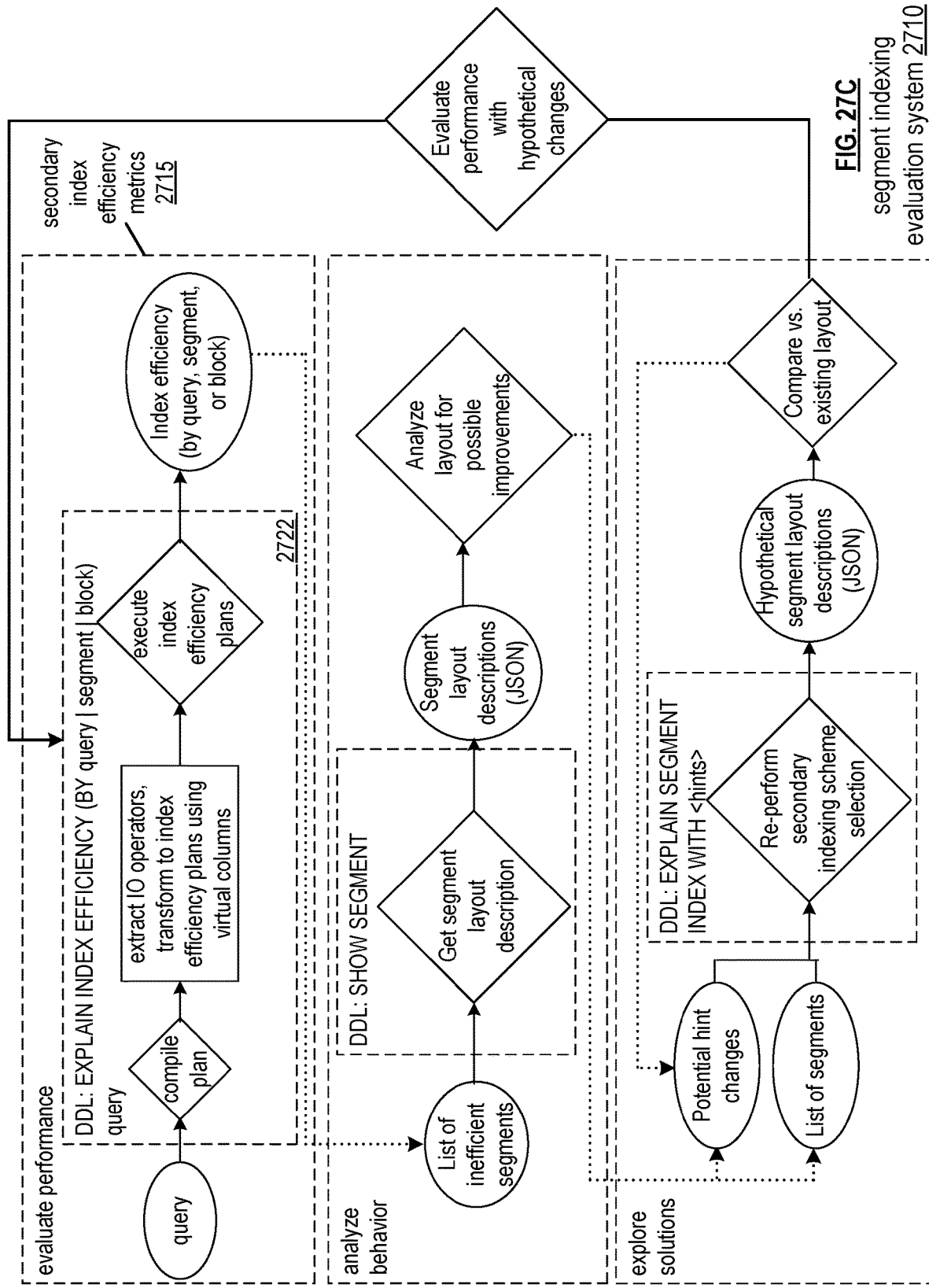
FIG. 27C segment indexing evaluation system 2710 query execution module 2504

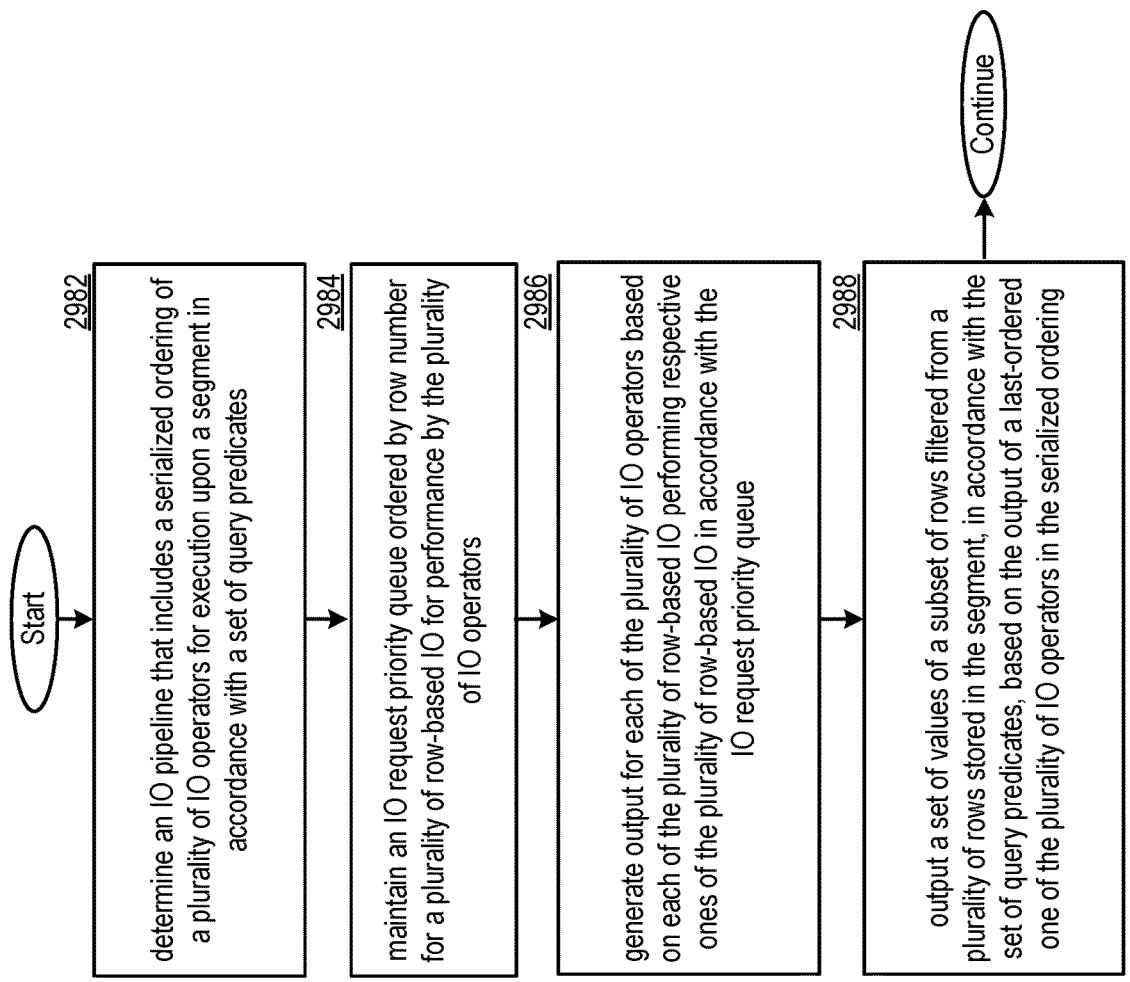

PER-SEGMENT SECONDARY INDEXING IN DATABASE SYSTEMS

CROSS-REFERENCE TO RELATED APPLICATIONS

The present U.S. Utility patent application claims priority pursuant to 35 U.S.C. § 119(e) to U.S. Provisional Application No. 63/091,501, entitled "PER-SEGMENT SECONDARY INDEXING IN DATABASE SYSTEMS", filed Oct. 14, 2020, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

Figure 25A:
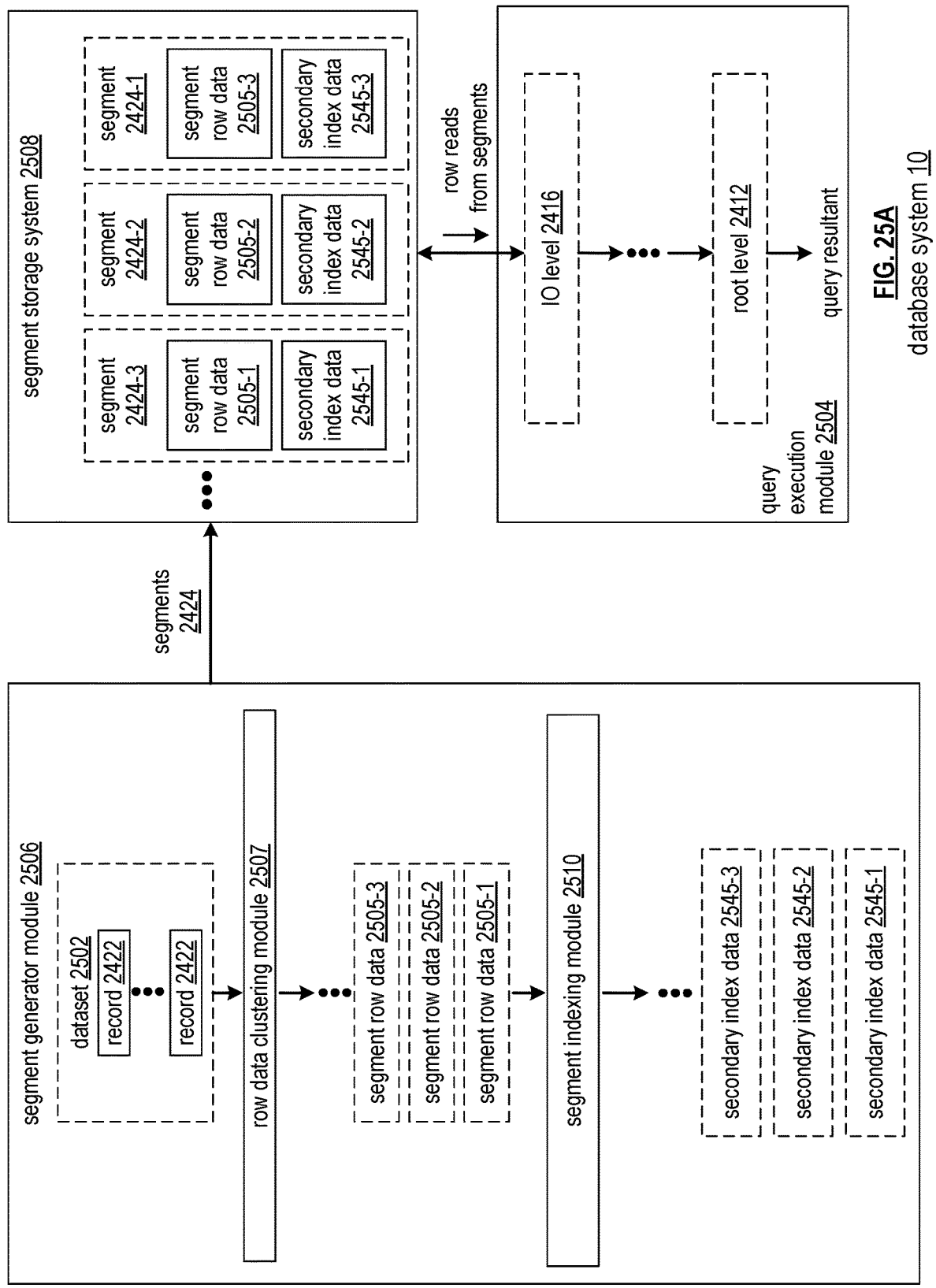
FIG. 25A is a schematic block diagram of a database system that implements a segment generator module, a segment storage module, and a query execution module.
Figure 25B:
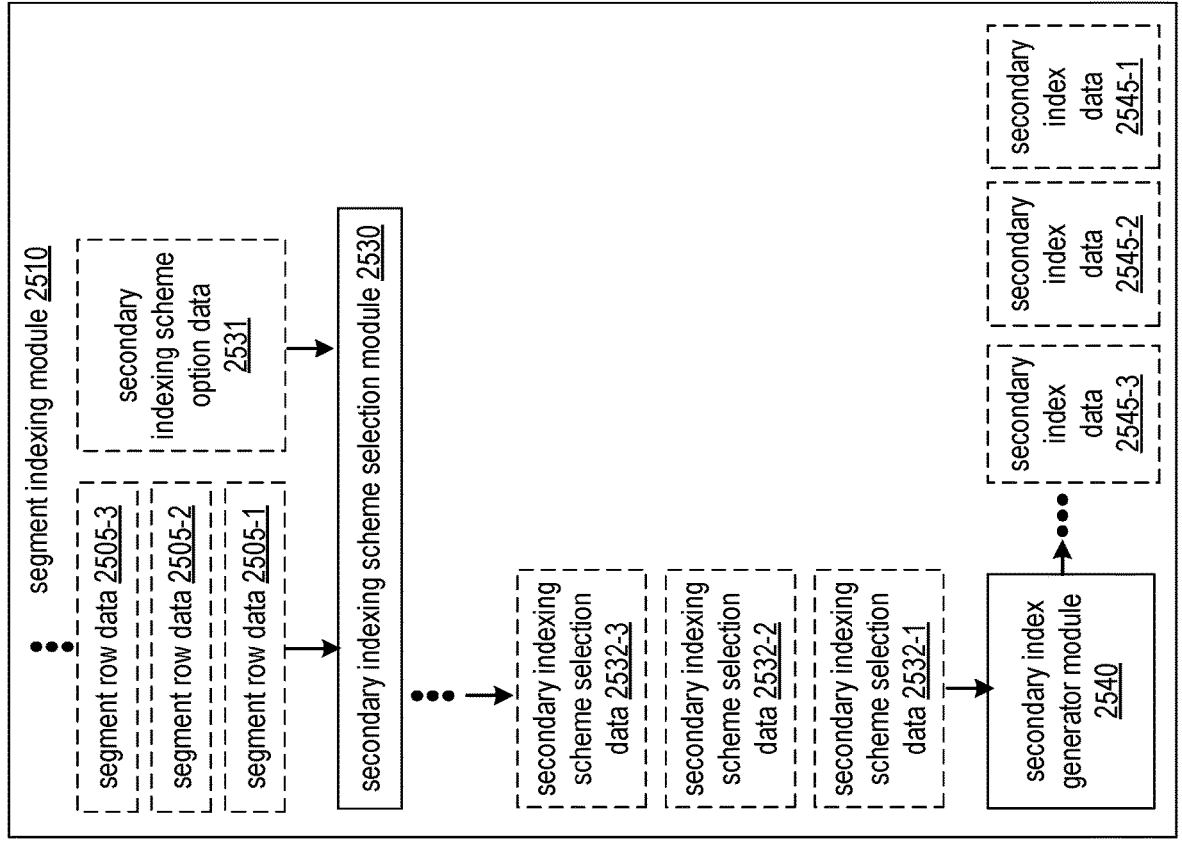
FIGS. 25B-25D are a schematic block diagrams of a segment indexing module in accordance with various embodiments of the present invention.
Figure 25C:
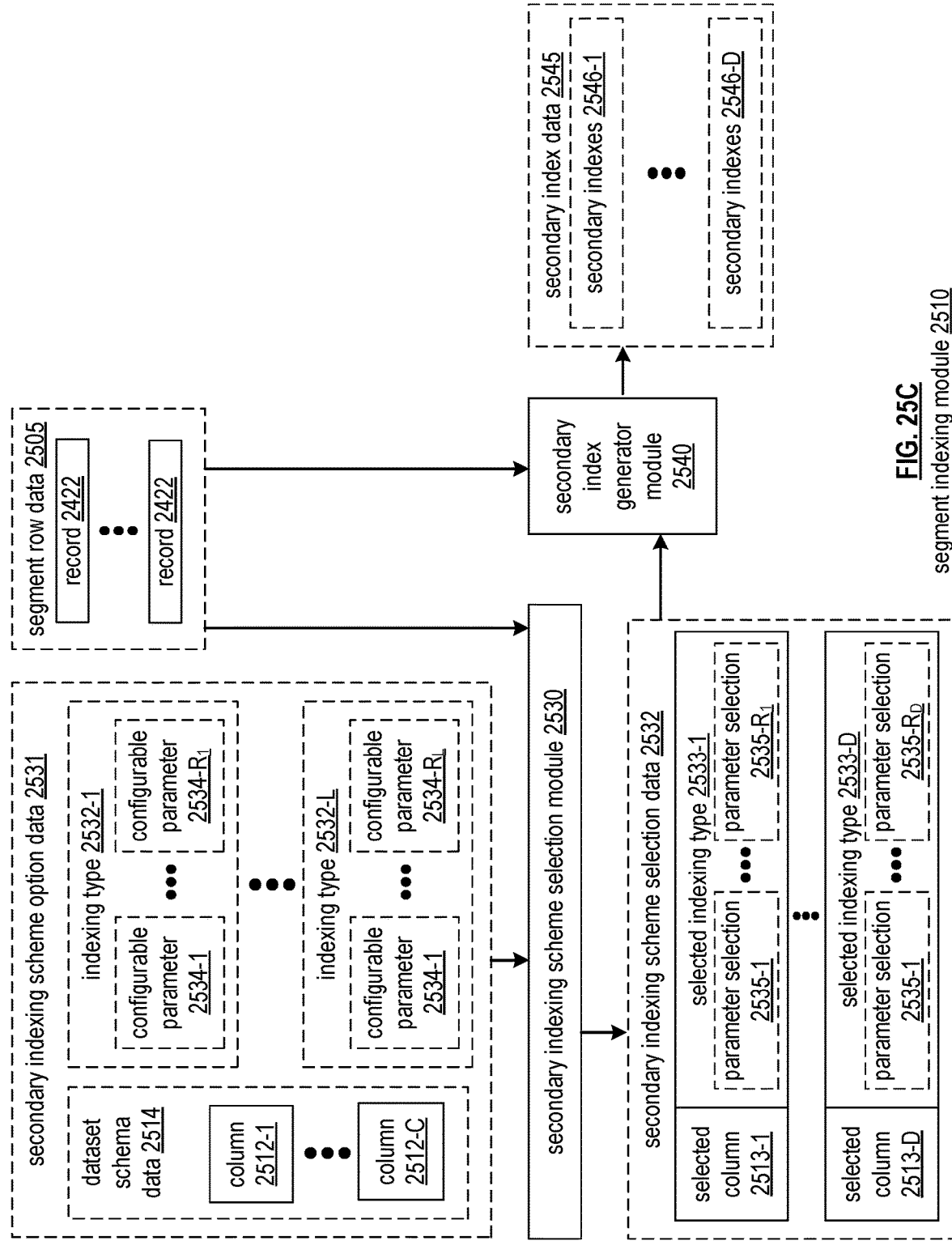
Figure 25D:
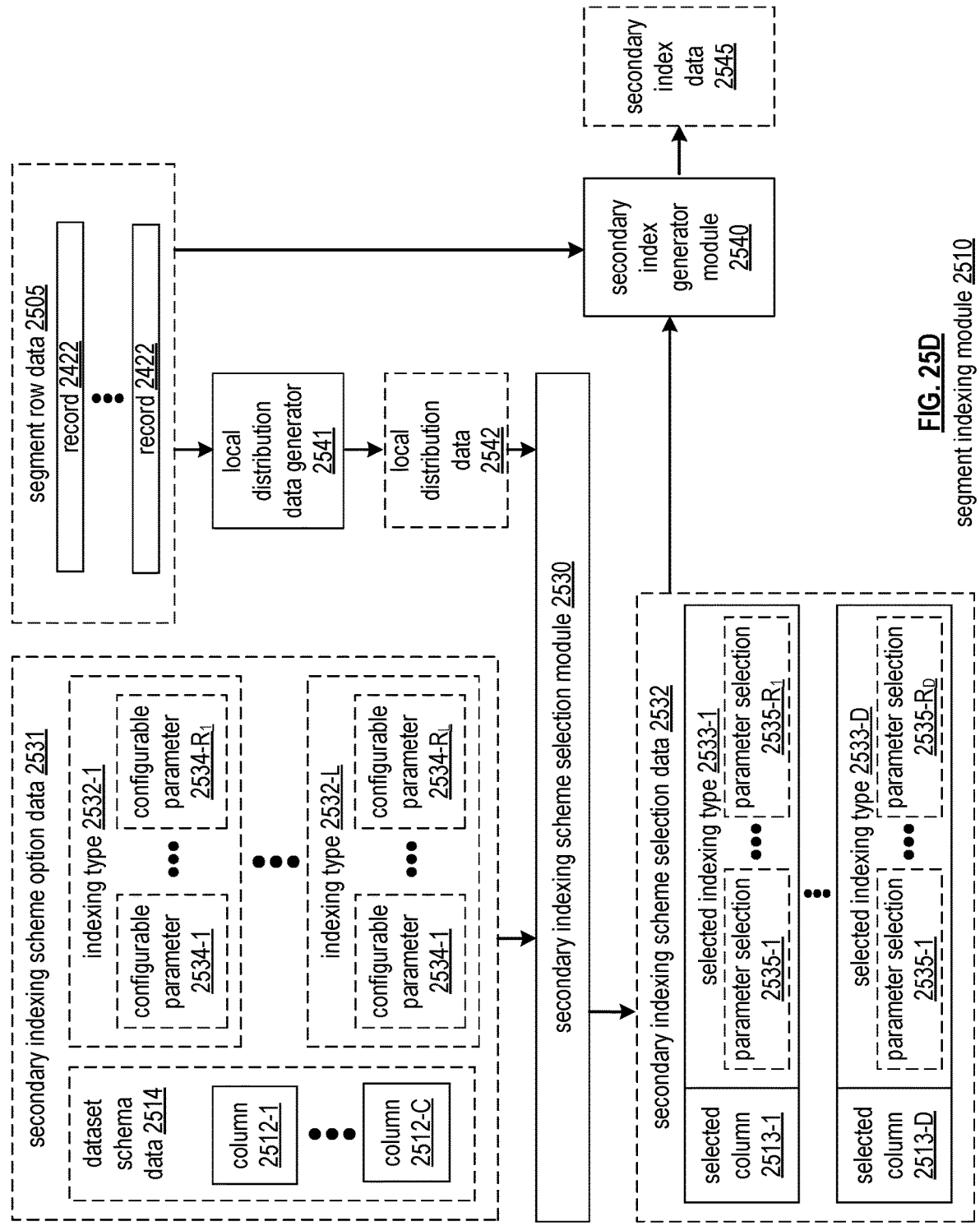
Figure 25E:
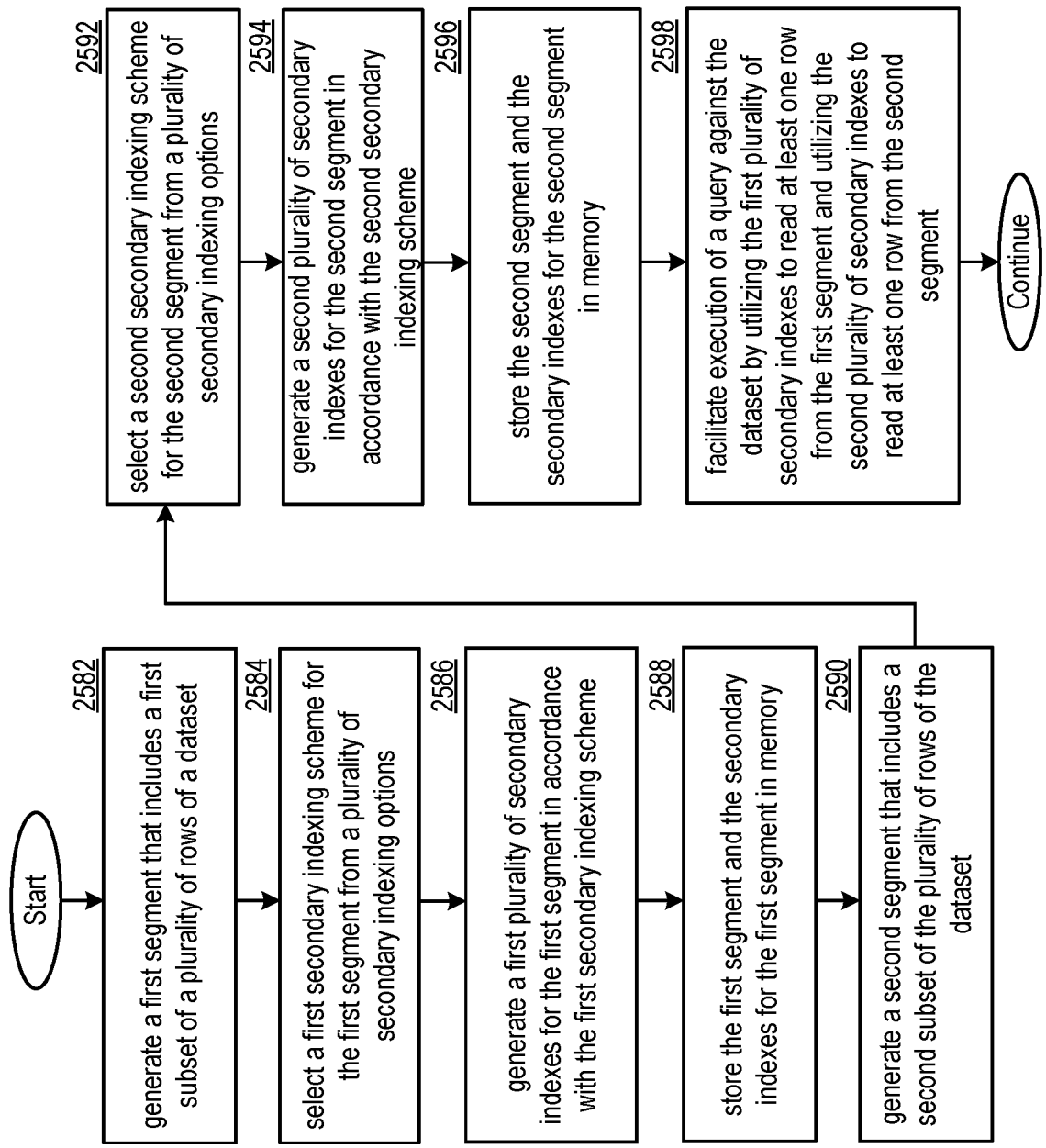
Figure 26A:
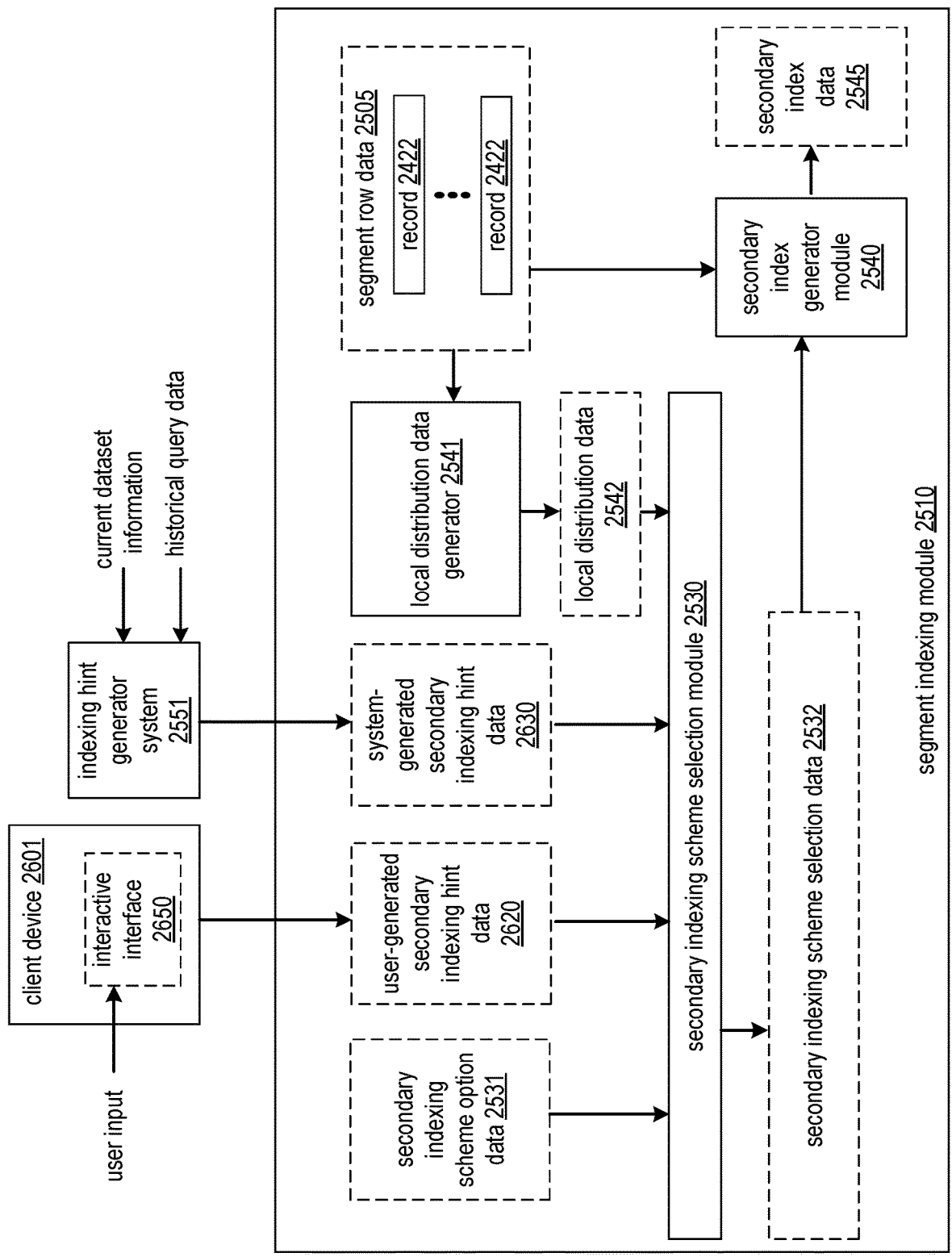
Figure 27B:
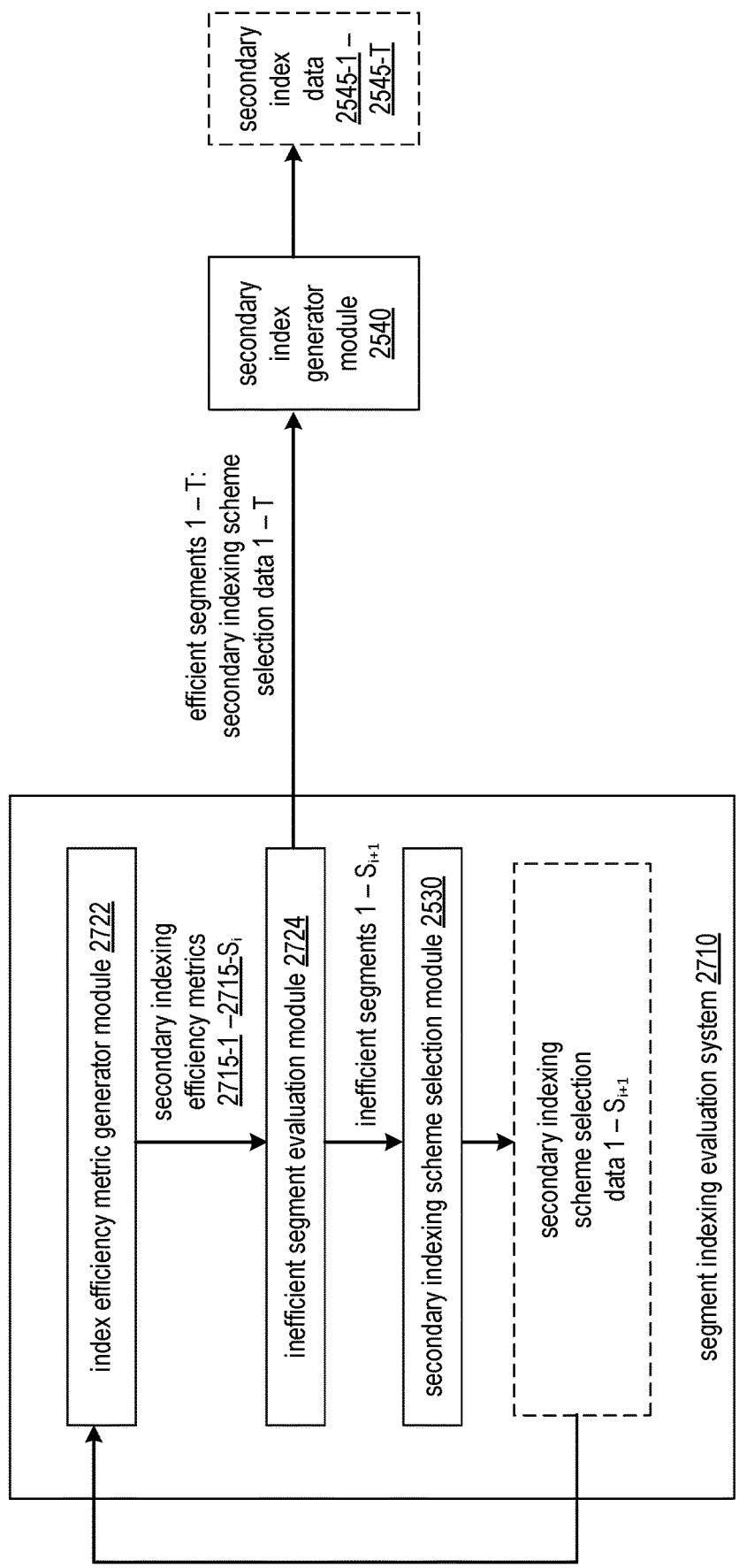
Figure 27D:
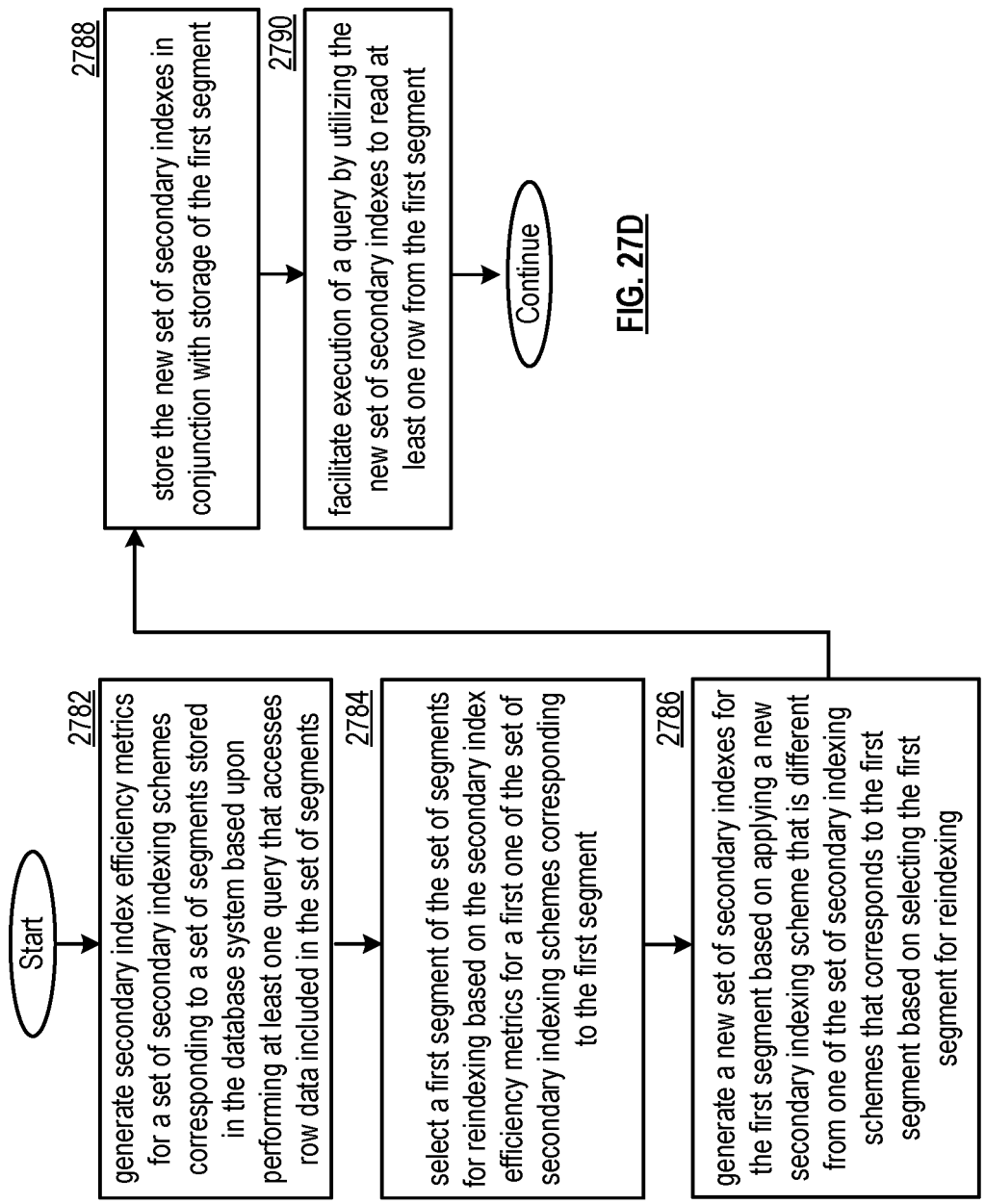
Figure 28A:
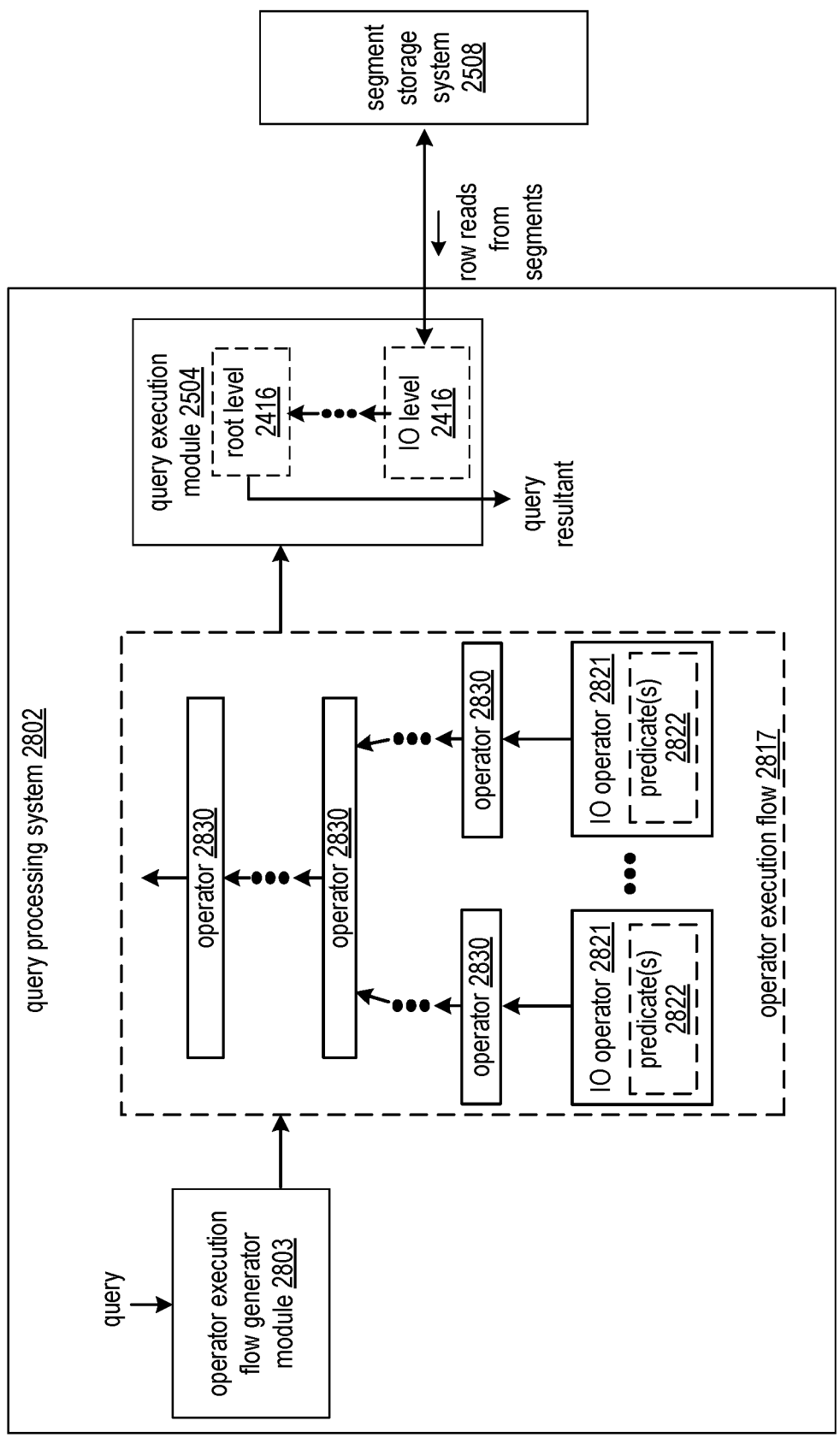
Figure 28B:
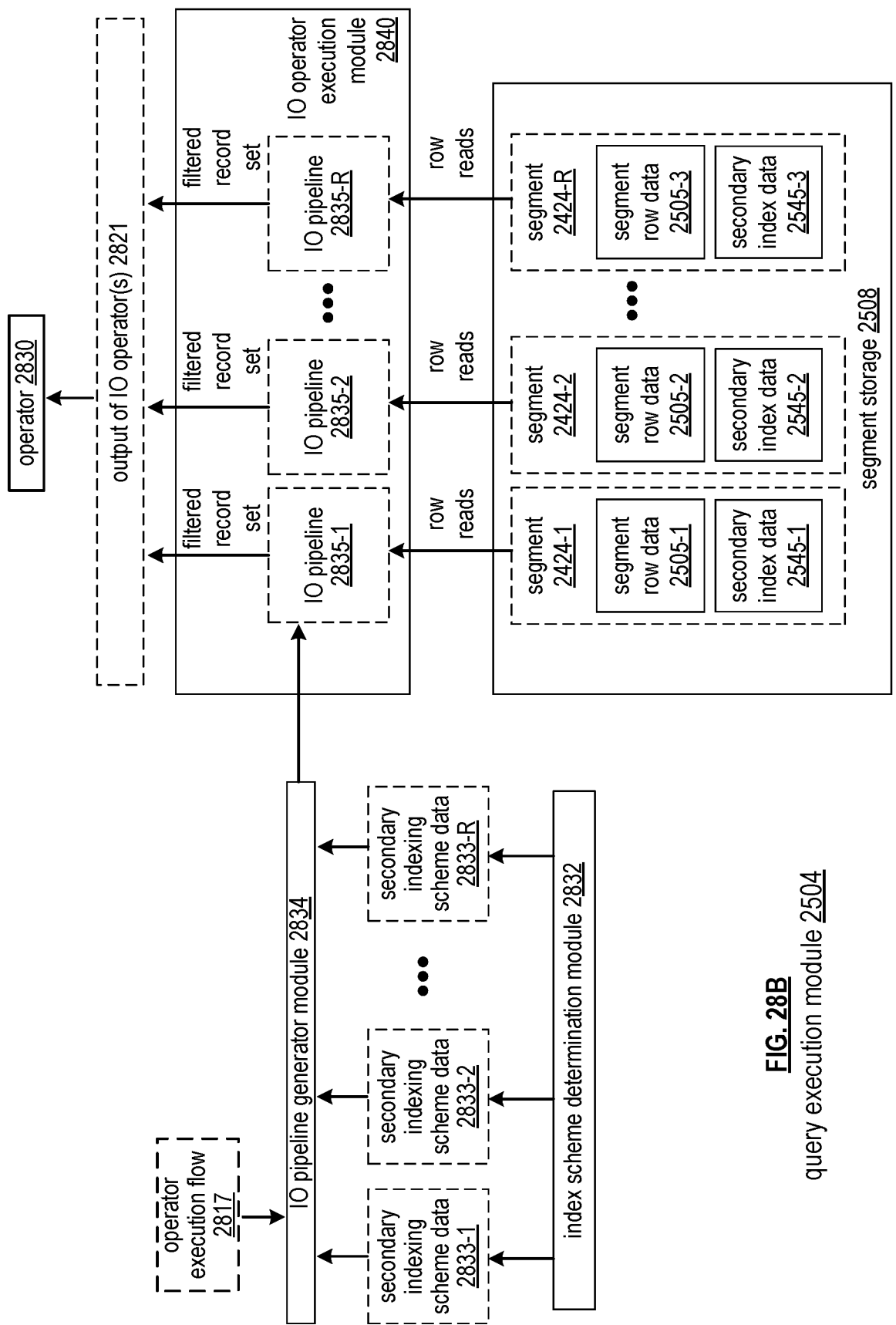
Figure 28C:
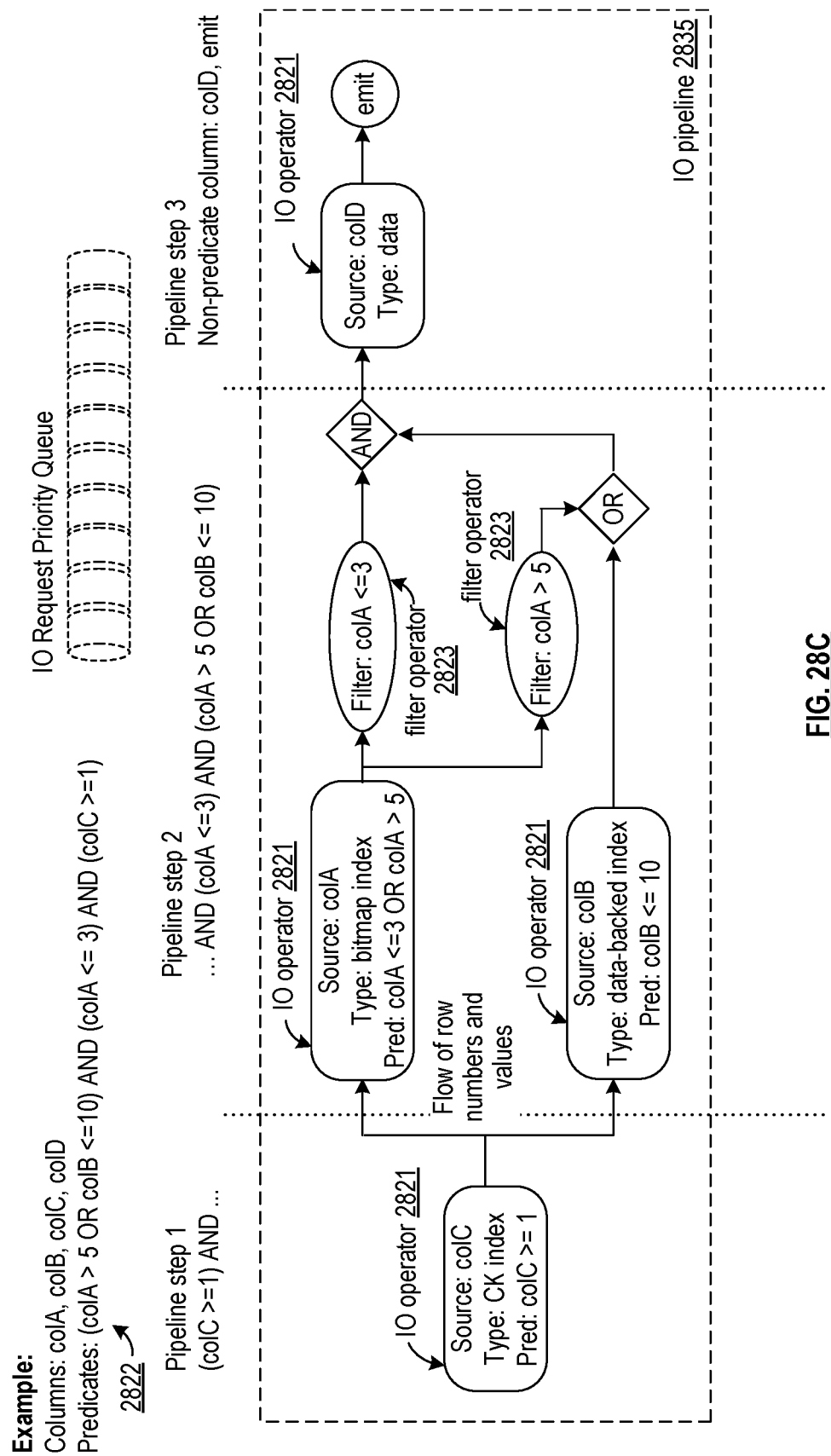
Figure 28D:
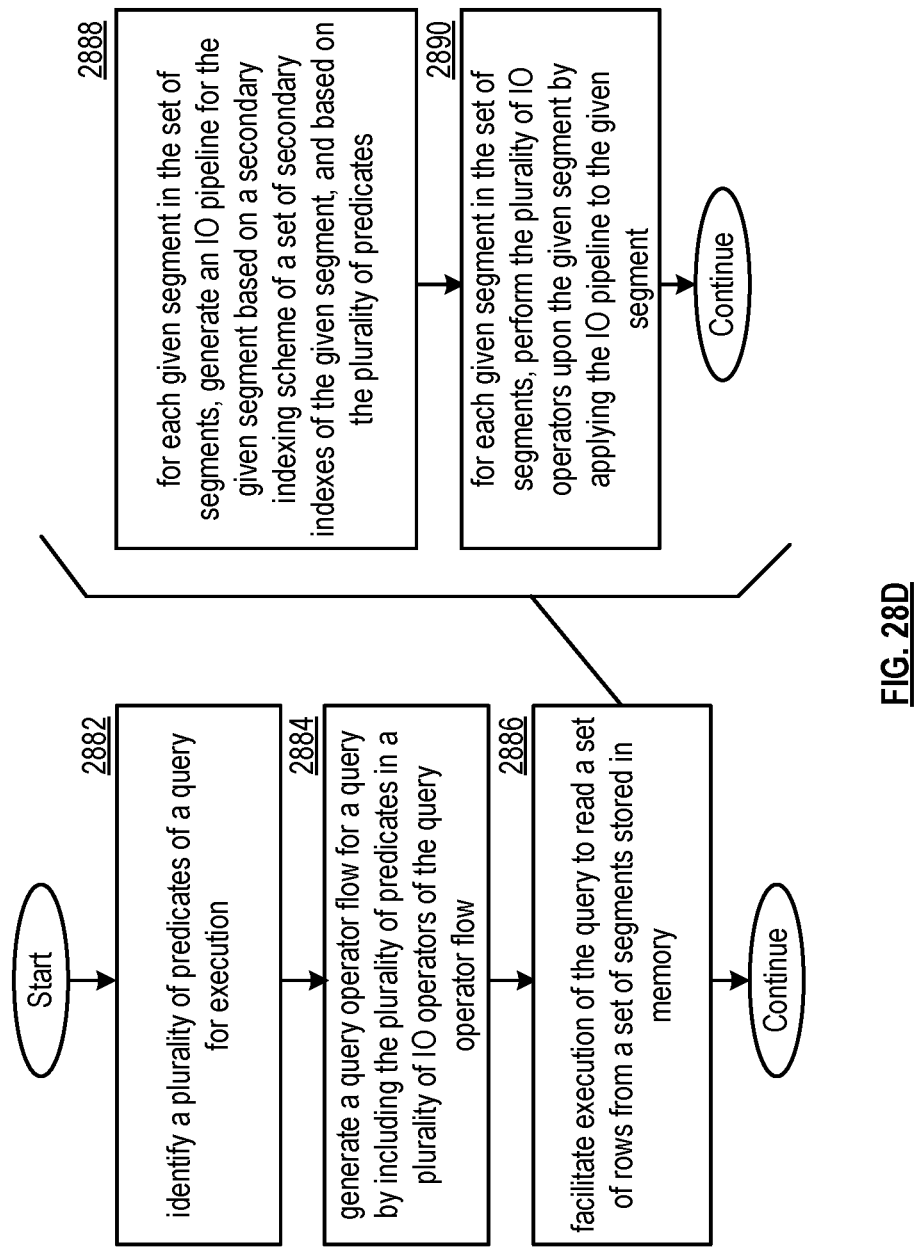
Figure 29A:
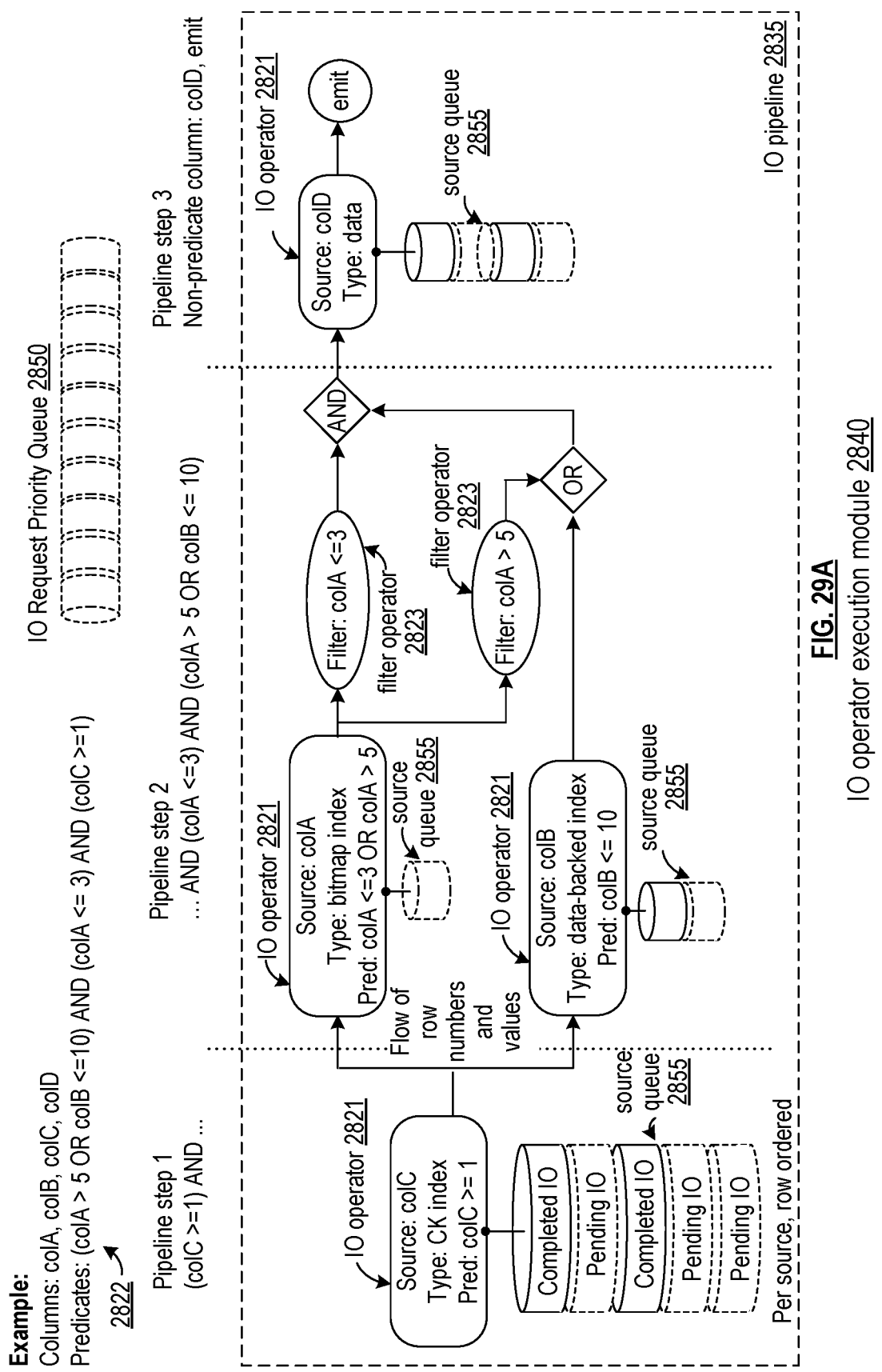

FIG. 25E a logic diagram illustrating a method of selecting and generating secondary indexes for different segments in accordance with various embodiments of the present invention;

FIG. 26A is a schematic block diagrams of a segment indexing module that utilizes secondary indexing hint data in accordance with various embodiments of the present invention;

FIG. 26B a logic diagram illustrating a method of selecting and generating secondary indexes for segments based on secondary indexing hint data in accordance with various embodiments of the present invention;

FIGS. 27A-27C are schematic block diagrams of a segment indexing evaluation system 2710 in accordance with various embodiments of the present invention;

FIG. 27D a logic diagram illustrating a method of evaluating segments for re-indexing in accordance with various embodiments of the present invention;

FIG. 28A is a schematic block diagram of a query processing system in accordance with various embodiments of the present invention;

FIG. 28B is a schematic block diagram of a query execution module that implements an IO pipeline generator module and an IO operator execution module in accordance with various embodiments of the present invention;

FIG. 28C is a schematic block diagram of an example embodiment of an IO pipeline in accordance with various embodiments of the present invention;

FIG. 28D is a logic diagram illustrating a method of performing IO operators upon different segments in query execution accordance with various embodiments of the present invention;

FIG. 29A is a schematic block diagram of an IO operator execution module that executes an example IO pipeline in accordance with various embodiments of the present invention; and FIG. 29B is a logic diagram illustrating a method of executing row-based reads of an IO pipeline in accordance with various embodiments of the present invention.

DETAILED DESCRIPTION OF THE INVENTION

Figure 1:
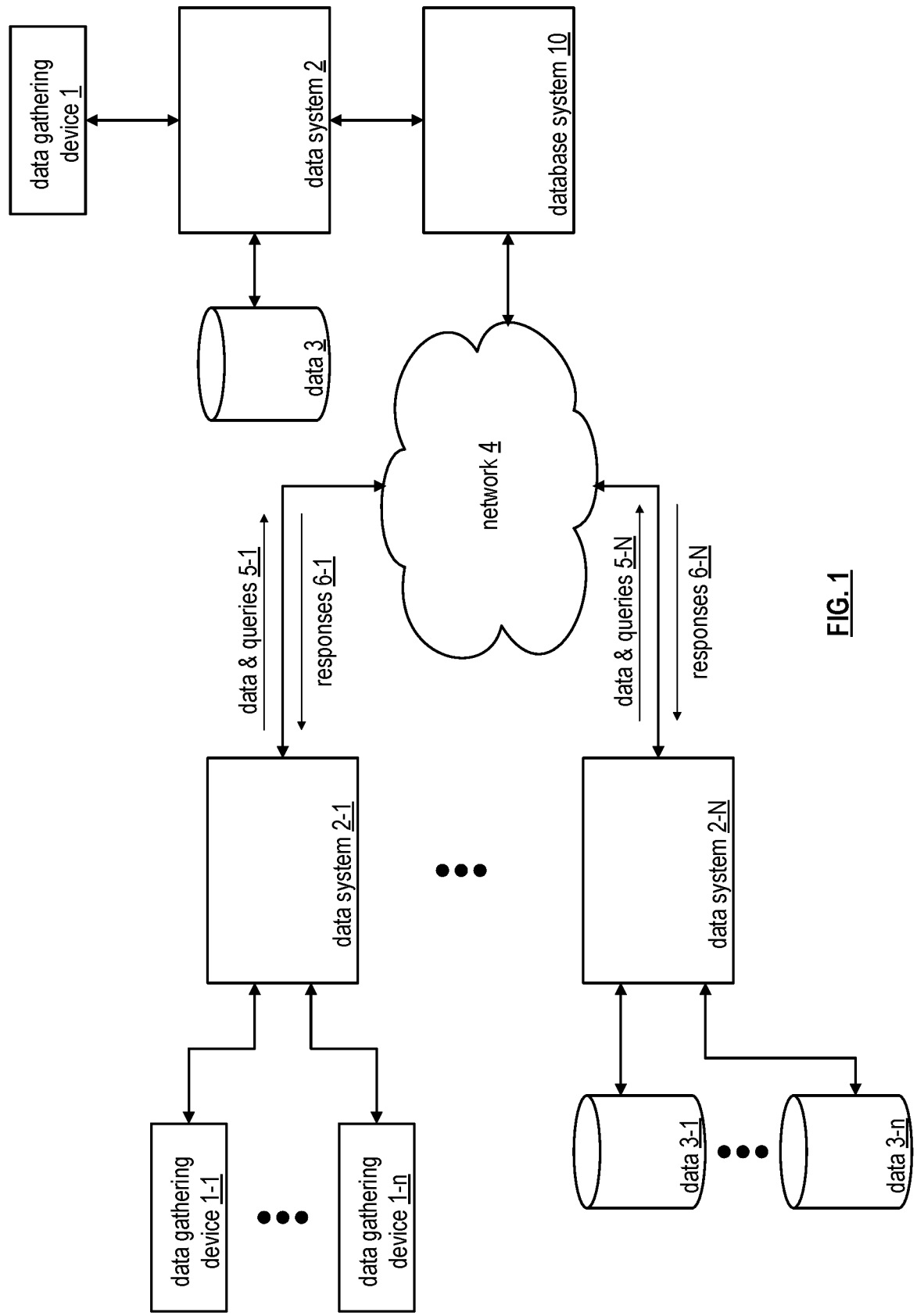
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
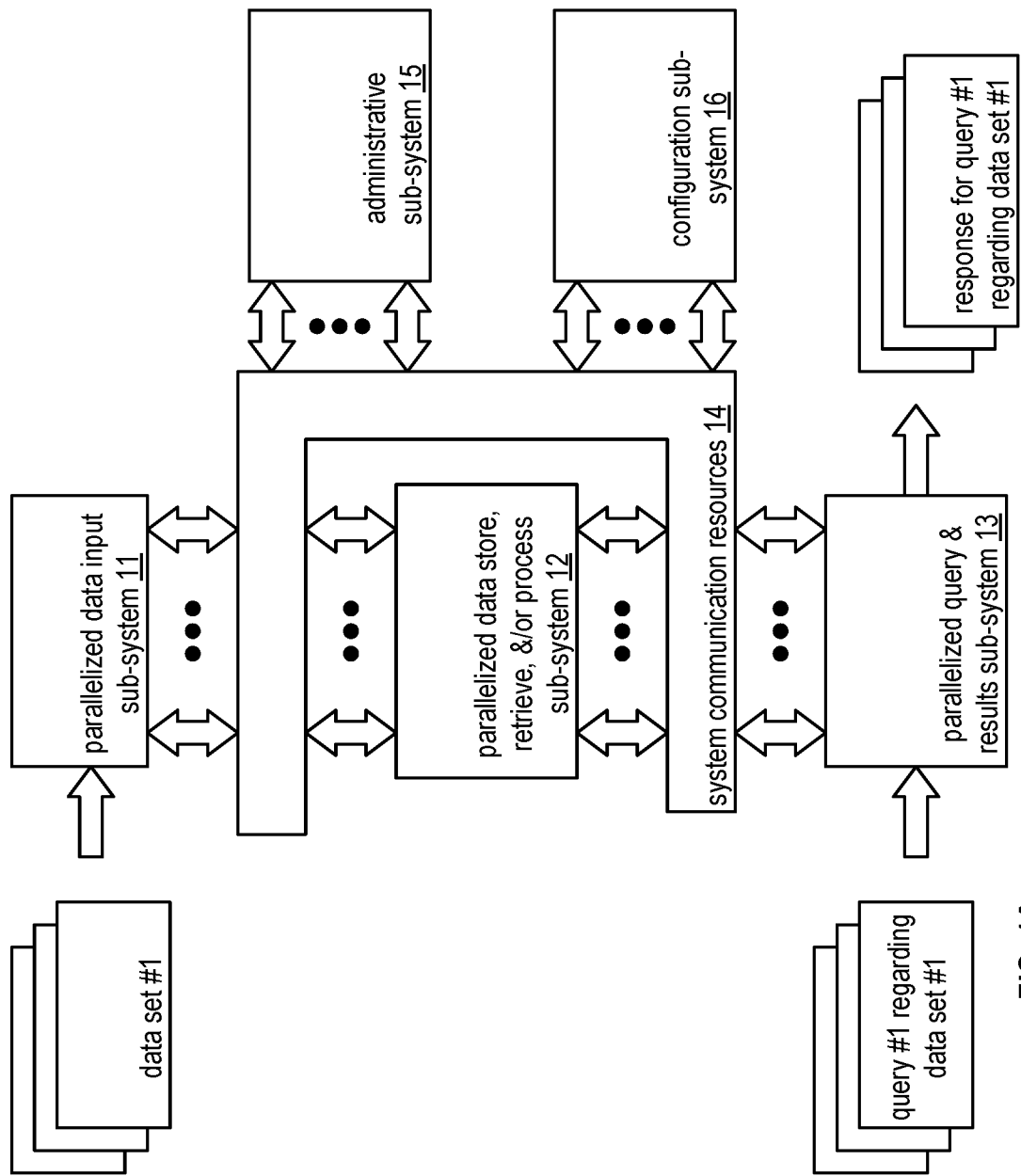
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
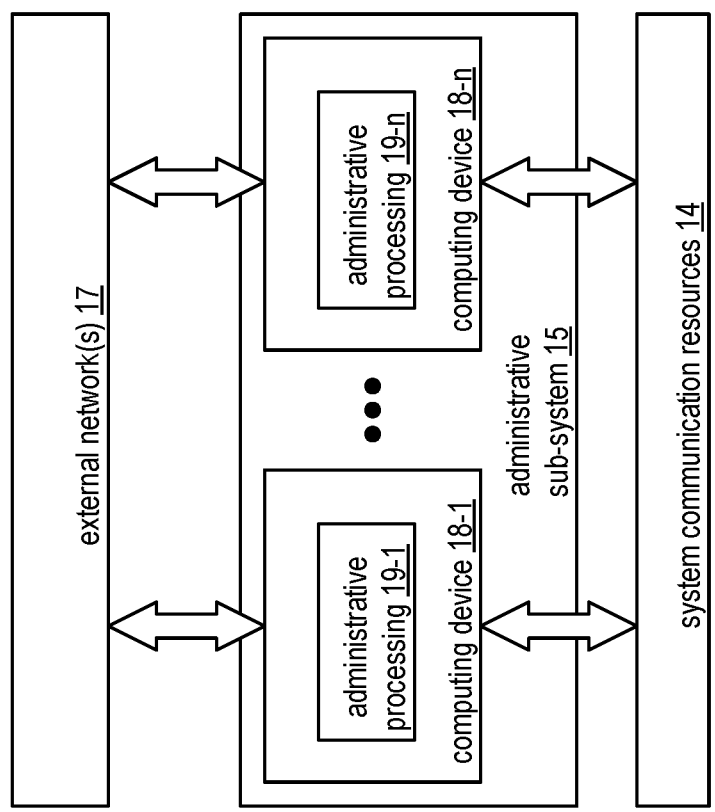
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-$n$. Each of the computing devices executes an administrative processing function utilizing a corresponding administrative processing of administrative processing 19-1 through 19-$n$ (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
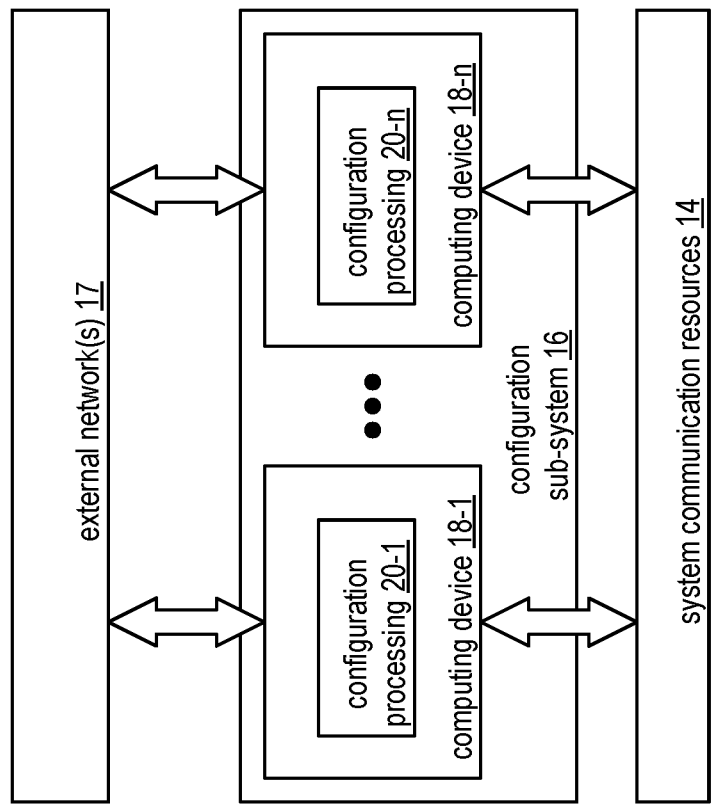
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
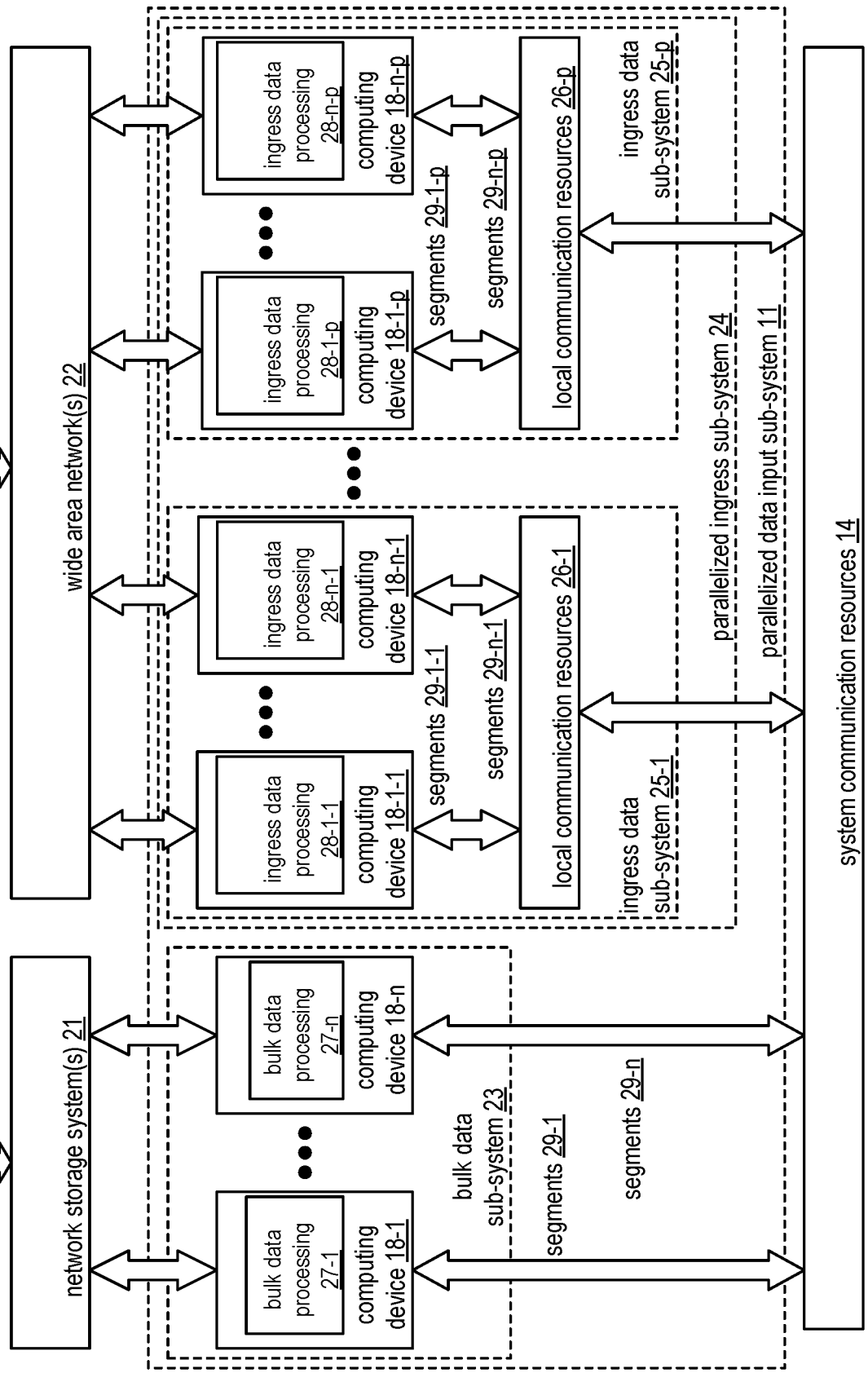
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
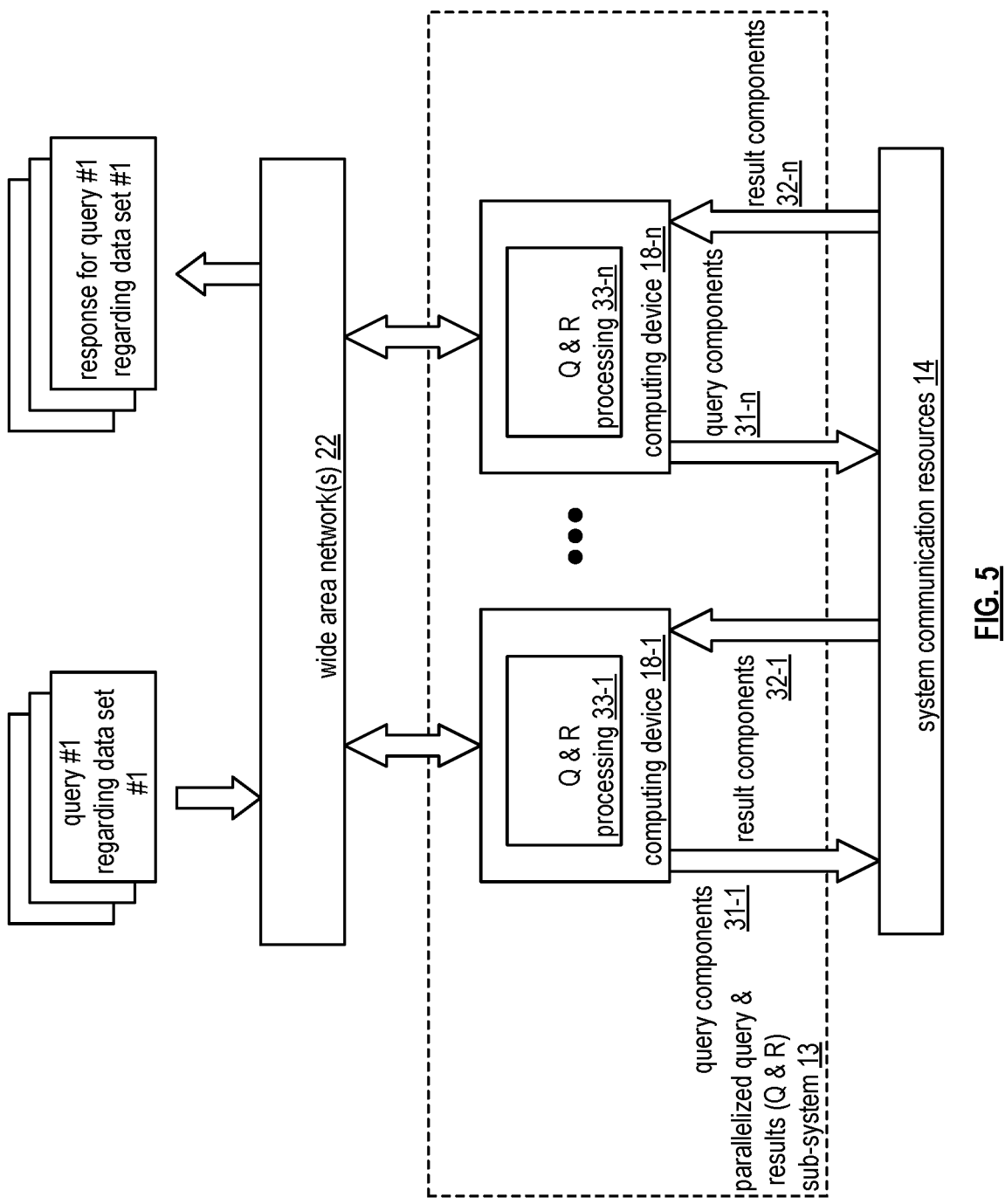
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
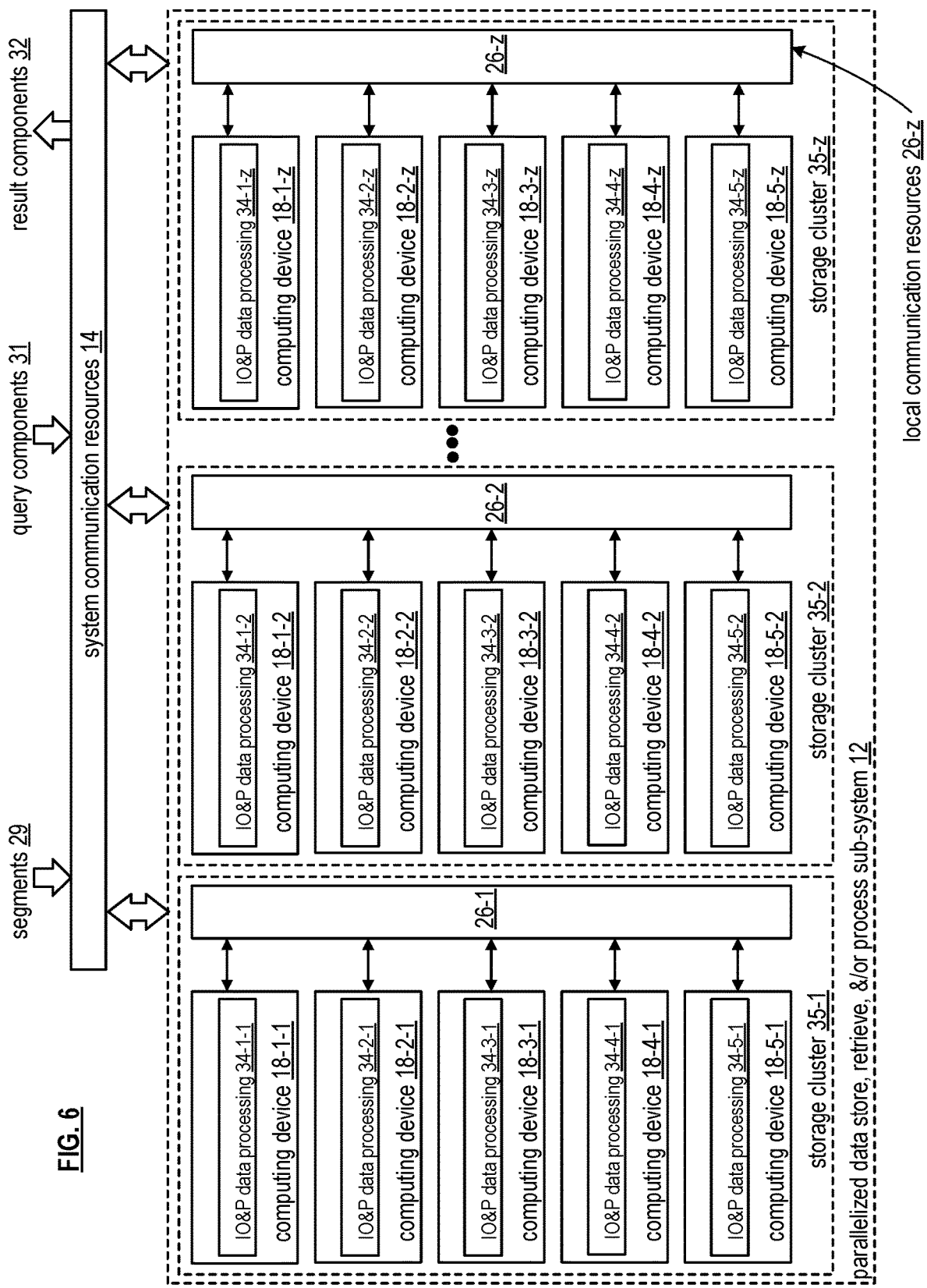
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
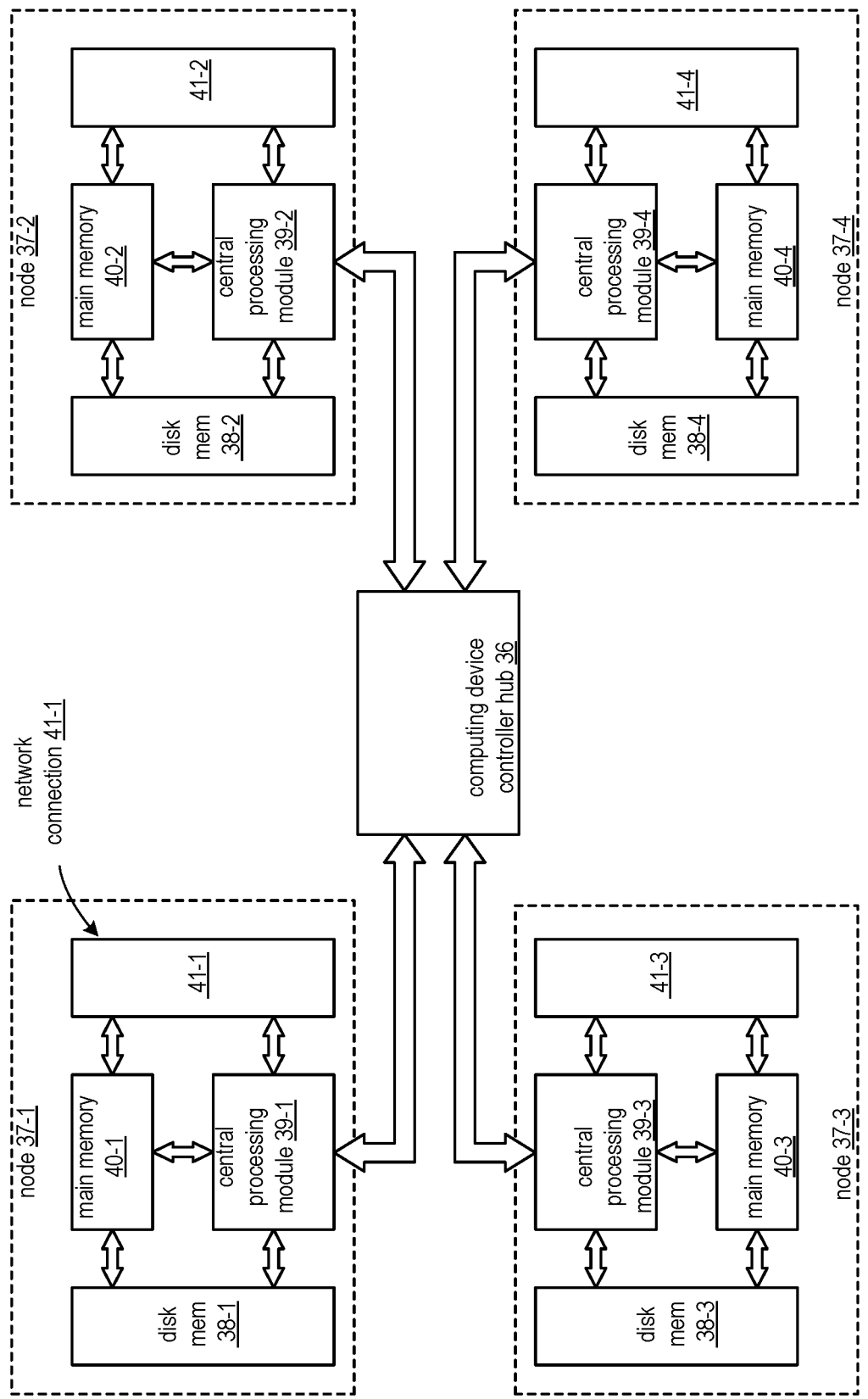
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
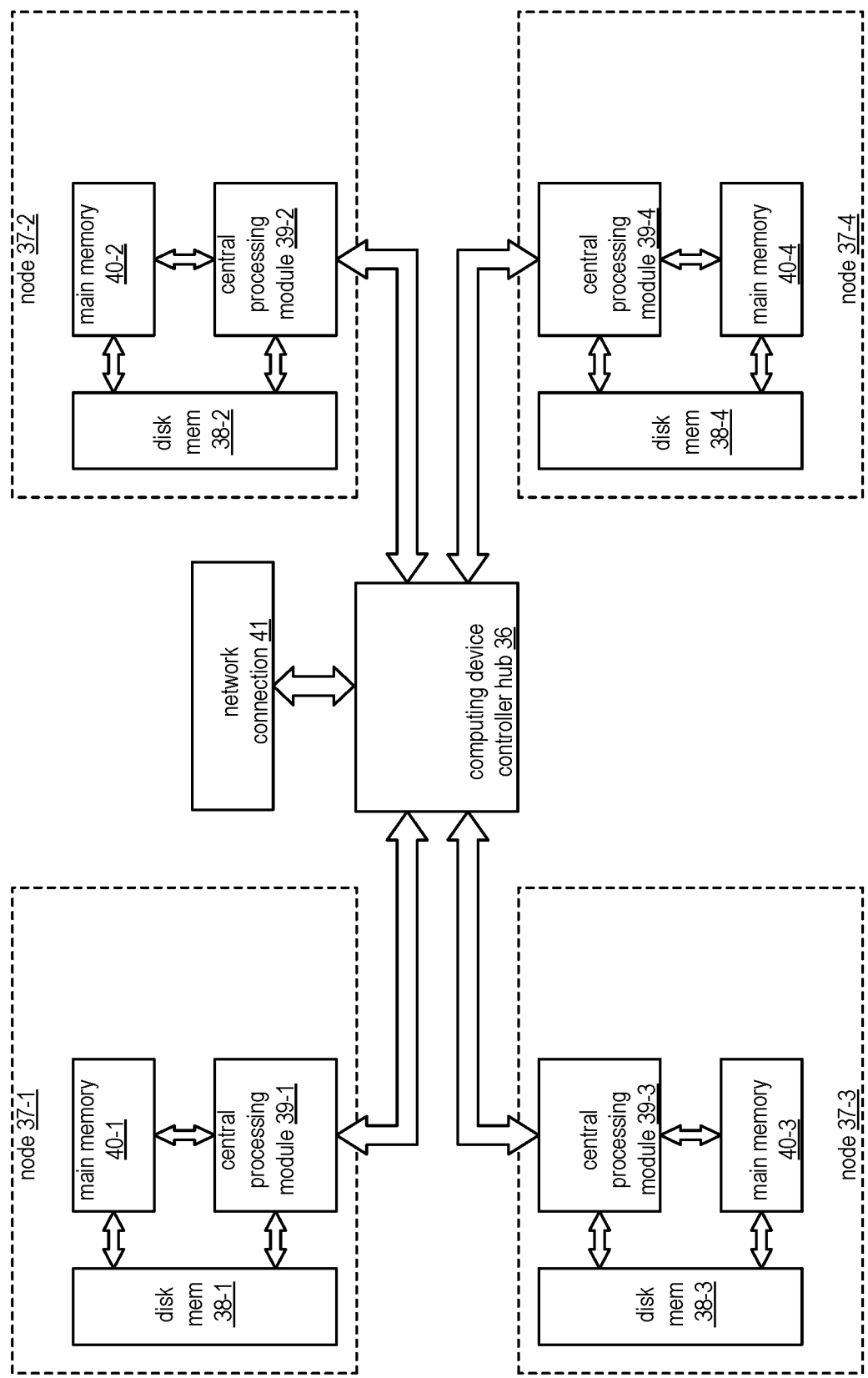
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
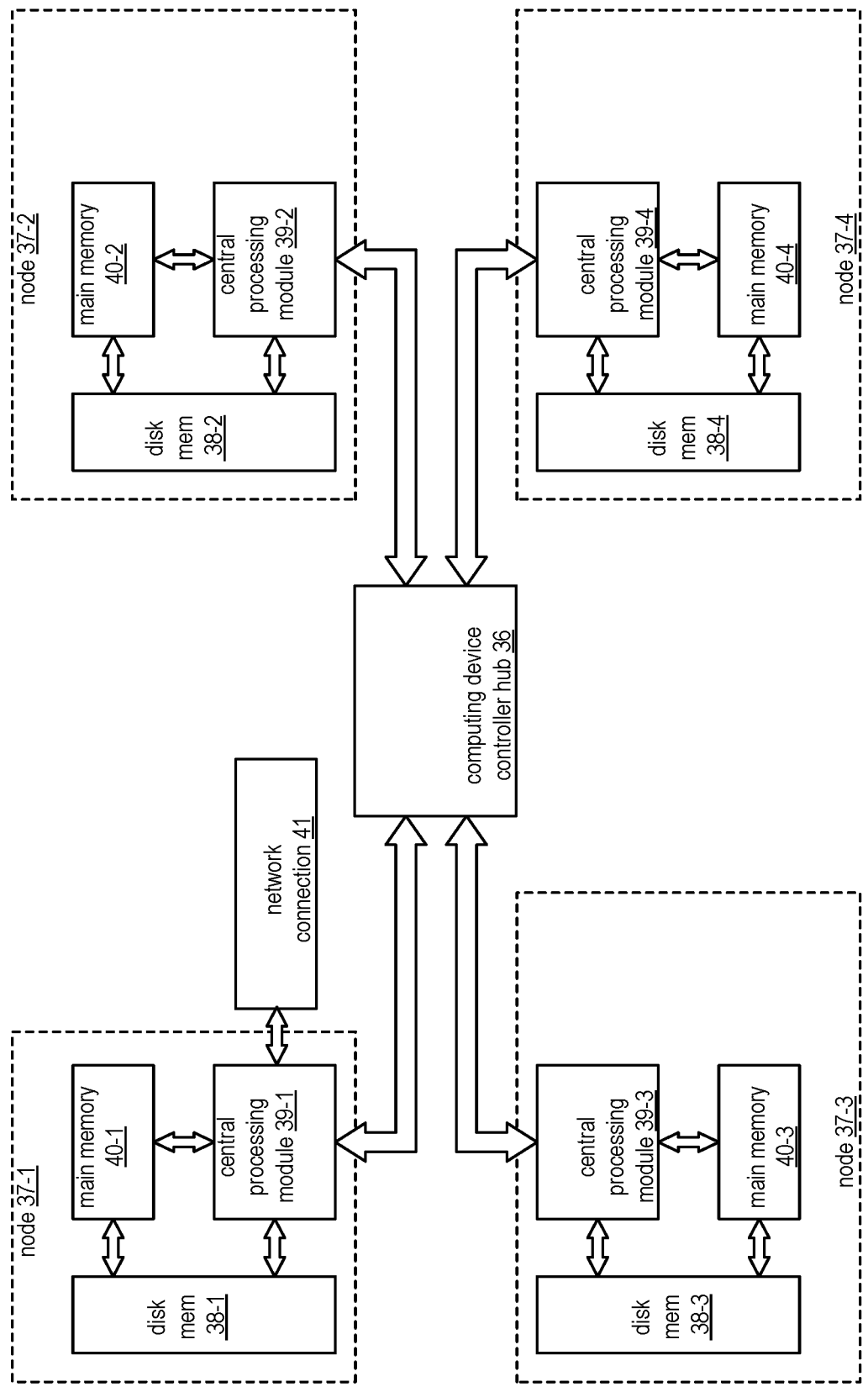
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
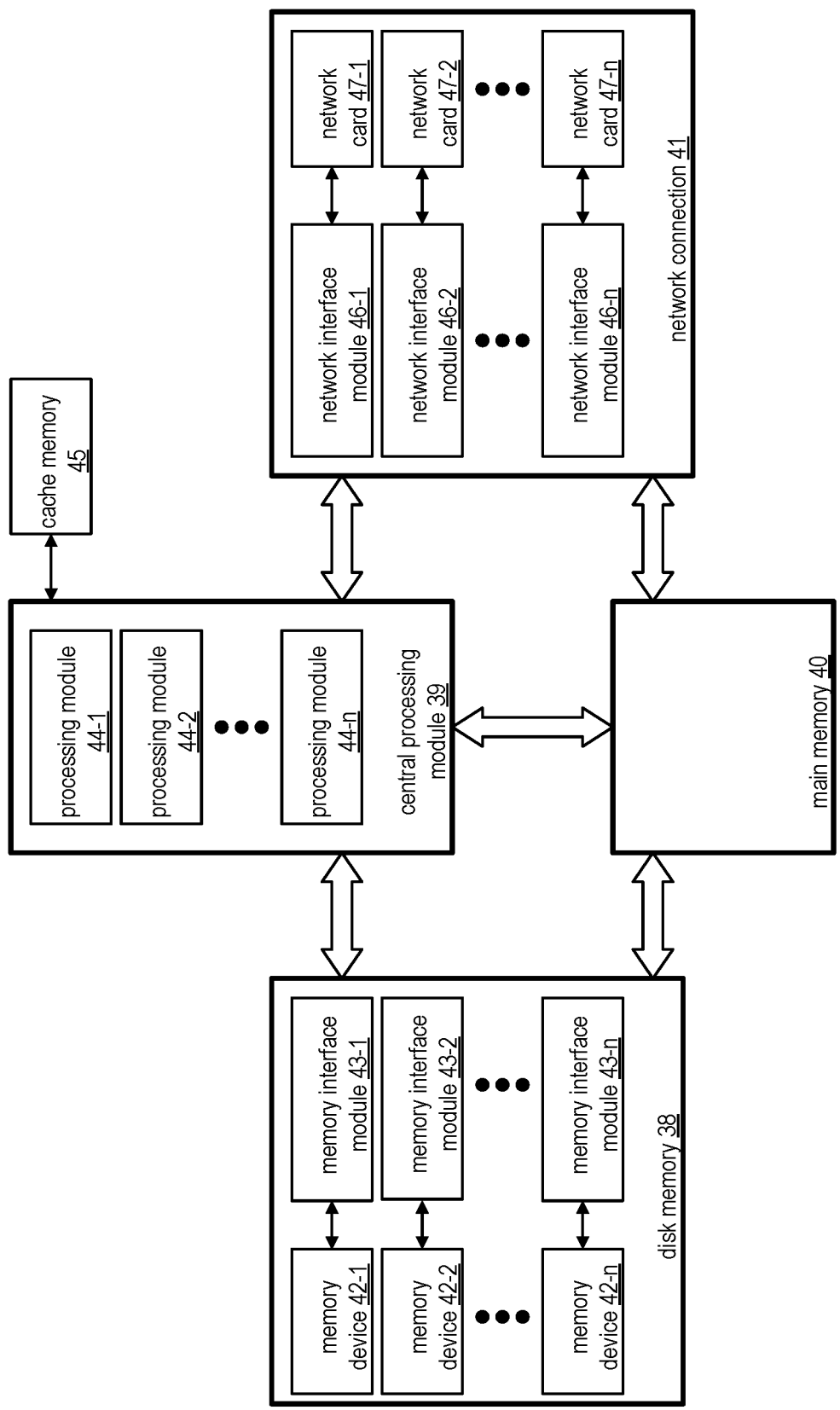
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
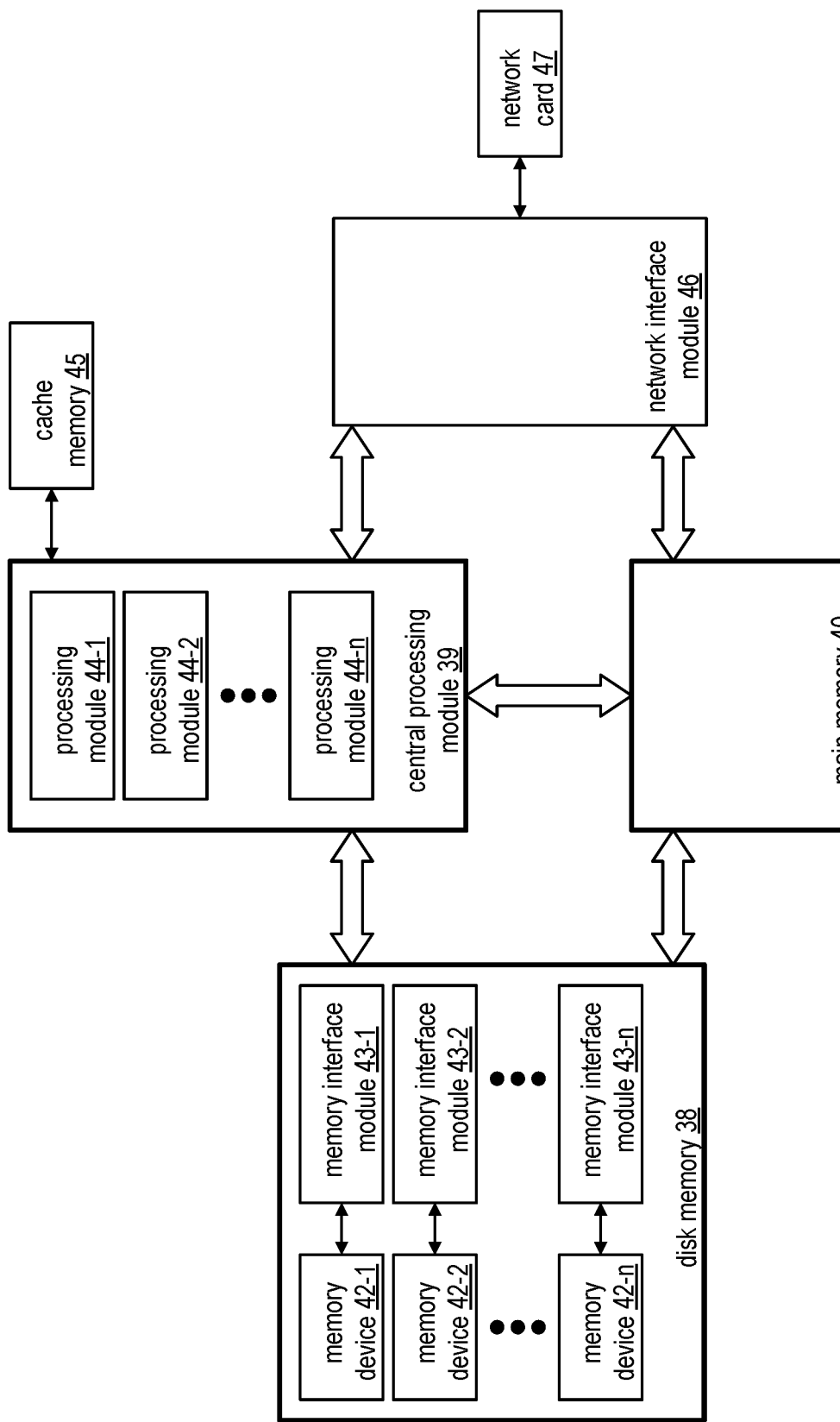
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
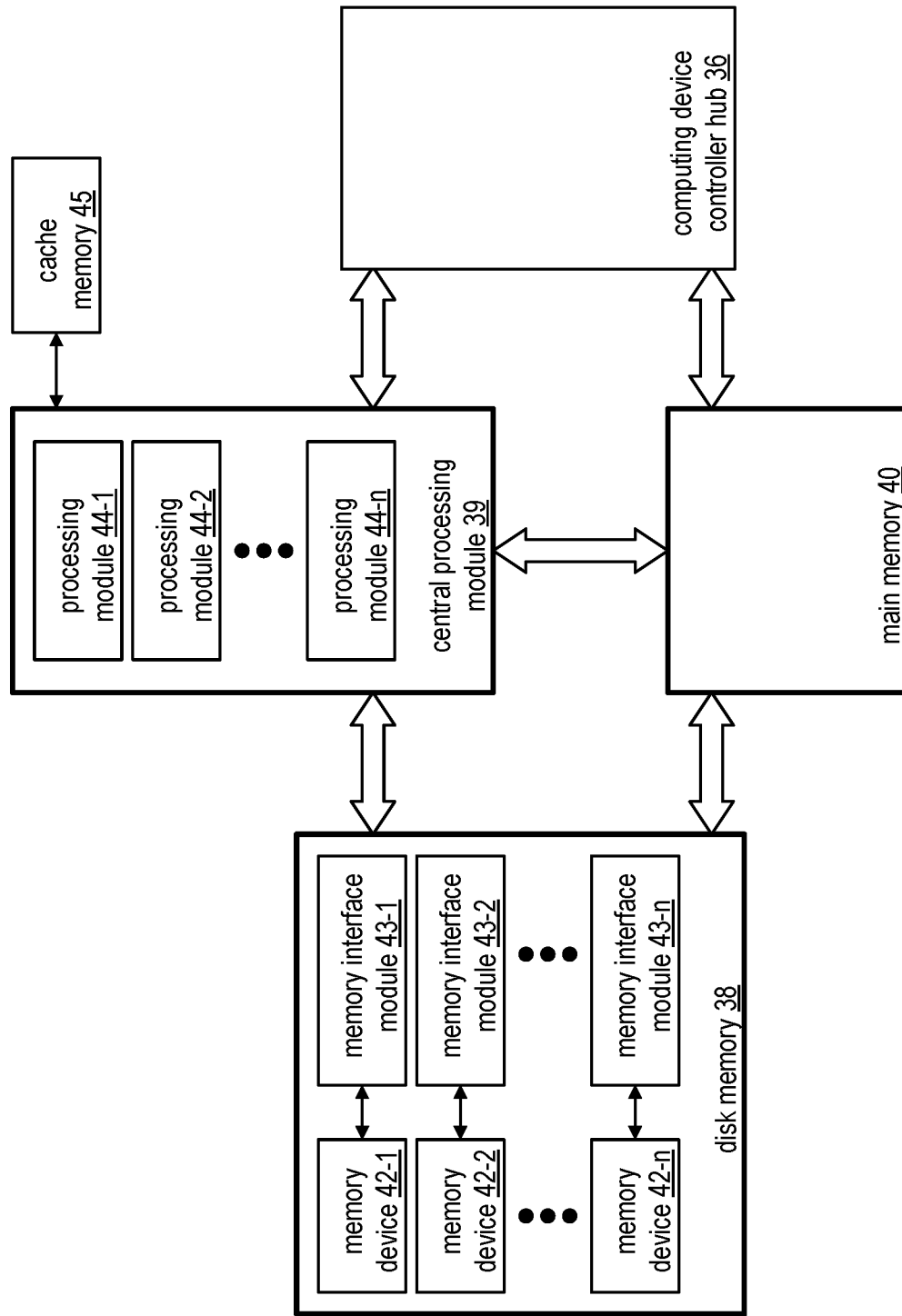
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
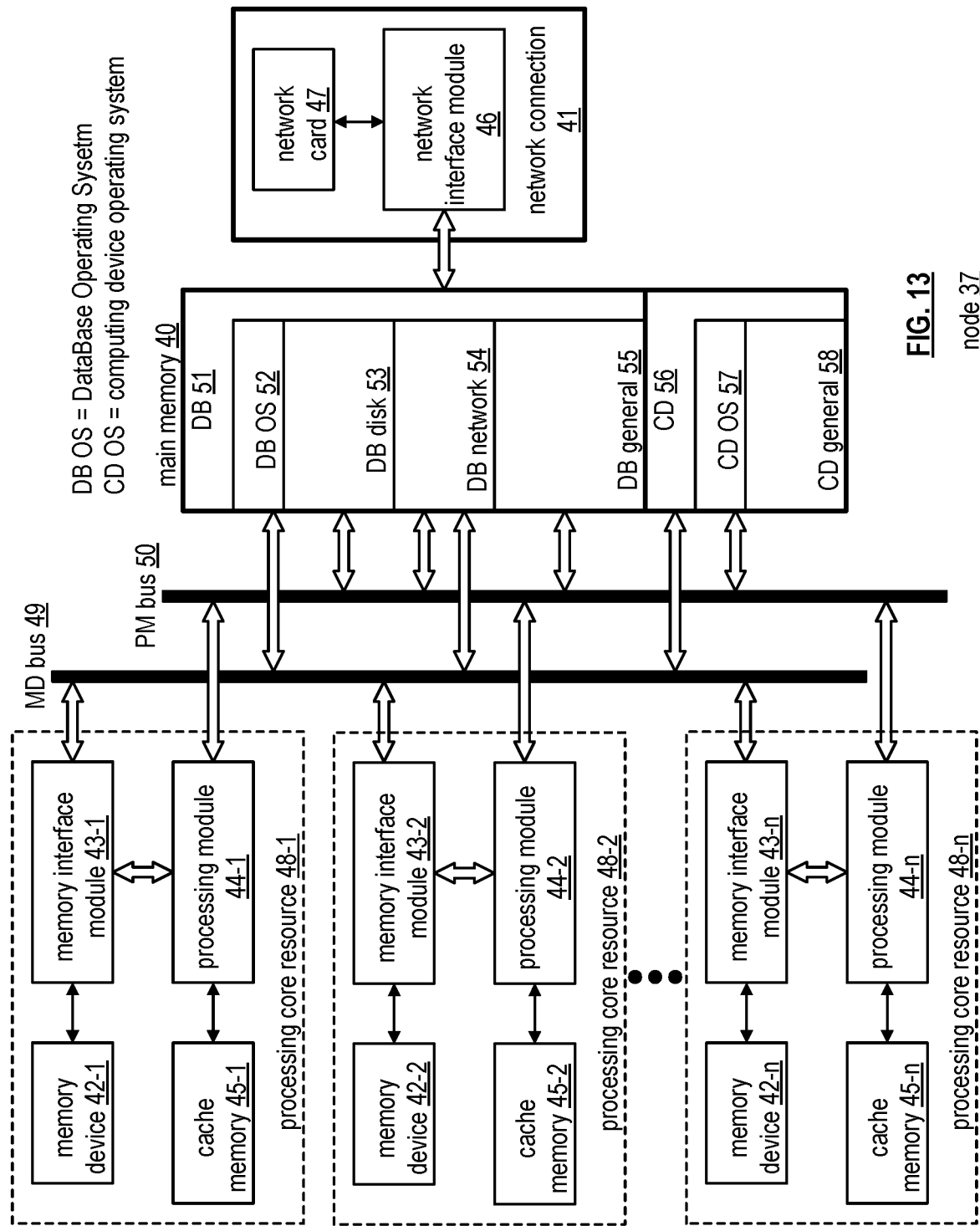
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
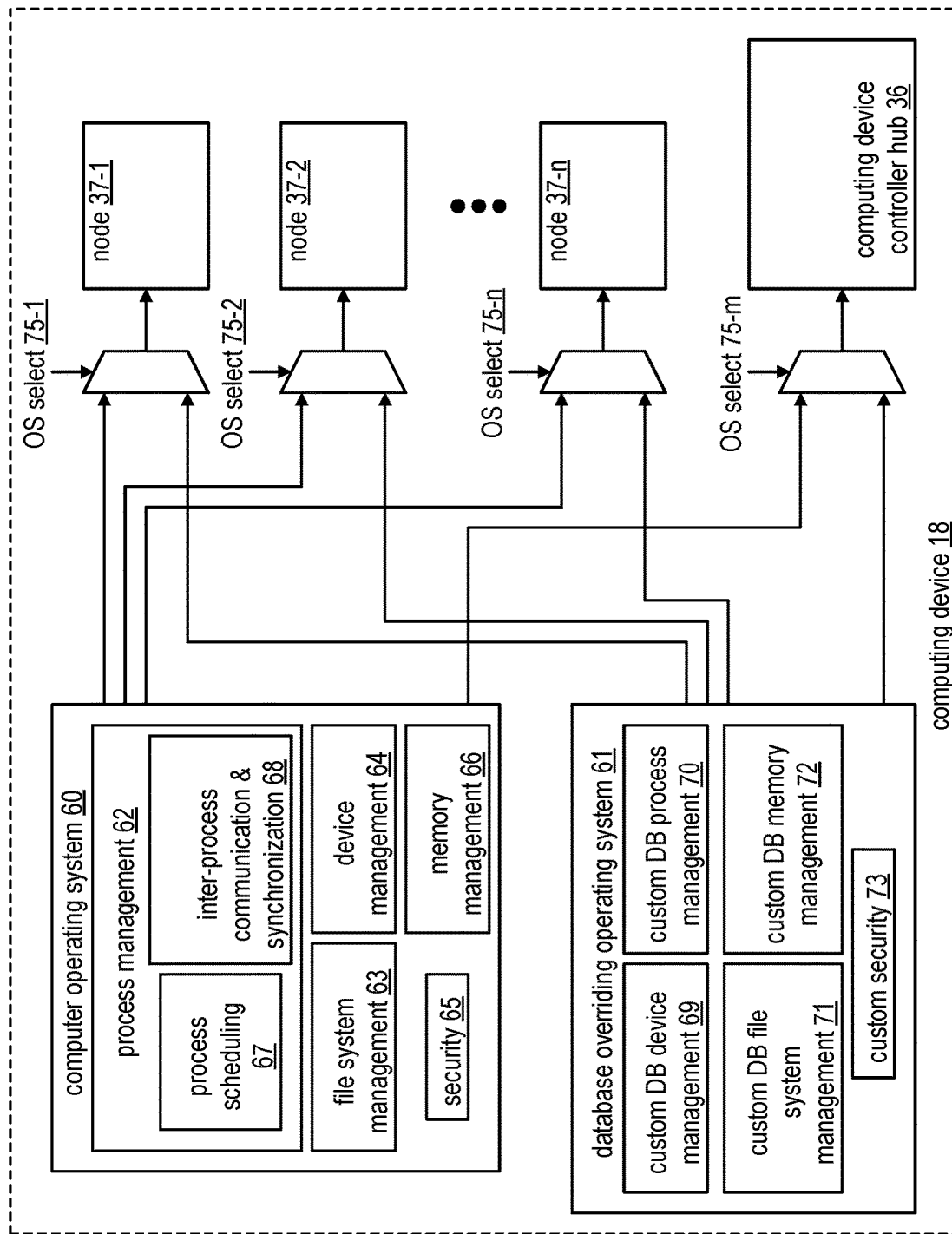
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
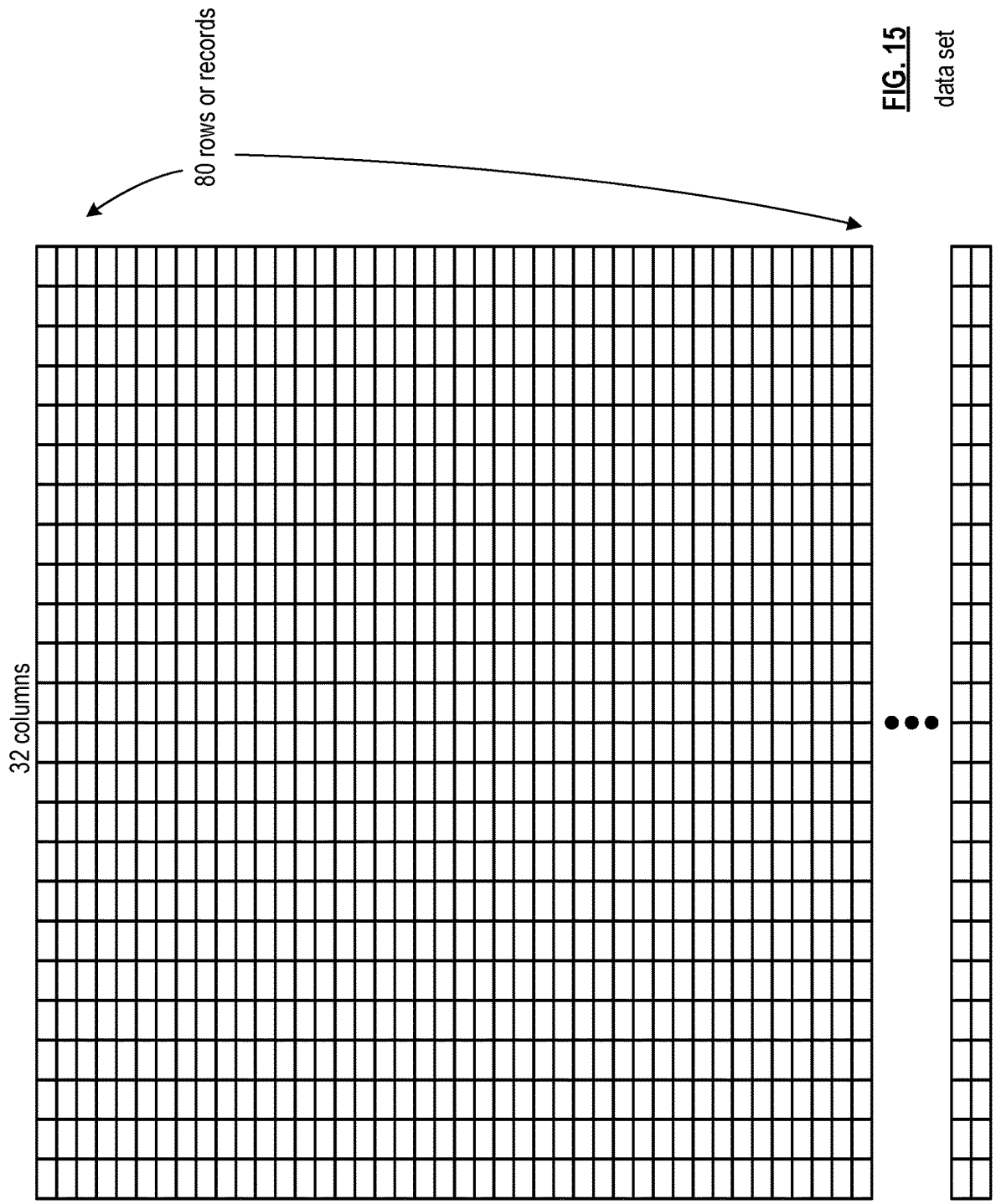

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
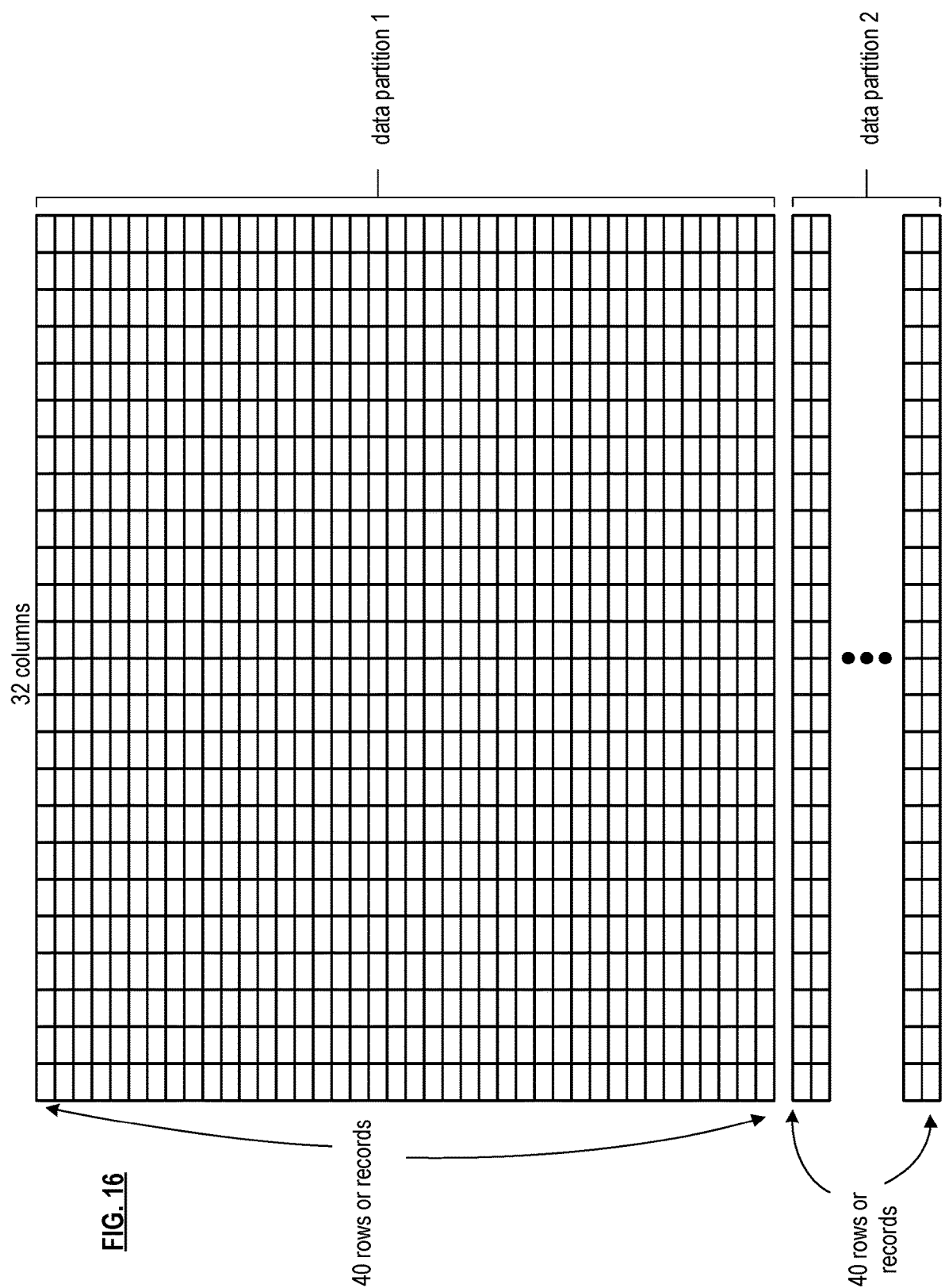

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
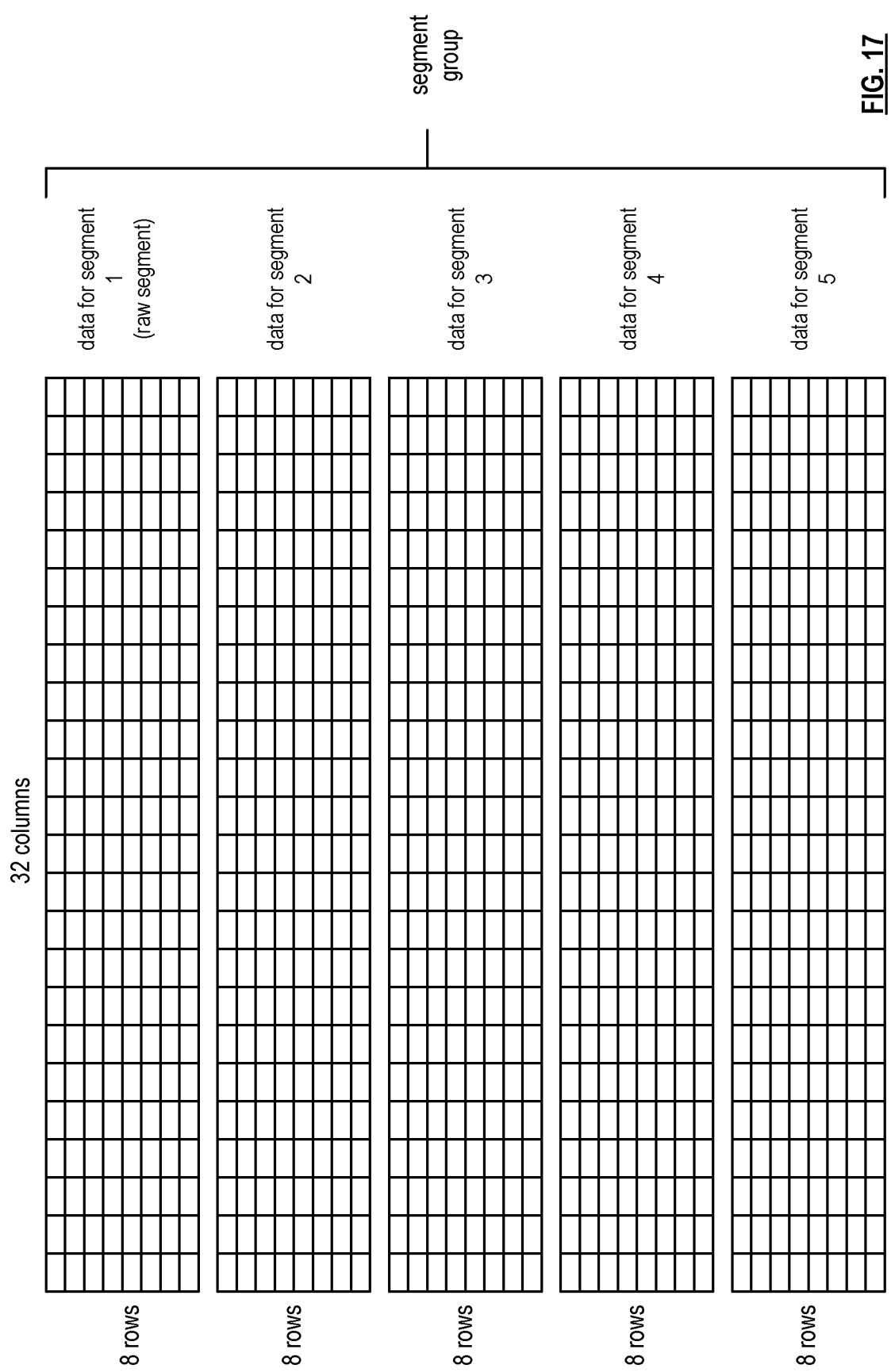

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
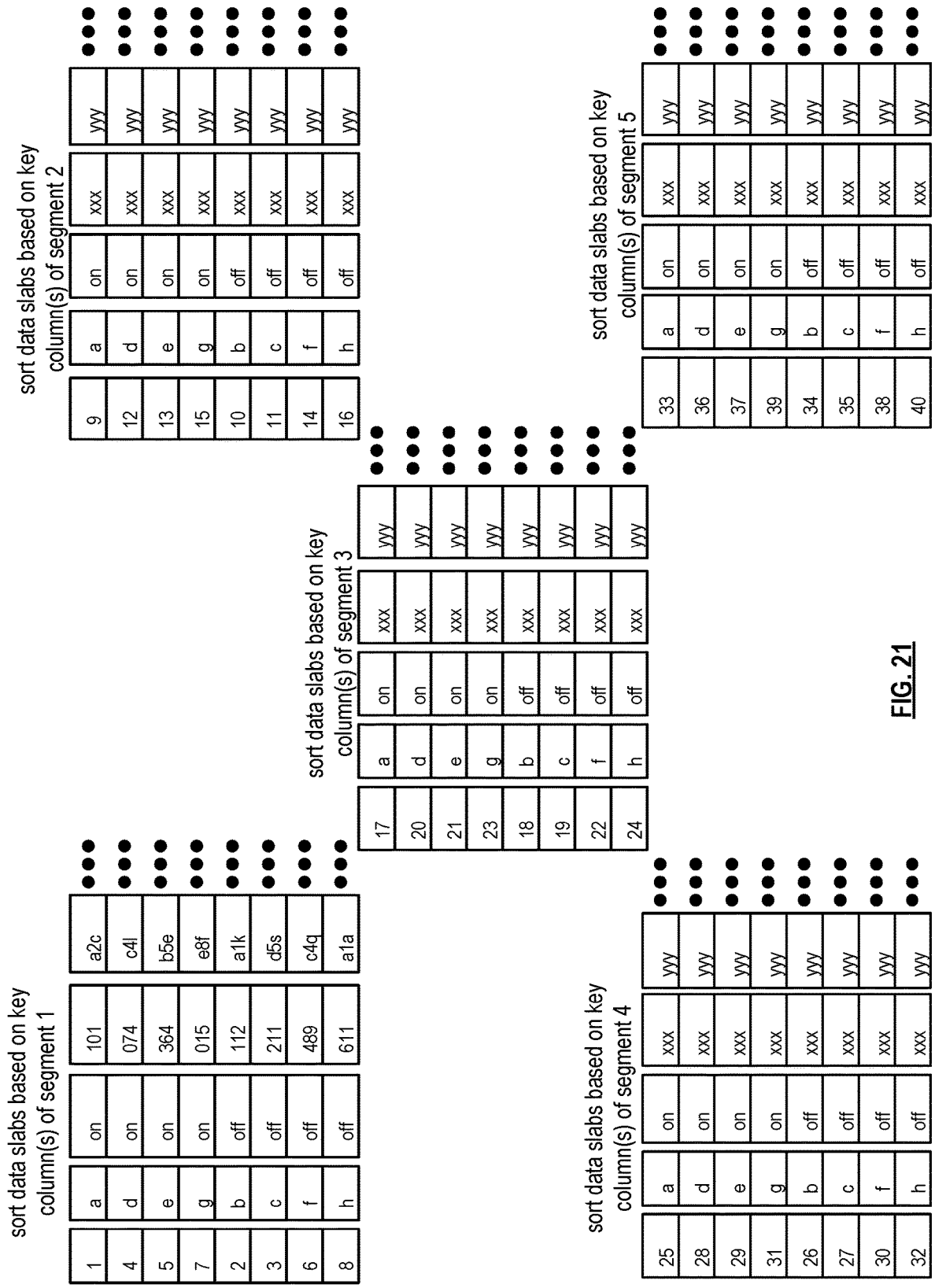

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
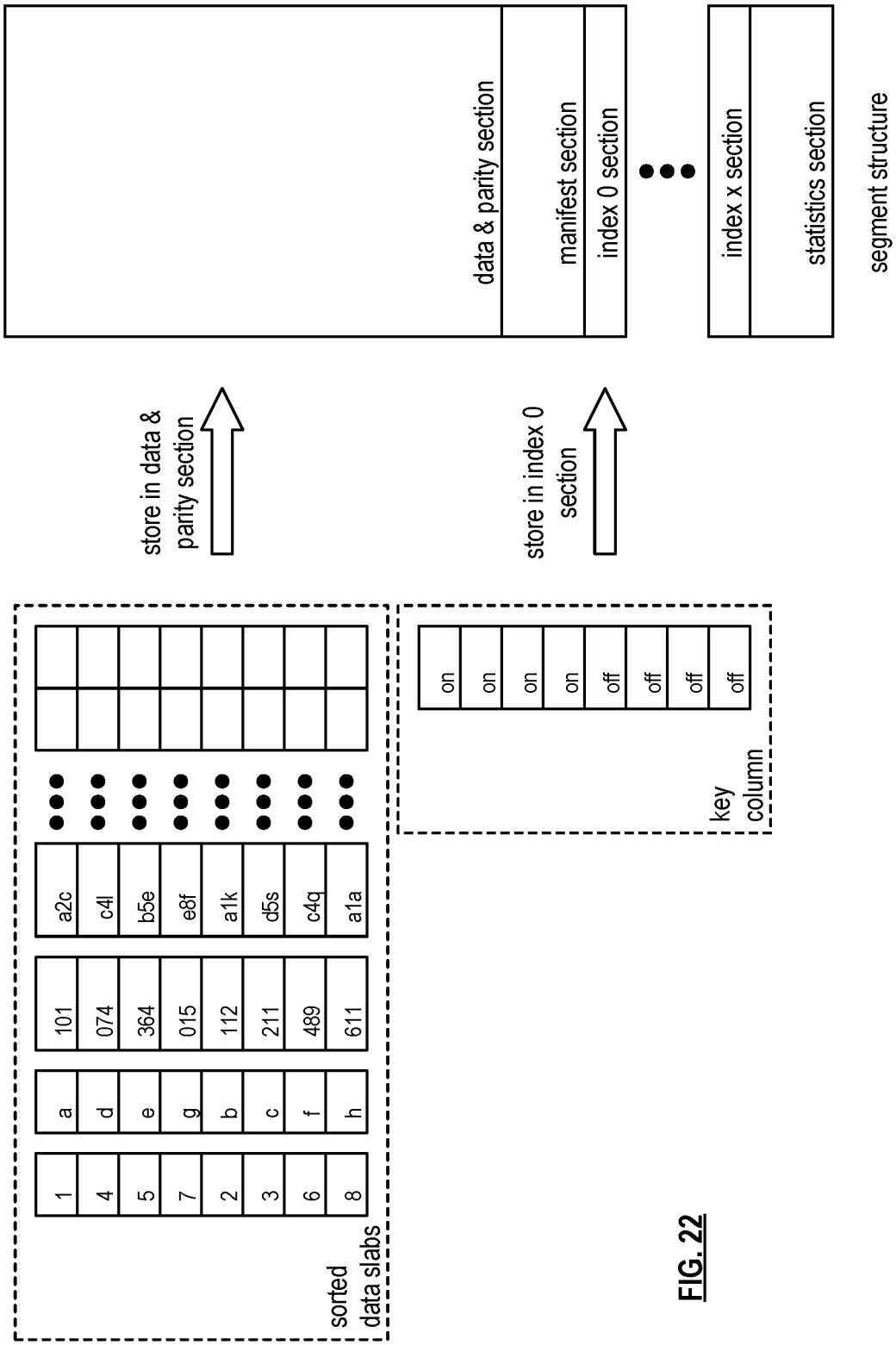

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
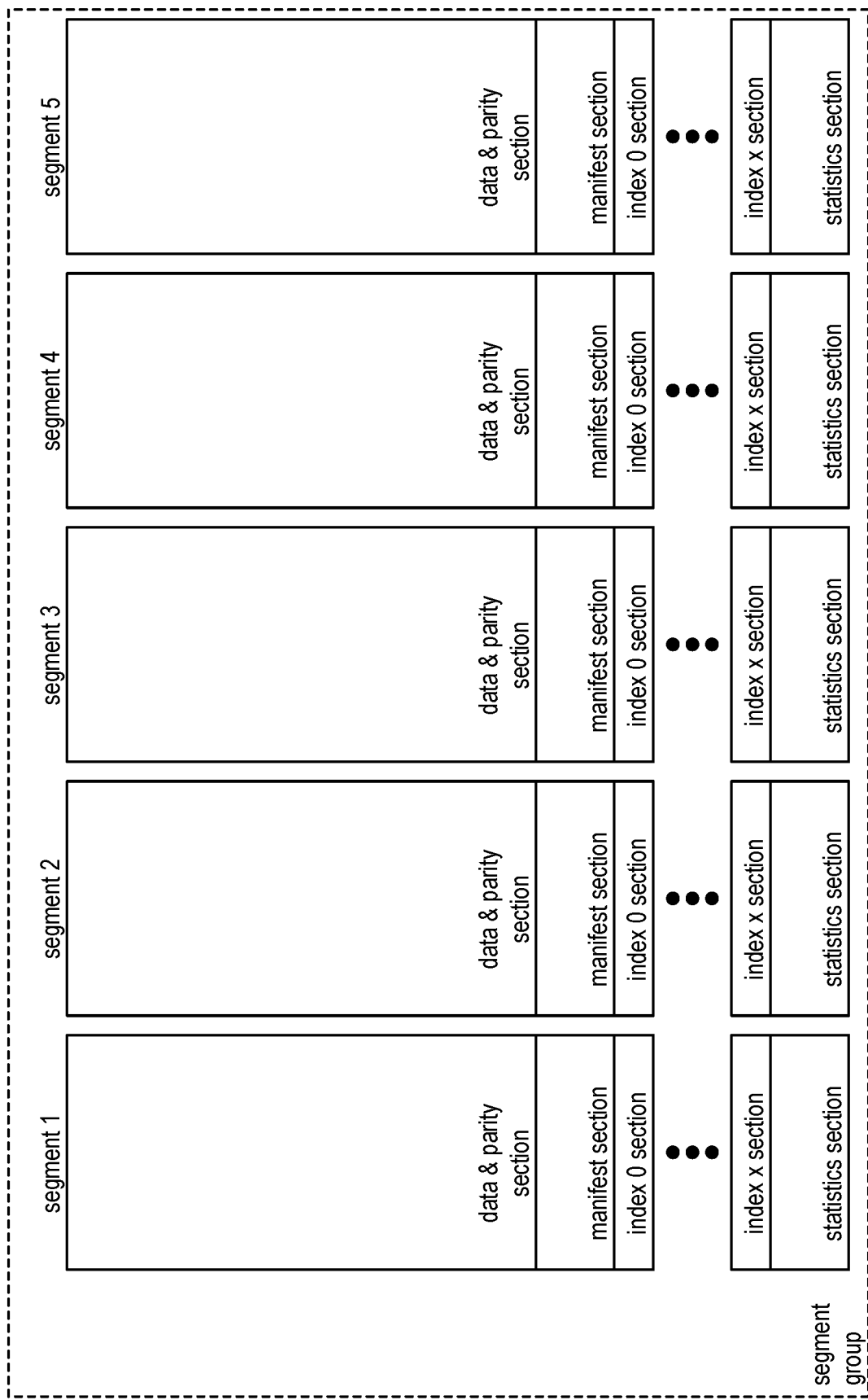

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
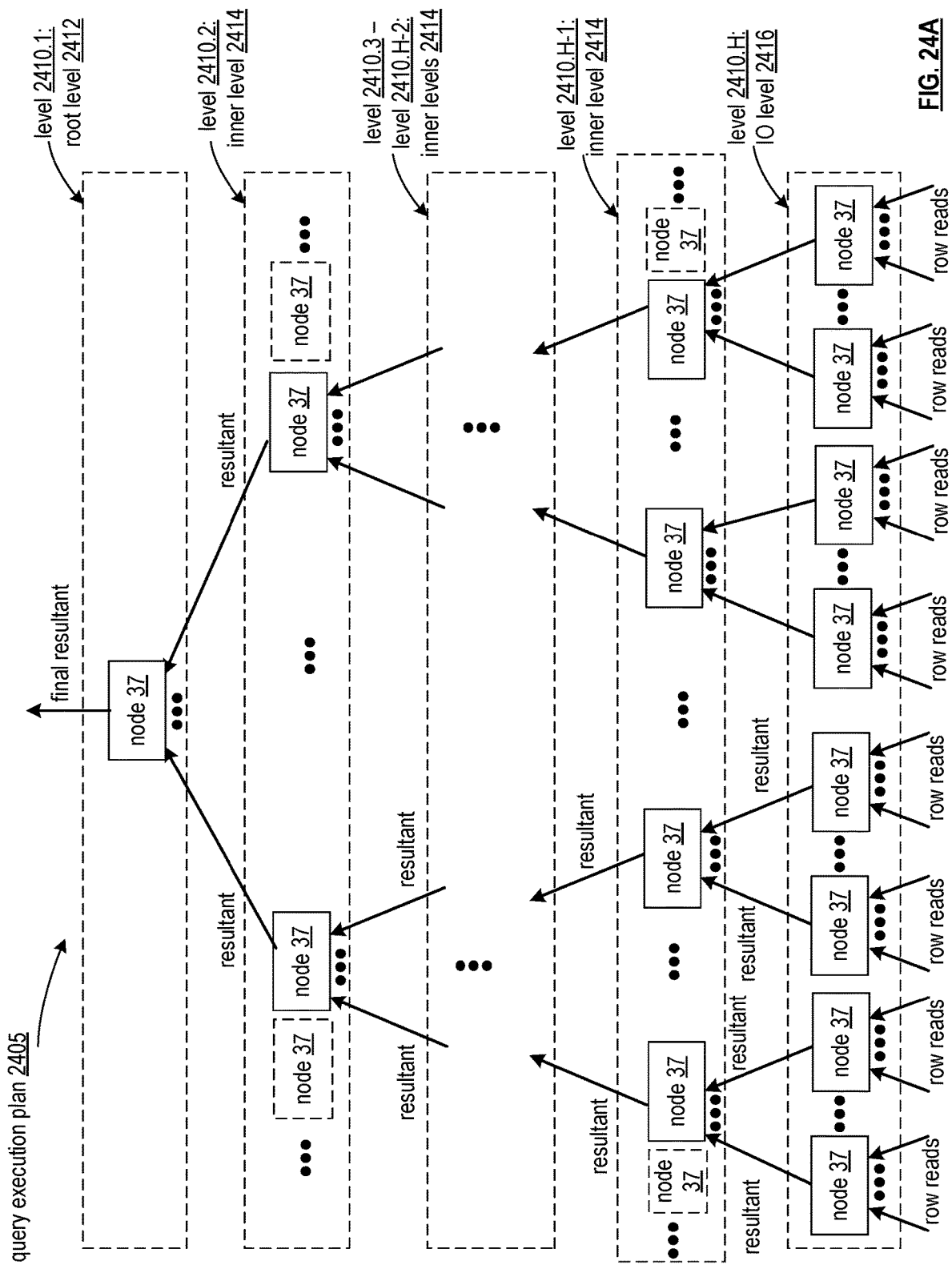
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
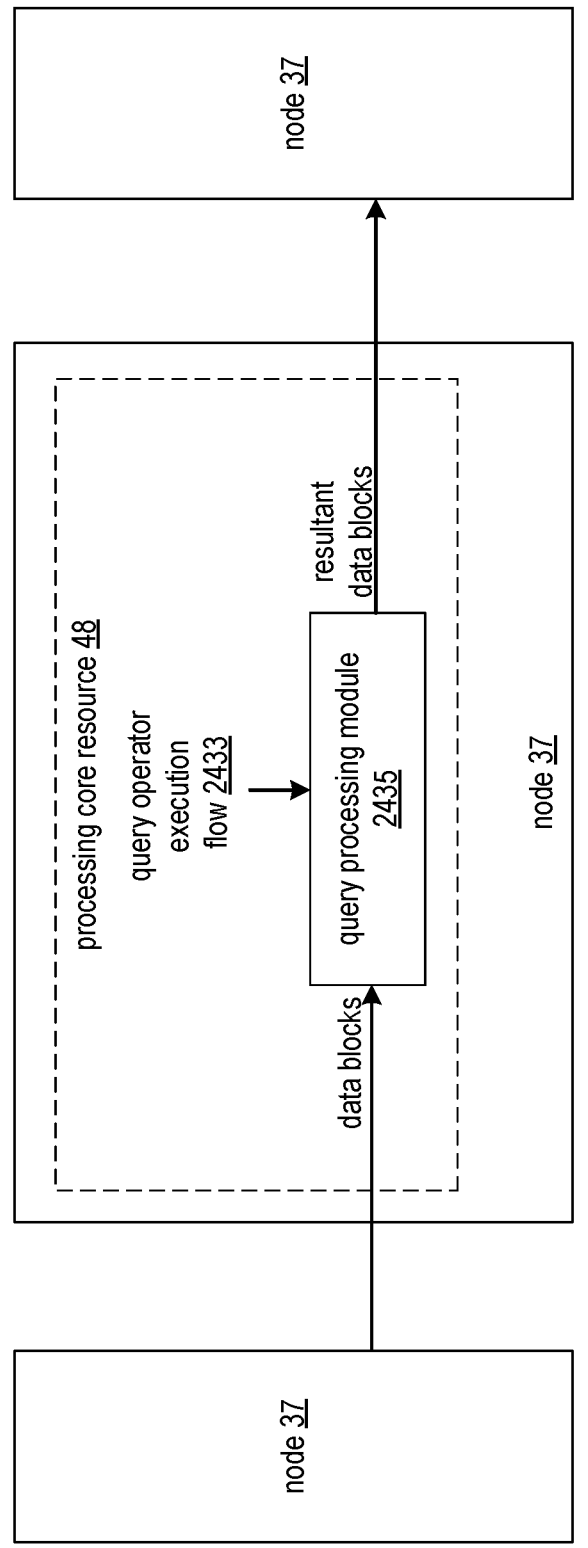
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
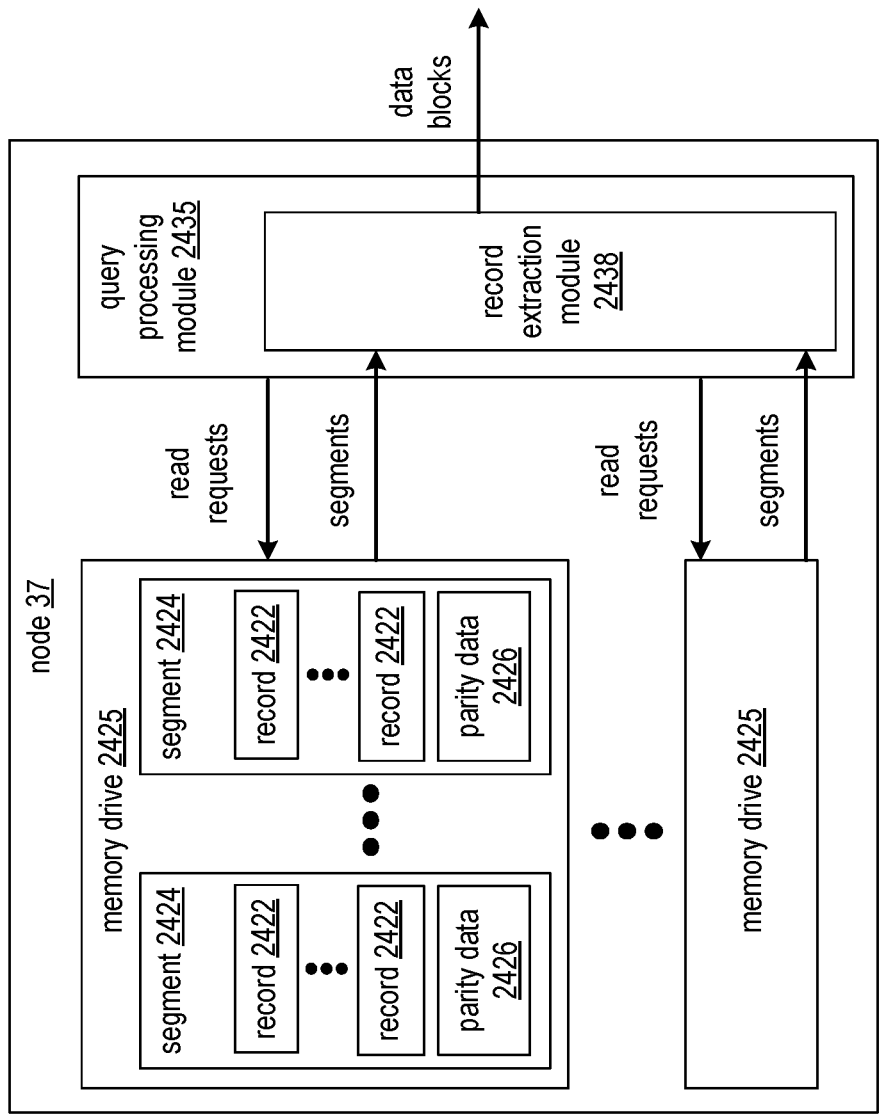
Figure 24D:
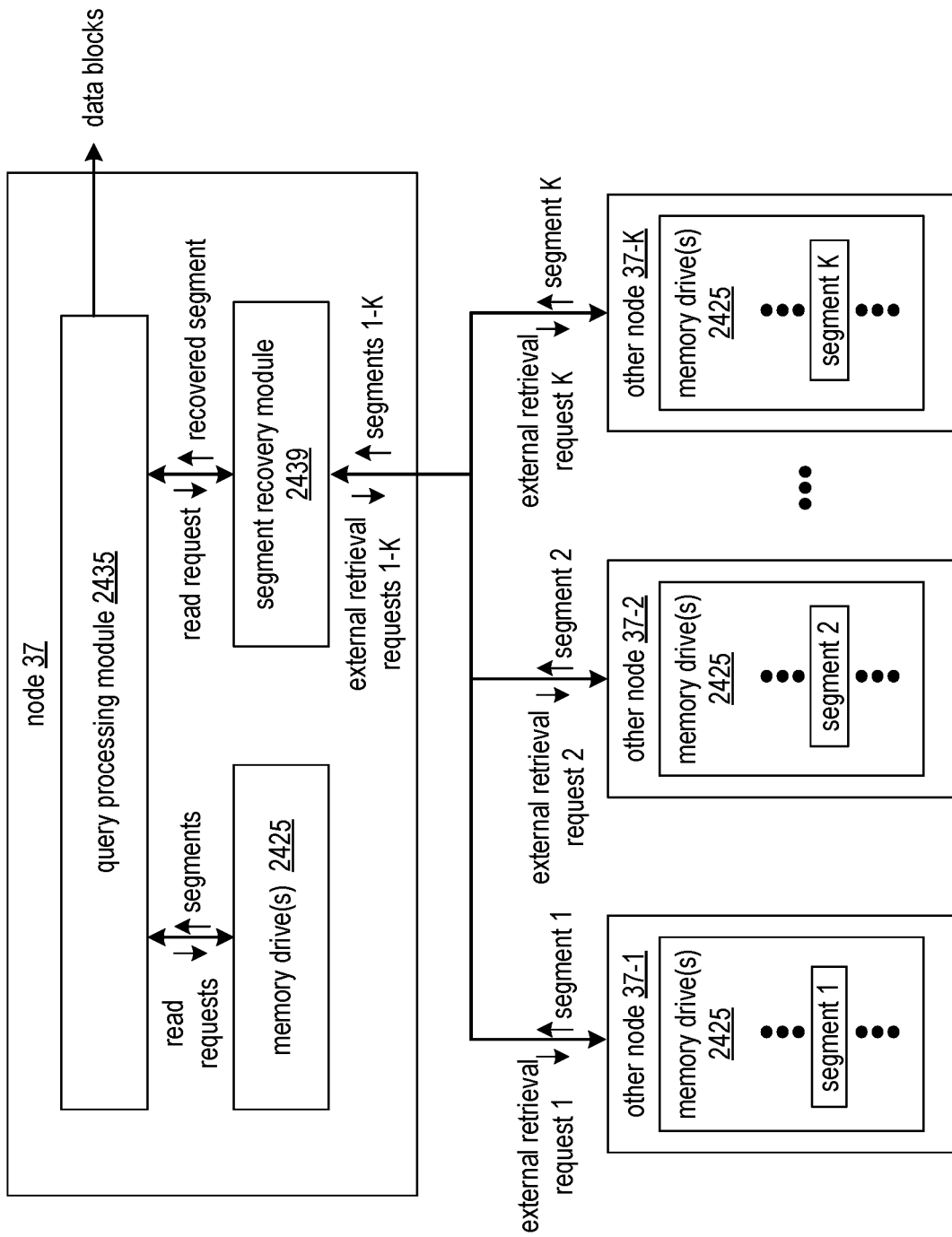

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIGS. 25A-29B present embodiments of a database system 10 that implements a segment indexing module 2510 to generate secondary index data 2545 for each given segment that includes a plurality of secondary indexes utilized in query executions. Unlike typical database systems, the embodiments of FIGS. 25A-29B present a per-segment secondary indexing strategy: rather than utilizing a common scheme across all segments storing records from a same database table and/or same dataset of records, different types of secondary indexes for different columns and/or in accordance with different secondary indexing schemes can be selected and generated for each given segment.

These different secondary indexing schemes are then utilized to efficiently accessing the records included in corresponding different segments in conjunction with performing query executions. For example, in order to support various index types, query predicates can be pushed down into the IO operator, where the operator guarantees to return all records that match the predicates it is given, regardless of whether it does a full table scan-and-filter or whether it is able to take advantage of deterministic or probabilistic indexes internally.

This can be advantageous in cases where, as large volumes of incoming data for a given dataset are received over long periods of time, the distribution of the data is not necessarily fixed or known at the onset of storing the corresponding rows and/or is not necessarily constant over time. Rather than applying a same secondary indexing scheme for all segments storing a table/set of rows, secondary indexes can be determined on a segment-by-segment basis, for example, based on changes in data distribution over time that causes different segments to have different local data distributions of values in their respective records. Supporting heterogeneous segments in this manner provides the flexibility needed in long-lived systems. This improves the technology of database systems by enabling improved IO efficiency for each individual segment, where data distribution changes over time are handled via selection of appropriate indexes for different groupings of data received over time.

As illustrated in FIG. 25A, a segment generator module 2506 can generate segments 2424 from one or more datasets 2502 of a plurality of records 2422 received all at once and/or received in a stream of incoming data over time. The segment generator module 2506 can be implemented via the parallelized data input sub-system 11 of FIG. 4, for example, by utilizing one or more ingress data sub-systems 25 and/or via the bulk data sub-system 23. The segment generator module 2506 can be optionally implemented via one or more computing devices 18 and/or via other processing and/or memory resources of the database system 10. The one or more datasets 2502 can be implemented as data sets 30 of FIG. 4.

The segment generator module 2506 can implement a row data clustering module 2507 to identify and segregate the dataset 2502 into different groups for inclusion in different segment groups and/or individual segments. Note that the segment generator module 2506 can implement a row data clustering module 2507 for generating segments from multiple different datasets with different types of records, records from different data sources, and/or records with different columns and/or schemas, where the records of different datasets are identify and segregated into different segment groups and/or individual segments, where different segments can be generated to include records from different datasets.

The row data clustering module 2507 can be implemented via one or more computing devices 18 and/or via other processing and/or memory resources of the database system 10. The row data clustering module can be implemented to generate segments from rows of records in a same or similar fashion discussed in conjunction with some or all of FIGS. 15-23. In some cases, the identification and segregating of the dataset 2502 into different groups for inclusion in different segment groups and/or individual segments is based on a cluster key, such as values of one or more predetermined columns of the dataset, where records 2422 with same and/or similar values of the one or more predetermined columns of the cluster key are selected for inclusion in a same segment, and/or where records 2422 with different and/or dissimilar values of the one or more predetermined columns of the cluster key are selected for inclusion in different segments.

Applying the segment generator module 2506 can include selecting and/or generating, for each segment being generated, segment row data 2505 that includes a subset of records 2422 of dataset 2502. Segment row data 2505 can be generated to include the subset of records 2422 of a corresponding segment in a column-based format. The segment row data 2505 can optionally be generated to include parity row data such as parity data 2426, where the segment row data 2505 is generated for each segment in a same segment group of multiple segments by applying a redundancy storage encoding scheme to the subset of records 2422 of segment row data 2505 selected for the segments in the segment group as discussed previously.

The segment generator module 2506 can further implement a segment indexing module 2510 that generates secondary indexing data 2545 for a given segment based on the segment row data 2505 of the given segment. The segment indexing module 2510 can optionally further generate indexing data corresponding to cluster keys and/or primary indexes of the segment row data 2505 of the given segment.

The segment indexing module 2510 can generate secondary indexing data 2545 for a given segment as a plurality of secondary indexes that are included in the given segment 2424 and/or are otherwise stored in conjunction with the given segment 2424. For example, the plurality of secondary indexes of a segment's secondary indexing data 2545 can be stored in one or more index sections 0-x of the segment as illustrated in FIG. 23.

The secondary indexing data 2545 of a given segment can include one or more sets of secondary indexes for one or more columns of the dataset 2502. The one or more columns of the secondary indexing data 2545 of a given segment can be different from a key column of the dataset 2502, can be different from a primary index of the segment, and/or can be different from the one or more columns of the clustering key utilized by the row data clustering module 2507 identify and segregate the dataset 2502 into different groups for inclusion in different segment groups and/or individual segments.

In some cases, the segment row data 2505 is formatted in accordance with a column-based format for inclusion in the segment. In some cases, the segment 2424 is generated with a layout in accordance with the secondary indexing data 2545, for example, where the segment row data 2505 is optionally formatted based on and/or in accordance with secondary indexing type of the secondary indexing data 2545. Different segments 2424 with secondary indexing data 2545 in accordance with different secondary indexing types can therefore be generated to include their segment row data 2505 in accordance with different layouts and/or formats.

As segment row data 2505 and secondary indexing data 2545 is generated in conjunction with generating corresponding segments 2424 over time from the dataset 2502, the segment row data 2505 and secondary indexing data 2545 are sent to a segment storage system 2508 for storage. The segment storage system 2508 can be implemented via one or more computing devices 18 of the database system and/or other memory resources of the database system 10. For example, the segment storage system 2508 can include a plurality of memory drives 2425 of a plurality of nodes 37 of the database system 10. Alternatively or in addition, the segment storage system 2508 can be implemented via computing devices 18 of one or more storage clusters 35. The segment generator module 2506 can send its generated segments to the segment storage system 2508 via system communication resources 14 and/or via other communication resources.

A query execution module 2504 can perform query execution of various queries over time, for example, based on query requests received from and/or generated by client devices, based on configuration information, and/or based on user input. This can include performing queries against the dataset 2502 by performing row reads to the records 2422 of the dataset 2502 included in various segments 2424 stored by the segment storage system 2508. The query execution module 2504 can be implemented by utilizing the parallelized query and results subsystem 13 of FIG. 5 and/or can be implemented via other processing and/or memory resources of the database system 10.

For example, the query execution module 2504 can perform query execution via a plurality of nodes 37 of a query execution plan 2405 as illustrated in FIG. 24A, where a set of nodes 37 at IO level 2416 include memory drives 2425 that implement the segment storage system 2508 and each store a proper subset of the set of segments 2424 stored by the segment storage system 2508, and where this set of nodes further implement the query execution module 2504 by performing row reads their respective stored segments as illustrated in FIG. 24C and/or by reconstructing segments from other segments in a same segment group as illustrated in FIG. 24D. The data blocks outputted by nodes 37 at IO level 2416 can include records 2422 and/or a filtered set of records 2422 as required by the query, where nodes 37 at one or more inner levels 2414 and/or root level 2412 further perform query operators in accordance with the query to render a query resultant generated by and outputted by a root level node 37 as discussed in conjunction with FIGS. 24A-24D.

The secondary indexing data 2545 of various segments can be accessed during query executions to enable more efficient row reads of records 2422 included in the segment row data 2505 of the various segments 2424. For example, in performing the row reads at the IO level 2416, the query execution module 2504 can access and utilize the secondary indexing data 2545 of one or more segment being read for the query to facilitate more efficient retrieval of records from segment row data 2505. In some cases, the secondary indexing data 2545 of a given segment enables selection of and/or filtering of rows required for execution of a query in accordance with query predicates or other filtering parameters of the query.

FIG. 25B illustrates an embodiment of the segment indexing module 2510. Some or all features and/or functionality of the segment indexing module 2510 of FIG. 25B can be utilized to implement the segment indexing module 2510 of FIG. 25A and/or any other embodiment of the segment indexing module 2510 discussed herein.

The segment indexing module 2510 can implement a secondary indexing scheme selection module 2530. To further improve efficiency in accessing records 2422 of various segments 2424 in conjunction with execution of various queries, different segments can have their secondary indexing data 2545 generated in accordance with different secondary indexing schemes, where the secondary indexing scheme is selected for a given segment to best improve and/or optimize the IO efficiency for that given segment.

In particular, the secondary indexing scheme selection module 2530 is implemented to determine the existence, utilized columns, type, and/or parameters of secondary indexes on a per-segment basis rather than globally. When a segment 2424 is generated and/or written, the secondary indexing scheme selection module 2530 generates secondary indexing scheme selection data 2532 by selecting which index strategies to employ for that segment. The secondary indexing scheme selection data 2532 can correspond to selection of a utilized columns, type, and/or parameters of secondary indexes of the given segments from a discrete and/or continuous set of options indicated in secondary indexing scheme option data 2531.

The selection of each segment's secondary indexing scheme selection data 2532 can be based on the corresponding segment row data 2505, such as local distribution data determined for the corresponding segment row data 2505 as discussed in conjunction with FIG. 25D. This selection can optionally be further based on other information generated automatically and/or configured via user input, such as the user-generated secondary indexing hint data and/or system-generated secondary indexing hint data discussed in conjunction with FIG. 26A.

The secondary indexing scheme selection data 2532 can indicate index types and/or parameters selected for each column. In some embodiments, the secondary indexing scheme selection data 2532 can indicate a revision of the secondary indexing scheme selection module 2530 used to determine the secondary indexing scheme selection data 2532.

The secondary indexing scheme selection data 2532 of a given segment can be utilized to generate corresponding secondary indexing data 2545 for the corresponding segment row data 2505 of the given segment 2424. The secondary indexing data 2545 of each segment is thus generated accordance with the columns, index type, and/or parameters for selected for secondary indexing of the segment by the secondary indexing scheme selection module 2530.

Some or all of the secondary indexing scheme selection data 2532 can be stored as segment layout description data that is mapped to the respective segment. The segment layout description data for each segment can be extractible to identify the index types and/or parameters for each column indexed for the segment, and/or to determine which version of the secondary indexing scheme selection module 2530 was utilized to generate the corresponding secondary indexing scheme selection data 2532. For example, the segment layout description data is stored and/or is extractible in accordance with a JSON format.

FIG. 25C illustrates an embodiment of the segment indexing module 2510. Some or all features and/or functionality of the segment indexing module 2510 of FIG. 25C can be utilized to implement the segment indexing module 2510 of FIG. 25B and/or any other embodiment of the segment indexing module 2510 discussed herein.

The discrete and/or continuous set of options indicated in secondary indexing scheme option data 2531 can include a plurality of indexing types 2532-1-2532-L. Each indexing type 2532-1-2532-L be applied to one column of the dataset 2502 and/or to a combination of multiple columns of the dataset 2502.

In some cases, the set of indexing types 2532-1-2532-L that can include one or more secondary index types utilized in database systems. In some cases, the set of indexing types 2532-1-2532-L includes one or more of the following index types:

Cluster Key (used in conjunction): When cluster key columns are used in conjunction with other columns, the cluster key index can be first used to limit the row range considered by other indexes.

Cluster Key (used in disjunction): When cluster key columns are used in a disjunction with other columns, they can be treated like other secondary indexes.

Inverted Index: This type can be implemented as a traditional inverted index mapping values to a list of rows containing that values Bitmap index: This type can be implemented as, logically, a |rows|x|column| bitmap where the bit at (R, C) indicates whether row R contains value C. This can be highly compressed.

Bitmap index with binning/Column imprint: This type can be implemented as a Bitmap index variant where each bit vector represents a value range, similar to a histogram bucket. This type can handle high-cardinality columns. When rows are also binned (by, for example, cache-line), this becomes a "column imprint."

Bloom filter: This type can be implemented as a probabilistic structure trading some false-positive rate for reduced index size. For example, a bloom filter where the bit at hashK (R . . . C) indicates whether row R may contain value C. In modeling, storing a small bloom filter corresponding to each logical block address (LBA) can have a good space/false-positive tradeoff and/or can eliminates hashing overhead by allowing the same hash values to be used when querying each LBA SuRF: This type can be implemented as a probabilistic structure, which can support a range of queries. This type can optionally be used to determine whether any value in a range exists in an LBA.

Projection index: This type can be implemented where a duplicate of a given column or column tuple is sorted differently than the cluster key. For example, a compound index on (foo DESC, bar ASC) would duplicate the contents of columns foo and bar as 4-tuples (foo value, bar value, foo row number, bar row number) sorted in the given order.

Data-backed "index": This type can be implemented to scan and filter an entire column, using its output as an index into non-index columns. In some cases, this type requires no changes to storage.

Filtering index/zonemaps (Min/max, discrete values): This type can be implemented as a small filtering index to short-circuit queries. For example, this type can include storing the min and max value or the set of distinct values for a column per-segment or per-block. In some cases, this type is only appropriate when a segment or block contains a small subset of the total value range.

Composite index: This type can be implemented to combines one or more indexes for a single column, such as one or more index types of the set of index type options. For example, a block-level probabilistic index is combined with a data-backed index for a given column.

This set of columns to which some or all of the plurality of indexing types 2532-1-2532-L can be selected for application can be indicated in the secondary indexing scheme option data 2531 as dataset schema data 2514, indicating the set of columns 2512-1-2512-C of the dataset 2502 and optionally indicating the datatype of each of the set of columns 2512-1-2512-C. Different datasets 2502 can have different dataset schema data 2514 based on having records that include different sets of data and/or types of data in accordance with different sets of columns.

One or more of the plurality of indexing types 2532-1-2532-L can be further configurable via one or more configurable parameters 2534. Different ones of the plurality of indexing types 2532-1-2532-L can have different sets of and/or numbers of configurable parameters 2534-1-2534-R, based on the parameters that are appropriate to the corresponding indexing type. In some cases, at least one of the configurable parameters 2534 can have its corresponding one or more values selected from a continuous set of values and/or options. In some cases, at least one of the configurable parameters 2534 can have its corresponding one or more values selected from a discrete set of values and/or options. Ranges, sets of valid options, and/or other constraints to the configurable parameters 2534 of some or all of the more of the plurality of indexing types 2533 can be indicated in the secondary indexing scheme option data 2531.

The secondary indexing scheme selection module 2530 can determine which columns of the set of columns 2512-1-2512-C will be indexed via secondary indexes for the segment row data 2505 of a given segment by selecting a set of selected columns 2513-1-2513-D as a subset of the set of columns set of columns 2512-1-2512-C. This can include selecting a proper subset of the set of columns 1-C. This can include selecting none of the columns 1-C. This can include selection all of the columns 1-C. The selected columns 2513-1-2513-D for the given segment can be indicated in the resulting secondary indexing scheme selection data 2532. Different sets of selected columns 2513-1-2513-D and/or different numbers of selected columns 2513-1-2513-D can be selected by the secondary indexing scheme selection module 2530 for different segments.

The secondary indexing scheme selection module 2530 can further determine which one of more of the set of indexing types 2532-1-2532-L will be utilized for each selected column 2513-1-2513-D. In this example, selected indexing type 2533-1 is selected from the set of indexing types 2532-1-2532-L to index selected column 2513-1, and selected indexing type 2533-D is selected from the set of indexing types 2532-1-2532-L to index selected column 2513-D.

For a given column selected to be indexed, a single index type can be selected for indexing the column, as illustrated in this example. In some cases, multiple different index types are optionally selected for indexing the column of a given segment, where a plurality of indexes are generated for the column for each of the multiple different index types.

For a given segment, different selected columns can have same or different ones of the set of indexing types 2532-1-2532-L selected. For example, for a given segment, a first indexing type is selected for indexing a first column of the dataset, and a second indexing type is selected for indexing a second column of the dataset.

Different segments with the same set of selected columns 2513-1-2513-D can have the same or different ones of the set of indexing types 2532-1-2532-L selected for the same column. For example, a particular column is selected to be indexed for both a first segment and a second segment. A first one of the set of indexing types 2532-1-2532-L is selected to index the particular column for the first segment, and a second one of the set of indexing types 2532-1-2532-L is selected to index the particular column for the second segment. As a particular example, a bloom filter is selected to index the particular column for the first segment, and a b-tree is selected to index the given column for the second segment.

The secondary indexing scheme selection module 2530 can further configure the parameters of each selected indexing type 2533-1-2533-D. This can include selecting, for each selected indexing type 2533, a set of one or more selected parameters 2535-1-2535-R, where each selected parameter 2535 is a selected value and/or option for the corresponding configurable parameter 2534 of the corresponding indexing type 2533.

For a given segment, different selected columns can have same ones of the set of indexing types 2532-1-2532-L selected with the same or different selected parameters. For example, for a given segment, a particular indexing type is selected for indexing a first column of the dataset with a first set of selected parameters 2535-1-2535-R, and the same particular indexing type is selected for indexing a second column of the dataset with a second set of selected parameters 2535-1-2535-R with value that are different from the first set of selected parameters 2535-1-2535-R.

Different segments with the same set of selected indexing types 2533-1-2533-D for the same set of selected columns 2513-1-2513-D with the same or different selected parameters. For example, a particular column is selected to be indexed for both a first segment and a second segment via a particular indexing type. A first set of selected parameters 2535-1-2535-R are selected for indexing the particular column via the particular indexing type for the first segment, and a different, second set of selected parameters 2535-1-2535-R are selected for indexing the particular column via the particular indexing type for the second segment.

In some cases, none of the parameters of a given selected indexing type 2533 are configurable, and no parameters values are selected for the given selected indexing type 2533. For example, this given selected indexing type 2533 is applied by the secondary index generator module 2540 to generate the plurality of indexes in accordance with predetermined parameters of the selected indexing type 2533.

FIG. 25D illustrates another embodiment of the segment indexing module 2510. Some or all features and/or functionality of the segment indexing module 2510 of FIG. 25D can be utilized to implement the segment indexing module 2510 of FIG. 25B and/or any other embodiment of the segment indexing module 2510 discussed herein.

As illustrated in FIG. 25D, local distribution data 2542 can be generated for each segment row data 2505 via a local distribution data generator 2541. The secondary indexing scheme selection module 2530 generates the secondary indexing scheme selection data 2532 for a given segment based on the local distribution data 2542 of the given segment. Different segments 2424 can thus have different secondary indexing scheme selection data 2532 based on having different local distribution data 2542.

As a result, it can be normal for different segments of the same dataset 2502, such as a same database table, to have secondary index data in accordance with different columns of the dataset, different index types, and/or parameters. Furthermore, it can be advantageous for different segments of the same dataset 2502, such as a same database table, to have different secondary index data when these different segments have different local distribution data. In particular, the different secondary indexing scheme employed for different segments can be selected by the secondary indexing scheme selection module 2530 to leverage particular aspects of their respective local distribution data to improve IO efficiency during row reads.

The local distribution data for given segment row data 2505 can indicate the range, mean, variance, histogram data, probability density function data, and/or other distribution information for values of one or more columns in the set of records included in the given segment row data 2505. The local distribution data for given segment row data 2505 can indicate column cardinality, column range, and/or column distribution of one or more columns of the dataset for records 2422 included in the given segment row data 2505. The local distribution data for given segment row data 2505 can be optionally generated based on sampling only a subset of values included in records of the segment row data 2505, where the local distribution data is optionally probabilistic and/or statistical information. The local distribution data for given segment row data 2505 can be optionally generated based on sampling all values included in records of the segment row data 2505, where the local distribution data indicates the true distribution of the records in the segment. The local distribution data for given segment row data 2505 can optionally be generated as some or all of the statistics section of the corresponding segment, for example, as illustrated in FIGS. 22 and 23.

In some cases, the secondary indexing scheme selection module 2530 can generate the secondary indexing scheme selection data 2532 by performing one or more heuristic functions and/or optimizations. In particular, the selected columns, corresponding selected indexing types, and/or corresponding selected parameters can be selected for a given segment by performing the performing one or more heuristic functions and/or optimizations. The one or more heuristic functions and/or optimizations can generate the secondary indexing scheme selection data 2532 as functions of: the segment row data 2505 for the given segment; local distribution data 2542 determined for the segment row data 2505 for the given segment; user-generated secondary indexing hint data, system-generated secondary indexing hint data, and/or other information.

The one or more heuristic functions and/or optimizations can be configured via user input, can be received from a client device or other computing device, can be automatically generated, and/or can be otherwise determined. For example, a user or administrator can configure the more heuristic functions and/or optimizations via administrative sub-system 15 and/or configuration sub-system 16.

In cases where the one or more heuristic functions and/or optimizations are configured, the one or more heuristic functions and/or optimizations can optionally change over time, for example, based on new heuristic functions and/or optimization functions being introduced and/or based existing heuristic functions and/or optimization functions being modified. In such cases, newer segments generated from more recently received data of the dataset 2502 can have secondary indexing scheme selection data 2532 generated based on applying the more recently updated heuristic functions and/or optimization functions, while older segments generated from older received data of the dataset 2502 can have secondary indexing scheme selection data 2532 generated based on prior versions of heuristic functions and/or optimization functions. In some cases, one or more older segments can optionally be identified for re-indexing by applying the more recently updated heuristic functions and/or optimization functions to generate new secondary indexing scheme selection data 2532 for these older segments, for example, based on application of these more recently updated heuristic functions and/or optimization functions rendering secondary indexing scheme selection data 2532 with more efficient row reads to these one or more older segments. Such embodiments are discussed in further detail in conjunction with FIGS. 27A-27C.

The secondary index generator module 2540 can generate indexes for a given segment by indexing each selected column 2513 indicated in the secondary indexing scheme selection data 2532 for the given segment in accordance with the corresponding selected indexing type 2533 indicated in the secondary indexing scheme selection data 2532 for the given segment, and/or in accordance with the parameter selections 2535-1-2535-R indicated in the secondary indexing scheme selection data 2532 for the corresponding selected indexing type 2533. In this example, as D selected columns are indicated to be indexed via selected indexing types 2533-1-2533-D, D sets of secondary indexes 2546-1-2546-D are thus generated via the secondary index generator module. Each set of secondary indexes 2546 indexes the corresponding selected column 2513 via the corresponding selected indexing type 2533 in accordance with the corresponding parameter selections 2535-1-2535-R.

Some or all of the secondary indexing scheme option data 2531 can be configured via user input, can be received from a client device or other computing device, can be automatically generated, and/or can be otherwise determined. For example, a user or administrator can configure the secondary indexing scheme option data 2531 via administrative sub-system 15 and/or configuration sub-system 16.

In cases where the secondary indexing scheme option data 2531 is configured, the secondary indexing scheme option data 2531 can optionally change over time, for example, based on new indexing types being introduced and/or based on the query execution module 2504 being updated to enable access and use of to these new indexing types during row reads of query executions.

In such cases, newer segments generated from more recently received data of the dataset 2502 may have columns indexed via these newer indexing types based on these newer indexing types being available as valid options indicated in the secondary indexing scheme option data 2531 when these newer segments were indexed. Meanwhile, older segments generated from older received data of the dataset 2502 may have columns indexed via these newer indexing types because they were not yet valid options of the secondary indexing scheme option data 2531 when these older segments were indexed. In some cases, one or more older segments can optionally be identified for re-indexing via these newer indexing types, for example, based on a newly available indexing type being more efficient for IO of these one or more older segments. Such embodiments are discussed in further detail in conjunction with FIGS. 27A-27C.

In some embodiments, the selection and use of various secondary indexing schemes for various segments can be communicated to end-users and/or administrators of the database system 10. For example, an interactive interface displayed on a display device of a client device communicating with the database system 10 can enable users to create a new table as a new dataset 250 and/or add a column to an existing table; display and/or select whether that a secondary indexing scheme will improve performance for a given query profile; and/or add a new secondary indexing scheme as a new option in the secondary indexing scheme option data. In some cases, for a newly added secondary indexing scheme some or all future segments generated will include secondary indexes on the specified columns where appropriate; some or all future queries that can make use of this index will do so on the segments that contain the new secondary indexing scheme; the number of segments that contain this secondary indexing scheme can be displayed to the end-user. In some embodiments, secondary indexing schemes that are no longer needed can be dropped from consideration as options for future segments.

In various embodiments, a segment indexing module includes at least one processor; and a memory that stores operational instructions. The operational instructions, when executed by the at least one processor, cause the segment indexing module to select a first secondary indexing scheme for a first segment that includes a first plurality of rows from a plurality of secondary indexing options. A first plurality of secondary indexes for the first segment is generated in accordance with the first secondary indexing scheme. The first segment and the secondary indexes for the first segment are stored in memory. A second secondary indexing scheme is selected for a second segment that includes a second plurality of rows from the plurality of secondary indexing options, where the second secondary indexing scheme is different from the first secondary indexing scheme. A second plurality of secondary indexes for the second segment is generated in accordance with the second secondary indexing scheme. The second segment and the secondary indexes for the second segment are stored in memory.

FIG. 25E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25E. In particular, a node 37 can utilize the query processing module 2435 to execute some or all of the steps of FIG. 25E, where multiple nodes 37 implement their own query processing modules 2435 to independently execute the steps of FIG. 25E, for example, to facilitate execution of a query as participants in a query execution plan 2405. Some or all of the method of FIG. 25E can be performed by the segment generator module 2506. In particular, some or all of the method of FIG. 25E can be performed by a secondary indexing scheme selection module 2530 and/or a secondary index generator module 2540 of a segment indexing module 2510. Some or all of the method of FIG. 25E can be performed via communication with and/or access to a segment storage system 2508, such as memory drives 2425 of one or more nodes 37. Some or all of the method of FIG. 25E can be performed via a query execution module 2504. Some or all of the steps of FIG. 25E can optionally be performed by any other processing module of the database system 10. Some or all of the steps of FIG. 25E can be performed to implement some or all of the functionality of the segment indexing module 2510 as described in conjunction with FIGS. 25A-25D. Some or all of the steps of FIG. 25E can be performed to implement some or all of the functionality regarding execution of a query via the plurality of nodes in the query execution plan 2405 as described in conjunction with FIGS. 24A-24E. Some or all steps of FIG. 25E can be performed by database system 10 in accordance with other embodiments of the database system 10 and/or nodes 37 discussed herein.

Step 2582 includes generating a first segment that includes a first subset of a plurality of rows of a dataset. Step 2584 includes selecting a first secondary indexing scheme for the first segment from a plurality of secondary indexing options. Step 2586 includes generating a first plurality of secondary indexes for the first segment in accordance with the first secondary indexing scheme. Step 2588 includes storing the first segment and the secondary indexes for the first segment in memory.

Step 2590 includes generating a second segment that includes a second subset of the plurality of rows of the dataset. Step 2592 includes selecting a second secondary indexing scheme for the second segment from a plurality of secondary indexing options. Step 2594 includes generating a second plurality of secondary indexes for the second segment in accordance with the second secondary indexing scheme. Step 2596 includes storing the second segment and the secondary indexes for the second segment in memory. Step 2598 includes facilitating execution of a query against the dataset by utilizing the first plurality of secondary indexes to read at least one row from the first segment and utilizing the second plurality of secondary indexes to read at least one row from the second segment.

In various embodiments, the first segment and the second segment are generated by a segment generator module 2506. In particular, the first segment and the second segment can be generated by utilizing a row data clustering module 2507, and/or the first segment and the second segment are generated as discussed in conjunction with FIGS. 15-23. The first segment can include first segment row data 2505 that includes a first plurality of records 2422 of a dataset 2502, and/or the second segment can include second segment row data 2505 that includes a second plurality of records 2422 of the dataset 2502. For example, the segment row data 2505 for each segment is generated from the corresponding plurality of records 2422 in conjunction with a column-based format. The first segment and second segment can be included in a plurality of segments a plurality of segments generated to each include distinct subsets of a plurality of rows, such as records 2422, of the dataset.

In various embodiments, the method includes generating first local distribution information for the first segment, where the first secondary indexing scheme is selected for the first segment from a plurality of secondary indexing options based on the first local distribution information. The method can further include generating second local distribution information for the second segment, where the second secondary indexing scheme is selected for the second segment from a plurality of secondary indexing options based on the second local distribution information, and where the second secondary indexing scheme is different from the first secondary indexing scheme based on the second local distribution information being different from the first local distribution information.

In various embodiments, the plurality of secondary indexing options includes a set of secondary indexing options corresponding to different subsets of a set of columns of the database table. The first secondary indexing scheme can include indexing a first subset of the set of columns, the second secondary indexing scheme can include indexing a second subset of the set of columns, and a set difference between the first subset and the second subset can be non-null.

In various embodiments, the plurality of secondary indexing options includes a set of secondary indexing types that includes at least one of: a bloom filter, a projection index, a data-backed index, a filtering index, a composite index, a zone map, a bit map, or a B-tree. The first secondary indexing scheme can include generating the first plurality of indexes in accordance with a first one of the set of secondary indexing types, and the secondary indexing scheme includes generating the second plurality of indexes in accordance with a second one of the set of secondary indexing types.

In various embodiments, the plurality of secondary indexing options includes a set of secondary indexing types. A first one of the secondary indexing types can include a first set of configurable parameters. Selecting the first secondary indexing scheme can include selecting the first one of the set of secondary indexing types and/or can include further selecting first parameter selections for each of the first set of configurable parameters for the first one of the set of secondary indexing types. Selecting the second secondary indexing scheme can include selecting the first one of the set of secondary indexing types and/or can include further selecting second parameter selections for each of the first set of configurable parameters for the first one of the set of secondary indexing types. The second parameter selection can be different from the first parameter selections.

In various embodiments, the first plurality of secondary indexes is different from a plurality of primary indexes of the first segment. The second plurality of secondary indexes can be different from a plurality of primary indexes of the second segment.

In various embodiments, the first segment is generated in a first temporal period, and the second segment is generated in a second temporal period that is after the first temporal period. After the first temporal period and prior to the second temporal period, the method can include updating the plurality of secondary indexing options to include a new secondary indexing option. The second secondary indexing scheme can be different from the first secondary indexing scheme based on the secondary indexing scheme being selected as the new secondary indexing option.

In various embodiments, selecting the first secondary indexing scheme for the first segment from the plurality of secondary indexing options can be based on first local distribution information corresponding to the first segment, user-provided hint data, and/or system-provided hint data. Selecting the second secondary indexing scheme for the second segment from the plurality of secondary indexing options can be based on second local distribution information corresponding to the second segment, user-provided hint data, and/or system-provided hint data.

In various embodiments, a non-transitory computer readable storage medium includes at least one memory section that stores operational instructions that, when executed by a processing module that includes a processor and a memory, causes the processing module to: generate a first segment that includes a first subset of a plurality of rows of a dataset; select a first secondary indexing scheme for the first segment from a plurality of secondary indexing options; generate a first plurality of secondary indexes for the first segment in accordance with the first secondary indexing scheme; store the first segment and the secondary indexes for the first segment in memory; generate a second segment that includes a second subset of the plurality of rows of the dataset; select a second secondary indexing scheme for the second segment from the plurality of secondary indexing options, wherein the second secondary indexing scheme is different from the first secondary indexing scheme; generate a second plurality of secondary indexes for the second segment in accordance with the second secondary indexing scheme; store the second segment and the secondary indexes for the second segment in memory; and/or facilitate execution of a query against the dataset by utilizing the first plurality of secondary indexes to read at least one row from the first segment and utilizing the second plurality of secondary indexes to read at least one row from the second segment.

FIG. 26A presents an embodiment of a segment indexing module 2510. Some or all features and/or functionality of the segment indexing module 2510 of FIG. 26A can be utilized to implement the segment indexing module 2510 of FIG. 25B and/or any other embodiment of the segment indexing module 2510 discussed herein.

As discussed in conjunction with FIG. 25D, the secondary indexing scheme selection module 2530 can generate secondary indexing scheme selection data for each given segment as selections of one or more indexing schemes from a set of options indicated in secondary indexing scheme option data 2531, based on each given segment's local distribution data 2542. As illustrated in FIG. 26A, generating the secondary indexing scheme selection data for each given segment can alternatively or additionally be based on user-generated secondary indexing hint data 2620 and/or system-generated secondary indexing hint data 2630.

Unlike the local distribution data 2542 which is determined for each segment individually, the user-generated secondary indexing hint data 2620 and/or system-generated secondary indexing hint data 2630 can apply to the dataset 2502 as a whole, where same user-generated secondary indexing hint data 2620 and/or system-generated secondary indexing hint data 2630 is utilized by the secondary indexing scheme selection module 2530 to generate secondary indexing scheme selection data 2532 for many different segments with segment row data 2505 from the dataset 2502.

In some cases, only user-generated secondary indexing hint data 2620 is determined and utilized by the secondary indexing scheme selection module 2530, where system-generated secondary indexing hint data 2630 is not utilized. In some cases, only system-generated secondary indexing hint data 2630 is determined and utilized by the secondary indexing scheme selection module 2530, where user-generated secondary indexing hint data 2620 is not utilized.

The user-generated secondary indexing hint data 2620 can be configured via user input, can be received from a client device or other computing device, and/or can be otherwise determined. As illustrated in FIG. 26A, the user-generated secondary indexing hint data 2620 can be generated by a client device 2601 communicating with the database system 10. For example, a user or administrator can configure the user-generated secondary indexing hint data 2620 via administrative sub-system 15 and/or configuration sub-system 16, where client device 2601 communicates with and/or is implemented in conjunction with administrative sub-system 15 and/or configuration sub-system 16. The client device 2601 can be implemented as a computing device 18 and/or any other device that includes processing resources, memory resources, a display device, and/or a user input device.

The client device 2601 can generate the user-generated secondary indexing hint data 2620 based on user input to an interactive interface 2650. The interactive interface can display one or more prompts for a user to enter the user-generated secondary indexing hint data 2620 for the dataset 2502. For example, the interactive interface is displayed and/or the user-generated secondary indexing hint data 2620 is generated by the client device 2601 in conjunction with execution of application data associated with the database system 10 that is received by the client device 2601 and/or stored in memory of the client device 2601 for execution by the client device 2601. As another example, the interactive interface is displayed in conjunction with a browser application associated with the database system 10 and accessed by the client device 2601 via a network.

The user-generated secondary indexing hint data 2620 can indicate information provided by the user regarding: known and/or predicted trends of the data in dataset 2502; known and/or predicted trends of the queries that will be performed upon the dataset 2502; and/or other information that can be useful in selecting secondary indexing schemes for segments storing data of the dataset that will render efficient row reads during query executions. In particular, user-generated secondary indexing hint data 2620 can indicate: "add-column-like" information and/or other information indicating an ordered or unordered list of columns that are known and/or expected to be commonly queried together; a known and/or expected probability value and/or relative likelihood for some or all columns to appear in a query predicate; a known and/or estimated probability value and/or relative likelihood for some or all columns to appear in one or more particular types of query predicates, such as equality-based predicates and/or range-based predicates; a known and/or estimated column cardinality of one or more columns; a known and/or estimated column distribution of one or more columns; a known and/or estimated numerical range of one or more columns; a known and/or estimated date or time-like behavior of one or more columns; and/or other information regarding the dataset 2502 and/or queries to be performed against the dataset 2502.

These user insights regarding the dataset 2502 and/or queries that will be performed against the dataset 2502 indicated in user-generated secondary indexing hint data 2620 can improve the performance of secondary indexing scheme selection module 2530 in generating secondary indexing scheme selection data 2532 that will render efficient row reads during query executions. These insights can be particular useful if the entirety of the dataset 2502 has not been received, for example, where the dataset 2502 is a stream of records that is received over a lengthy period of time, and thus distribution information for the dataset 2502 is unknown. This improves database systems by enabling intelligent selection of secondary indexing schemes based on user-provided distribution characteristics of the dataset when this information would otherwise be unknown.

These insights can also be useful in identifying which types of queries will be commonly performed and/or most important to end users, which further improves database systems by ensuring the selection of secondary indexing schemes for indexing of segments is relevant to the types of queries that will be performed. For example, this can help ensure that secondary indexing schemes that leverage these types of queries are selected for use to best improve IO efficiency based on the user-generated secondary indexing hint data 2620 indicating types of queries will be performed frequently. This helps ensure that other secondary indexing schemes that would rarely be useful in improving IO efficiency are thus not selected due to the user-generated secondary indexing hint data 2620 indicating types of query predicates that enable use of these secondary indexing schemes not being expected to be included in queries.

In some cases, the user-generated secondary indexing hint data 2620 does not include any selection of secondary indexing schemes to be utilized on some or all segments of the dataset 2502. In particular, the user-generated secondary indexing hint data 2620 can be implemented to serve as suggestions and/or added insight that can optionally be ignored by the secondary indexing scheme selection module 2530 in generating secondary indexing scheme selection data 2532. In particular, rather than enabling users to simply dictate which secondary indexing scheme will be used for a particular dataset based on their own insights, the user's insights are used as a tool to aid the secondary indexing scheme selection module 2530 in making intelligent selections.

Rather than relying solely on the secondary indexing scheme selection module 2530, the user-generated secondary indexing hint data 2620 can be configured to weigh the user-generated secondary indexing hint data 2620 in conjunction with other information, such as the local distribution information and/or the system-generated secondary indexing hint data 2630. For example, a heuristic function and/or optimization is performed as a function of the user-generated secondary indexing hint data 2620, the local distribution information, and/or the system-generated secondary indexing hint data 2630. This improves database systems by ensuring that inaccurate and/or misleading insights of user-generated secondary indexing hint data 2620 are not automatically applied in selecting secondary indexing schemes that would render sub-optimal IO efficiency. Furthermore, enabling users to simply dictate which secondary indexing scheme should be applied for a given dataset would render all segments of a given dataset having a same, user-specified index, and the added efficiency of per-segment indexing discussed previously would be lost.

Furthermore, in some cases, user-generated secondary indexing hint data 2620 can be ignored and/or can be de-weighted over time based on contradicting with local distribution data 2542 and/or system-generated secondary indexing hint data 2630. In some cases, user-generated secondary indexing hint data 2620 can be removed entirely from consideration. In such embodiments, the user can be prompted via the interactive interface to enter new user-generated secondary indexing hint data 2620 and/or can be alerted that their user-generated secondary indexing hint data 2620 is inconsistent with local distribution data 2542 and/or system-generated secondary indexing hint data 2630.

The system-generated secondary indexing hint data 2630 can be generated automatically by an indexing hint generator system 2551, which can be implemented by the segment indexing module 2510, by one or more computing devices 18, and/or by other processing resources and/or memory resources of the database system 10. Unlike the user-generated secondary indexing hint data 2620, the system-generated secondary indexing hint data 2630 can be generated without human intervention and/or the system-generated secondary indexing hint data 2630 is not based on user-supplied information. Instead, the system-generated secondary indexing hint data 2630 can be generated based on: current dataset information, such as distribution information for the portion of dataset 2502 that has been received and/or stored in segments 2424; historical query data, such as a log of queries that have been performed, queries that are performed frequently, queries flagged as having poor IO efficiency, and/or other information regarding previously performed queries; current and/or historical system health, memory, and/or performance information such as memory utilization of segments with various secondary indexing schemes and/or IO efficiency of segments with various indexing schemes; and/or other information generated by and/or tracked by database system 10.

As a particular example, the system-generated secondary indexing hint data 2630 can indicate current column cardinality, range, and or distribution of one or more columns. As another a particular example, the system-generated secondary indexing hint data 2630 can indicate "add-column-like" information and/or other information indicating an ordered or unordered list of columns that are commonly queried together, derived from some or all previous queries such as historically slow queries and/or common queries.

Different datasets 2502 can have different user-generated secondary indexing hint data 2620 and/or system-generated secondary indexing hint data 2630. The same dataset 2502 can have different user-generated secondary indexing hint data 2620 configured by different users. The same dataset 2502 can have different secondary indexing hint data 2620 and/or system-generated secondary indexing hint data 2630 generated over time, for example, where the user-generated secondary indexing hint data 2620 and/or system-generated secondary indexing hint data 2630 optionally updated over time, and where segments are indexed by utilizing the most recent user-generated secondary indexing hint data 2620 and/or most recent system-generated secondary indexing hint data 2630.

In such cases, newer segments generated from more recently received data of the dataset 2502 can have secondary indexing scheme selection data 2532 generated based on applying more recently updated user-generated secondary indexing hint data 2620 and/or system-generated secondary indexing hint data 2630, while older segments generated from older received data of the dataset 2502 can have secondary indexing scheme selection data 2532 generated based on prior versions of user-generated secondary indexing hint data 2620 and/or system-generated secondary indexing hint data 2630. In some cases, one or more older segments can optionally be identified for re-indexing by applying the more recently updated user-generated secondary indexing hint data 2620 and/or system-generated secondary indexing hint data 2630 to generate new secondary indexing scheme selection data 2532 for these older segments, for example, based on application of these user-generated secondary indexing hint data 2620 and/or system-generated secondary indexing hint data 2630 rendering secondary indexing scheme selection data 2532 with more efficient row reads to these one or more older segments. Such embodiments are discussed in further detail in conjunction with FIGS. 27A-27C.

In some cases, newly generated and/or newly received user-generated secondary indexing hint data 2620 and/or system-generated secondary indexing hint data 2630 can be "tested" prior to being automatically utilized by the secondary indexing scheme selection module 2530 to determine whether they would render secondary indexing selections that induce favorable IO efficiency and/or improved IO efficiency for currently stored segments. For example, a user can elect to perform this test for their proposed user-generated secondary indexing hint data 2620 and/or the database system 10 can automatically perform this test prior to any reliance upon user-generated secondary indexing hint data 2620 in generating secondary indexes for new segments.

This testing can be performed by re-evaluating the secondary indexing schemes for one or more currently stored segments based on applying the proposed user-generated secondary indexing hint data 2620 as input to the secondary indexing scheme selection module 2530 for an existing segment, determining if this would render a different secondary indexing scheme selection for the existing segment, testing the different secondary indexing scheme selection for the existing segment via one or more test queries to determine whether or not the IO efficiency for the segment would improve and/or be sufficiently efficient when this different secondary indexing scheme selection is applied; selecting to adopt the proposed user-generated secondary indexing hint data 2620 when at least a threshold number and/or percentage of existing segments have improved IO efficiency and/or have sufficient IO efficiency with different secondary indexing scheme selections generated by applying the adopt the proposed user-generated secondary indexing hint data; and/or selecting to not adopt the proposed user-generated secondary indexing hint data 2620 when at least a threshold number and/or percentage of existing segments do have not improved IO efficiency and/or do not have sufficient IO efficiency with different secondary indexing scheme selections generated by applying the adopt the proposed user-generated secondary indexing hint data. Some or all of this process can optionally be performed by implementing the segment indexing evaluation system of FIGS. 27A-27C.

In various embodiments, a segment indexing module includes at least one processor and a memory that stores operational instructions. The operational instructions, when executed by the at least one processor, cause the segment indexing module to receive a user-generated secondary indexing hint data for a dataset from a client device. The client device generated the user-generated hint data based on user input in response to at least one prompt displayed by an interactive interface displayed via a display device of the client device. A plurality of segments each include distinct subsets of a plurality of rows of a database table. for each of the plurality of segments, a secondary indexing scheme is automatically selected from a plurality of secondary indexing options based on the user-provided secondary indexing hint data. A plurality of secondary indexes is generated for each of the plurality of segments in accordance with the corresponding secondary indexing scheme. The plurality of segments and the plurality of secondary indexes are stored in memory.

FIG. 26B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26B. In particular, a node 37 can utilize the query processing module 2435 to execute some or all of the steps of FIG. 26B. Some or all of the method of FIG. 26B can be performed by the segment generator module 2506. In particular, some or all of the method of FIG. 26B can be performed by a secondary indexing scheme selection module 2530 and/or a secondary index generator module 2540 of a segment indexing module 2510. Some or all of the method of FIG. 26B can be performed via communication with and/or access to a segment storage system 2508, such as memory drives 2425 of one or more nodes 37. Some or all of the method of FIG. 26B can be performed via a query execution module 2504. Some or all of the steps of FIG. 26B can optionally be performed by any other processing module of the database system 10. Some or all of the steps of FIG. 26B can be performed to implement some or all of the functionality of the segment indexing module 2510 as described in conjunction with FIGS. 25A-25C and/or FIG. 26A. Some or all steps of FIG. 26B can be performed by database system 10 in accordance with other embodiments of the database system 10 and/or nodes 37 discussed herein. Some or all of the steps of FIG. 26B can be executed in conjunction with execution of some or all steps of FIG. 25E.

Step 2682 includes receiving a user-generated secondary indexing hint data for a dataset from a client device. Step 2684 includes generating a plurality of segments that each include distinct subsets of a plurality of rows of a dataset. Step 2686 includes automatically selecting, for each of the plurality of segments, a secondary indexing scheme from a plurality of secondary indexing options based on the user-provided secondary indexing hint data. Step 2688 includes generating a plurality of secondary indexes for each of the plurality of segments in accordance with the corresponding secondary indexing scheme. Step 2690 includes storing the plurality of segments and the plurality of secondary indexes in memory.

In various embodiments, the user-generated secondary indexing hint data indicates query predicate trend data for future queries to be performed by at least one user against the dataset. In various embodiments, the query predicate trend data indicates an ordered list of columns commonly queried together and/or a relative likelihood for a column to appear in a predicate. In various embodiments, the user-generated secondary indexing hint data indicates estimated distribution data for a future plurality of rows of the dataset to be received by the database system for storage. In various embodiments, the estimated distribution data indicates an estimated column cardinality of the future plurality of rows of the dataset and/or an estimated column distribution of the future plurality of rows of the dataset.

In various embodiments, the method includes automatically generating system-generated secondary indexing hint data for the dataset. Automatically selecting the secondary indexing scheme is based on applying a heuristic function to the user-provided secondary indexing hint data and the system-generated secondary indexing hint data. In various embodiments, the system-generated secondary indexing hint data is generated based on accessing a log of previous queries performed upon the dataset, and/or generating statistical data for current column values of one or more columns of currently-stored rows of the dataset. In various embodiments the system-generated secondary indexing hint data indicates a current column cardinality; a current distribution of the data; a current column distribution; a current column range; and/or sets of columns commonly queried together, for example, in historically slow queries, common queries, and/or across all queries.

In various embodiments, a heuristic function is further applied to local distribution data generated for each segment. In various embodiments, the method includes generating and/or determining the local distribution data for each segment.

In various embodiments, the method includes ignoring and/or removing at least some of the user-provided secondary indexing hint data based on the system-generated secondary indexing hint data contradicting the user-provided secondary indexing hint data. In various embodiments, the user-provided secondary indexing hint data does not include selection of a secondary indexing scheme to be applied to the plurality of segments. For example, different secondary indexing schemes are applied to different segments despite being selected based on the same user-provided secondary indexing hint data.

In various embodiments the method includes receiving updated user-provided secondary indexing hint data from the client device, for example, after receiving the user-provided secondary indexing hint data. The secondary indexing scheme utilized for a more recently generated one of the plurality of segments is different from the secondary indexing scheme utilized for a less recently generated one of the plurality of segments based receiving the updated user-provided secondary indexing hint data after generating the first one of the plurality of segments and before generating the second of the plurality of segments.

In various embodiments, a non-transitory computer readable storage medium includes at least one memory section that stores operational instructions that, when executed by a processing module that includes a processor and a memory, causes the processing module to: receive a user-generated secondary indexing hint data for a dataset from a client device, where the client device generated the user-generated hint data based on user input in response to at least one prompt displayed by an interactive interface displayed via a display device of the client device; generate a plurality of segments that each include distinct subsets of a plurality of rows of a dataset; automatically select, for each of the plurality of segments, a secondary indexing scheme from a plurality of secondary indexing options based on the user-provided secondary indexing hint data; generate a plurality of secondary indexes for each of the plurality of segments in accordance with the corresponding secondary indexing scheme; and/or store the plurality of segments and the plurality of secondary indexes in memory.

FIGS. 27A-27C present embodiments of a segment indexing evaluation system 2710. The segment indexing evaluation system 2710 can be implemented via one or more computing devices 18 of the database system 10 and/or can be implemented via other processing resources and/or memory resources of the database system 10. The segment indexing evaluation system 2710 can optionally be implemented in conjunction with the segment indexing module 2510 of FIGS. 25A-26B.

Existing segments can be reindexed, for example, in order to take advantage of new hints, new index types, bug fixes, or updated heuristics. Reindexing can happen over time on a live system since segments for a dataset 2502 are heterogeneous. During reindexing, the secondary indexing scheme is evaluated for each segment to determine whether re-indexing would produce a different layout. For each segment group to be re-indexed, all existing segments in the group are read and new segments are created using the updated index layout. Once the new segments are written, segment metadata is updated for future queries and the old segment group can be removed.

The segment indexing evaluation system 2710 can be implemented to evaluate index efficiency for particular segments to determine whether and/or how their secondary index structure should be changed. This can include identifying existing segments for re-indexing and identifying a new secondary indexing scheme for these existing segments that are determined and/or expected to be more efficient for IO efficiency of segments than their current secondary indexing scheme. The segment indexing evaluation system 2710 can be implemented to automatically re-index existing segments under a newly selected secondary indexing scheme determined for the existing segments. This improves the technology of database systems to enable the indexing schemes of particular segments to be altered to improve the IO efficiency of these segments, which improves the efficiency of query executions.

This further improves the technology of database systems by enabling the per-segment indexing discussed previously to be adaptive to various changes over time. In particular, segments can be identified for reindexing and/or can be re-indexed via a new secondary indexing scheme based on: identifying segments with poor IO efficiency in one or more recently executed queries; changes in types of queries being performed against the dataset 2502; new types of secondary indexes that are supported as options in the secondary indexing scheme option data 2531; new heuristic functions and/or optimizations utilized by the secondary indexing scheme selection module 2530; receiving updated user-generated secondary indexing hint data 2620; automatically generating updated system-generated secondary hint data 2630; and/or other changes.

FIG. 27A presents an embodiment of a segment indexing evaluation system 2710 of database system 10 that implements an index efficiency metric generator module 2722, an inefficient segment identification module 2724, and a secondary indexing scheme selection module 2530. The secondary indexing scheme selection module 2530 can be implemented utilizing some or all features and/or functionality of embodiments of the secondary indexing scheme selection module 2530 discussed in conjunction with FIGS. 25A-25D and/or FIG. 26A.

In this example, a set of segments 1-R can be evaluated for re-indexing. For example, this evaluation is initiated based on a determination to evaluate the set of segments 1-R. This determination can be based on: a predetermined schedule and/or time period to re-evaluate indexing of the set of segments; identifying segments 1-R as having poor IO efficiency in one or more recently executed queries; changes in types of queries being performed against the dataset 2502; introducing new types of secondary indexes that are supported as options in the secondary indexing scheme option data 2531; introducing new heuristic functions and/or optimizations utilized by the secondary indexing scheme selection module 2530; receiving updated user-generated secondary indexing hint data 2620; automatically generating updated system-generated secondary hint data 2630; receiving a request and/or instruction to re-evaluate indexing of the set of segments; receiving a request from client device 2601 to evaluate how indexing of the set of segments would change in light of a newly supplied user-generated secondary indexing hint data 2620; detected degradation in query efficiency; and/or another determination.

The set of segments 1-R can correspond to all segments in the database system and/or can correspond to all segments storing records of dataset 2502. The set of segments 1-R can alternatively correspond to a proper subset of segments in the database system and/or a proper subset of segments storing records of dataset 2502. This proper subset can be selected based on identifying segments as having poor IO efficiency in one or more recently executed queries. This proper subset can be selected based on identifying segments whose secondary indexing scheme was selected and generated before a predefined time and/or date. This proper subset can be selected based on identifying segments with segment layout indicating their secondary indexing scheme was selected in via a revision of the secondary indexing scheme selection module 2530 that is older than a current revision of the secondary indexing scheme selection module 2530 and/or a predetermined threshold revision of the secondary indexing scheme selection module 2530. This proper subset can be selected based on identifying segments whose secondary indexing scheme was selected based on: an version of the heuristic functions and/or optimizations utilized by the secondary indexing scheme selection module 2530 that is older than a current version of the heuristic functions and/or optimizations utilized by the secondary indexing scheme selection module 2530; a version of the user-generated secondary indexing hint data 2620 that is older than the current version of user-generated secondary indexing hint data 2620 utilized by the secondary indexing scheme selection module 2530; a version of the system-generated secondary indexing hint data 2630 that is older than the current version of the user-generated secondary indexing hint data 2620 utilized by the secondary indexing scheme selection module 2530; an older version of the secondary indexing scheme option data 2531 that does not include at least one new secondary indexing type that is included in the current version of the secondary indexing scheme option data 2531 utilized by the secondary indexing scheme selection module 2530.

The current secondary indexing scheme data 2731 of each of the set of segments 1-R can be determined based on accessing the segments 1-R in memory, based on accessing metadata of the segments 1-R, based on tracked information regarding the previous selection of their respective secondary indexing schemes, and/or another determination. The current secondary indexing scheme data 2731 of a given segment can indicate the secondary indexing scheme selection data 2532 that was utilized to generate the secondary index data 2545 of the segment when the segment was generated and/or in a most recent re-indexing of the segment; the secondary index data 2545 itself; information regarding the layout of the segment and/or format of the segment row data 2505 induced by the currently utilized secondary indexing scheme; and/or other information regarding the current secondary indexing schemes for the segment.

Secondary indexing efficiency metrics 2715-1-2715-R can be generated for the identified set of segments 2424-1-2424-R via an index efficiency metric generator module 2722 based on their respective current secondary indexing scheme data 2731-1-2731-R. The index efficiency metric generator module 2722 can perform one or more queries, such as a set of test queries, upon the dataset 2502 and/or upon individual ones of the set of segments to generate the secondary indexing efficiency metrics 2715-1-2715-R. The set of test queries can be predetermined, can be configured via user input, can be based on a log of common and/or recent queries, and/or can be based on previously performed queries with poor efficiency.

In some cases, secondary indexing efficiency metrics 2715 are automatically generated for segments as they are accessed in various query executions, and the index efficiency metric generator module 2722 can optionally utilize these tracked secondary indexing efficiency metrics 2715 by accessing a memory that in memory that stores the tracked secondary indexing efficiency metrics 2715 instead of or in addition to generating new secondary indexing efficiency metrics 2715-1-2715-R via execution of new queries.

In some embodiments, rather than running the set of test queries on the actual segments, a set of virtual columns can be generated for the segments 2424-1-2424-R based on their current secondary indexing scheme data 2731-1-2731-R and the set of test queries can be performed utilizing the virtual columns. This mechanism be ideal when the index efficiency metric generator module 2722 is utilized to generate secondary indexing efficiency metrics 2715 for proposed secondary indexing schemes of these segments rather than their current secondary indexing schemes, as discussed in further detail in conjunction with FIG. 27B.

The secondary indexing efficiency metrics 2715 of a given segment can be based on raw metrics indicating individual values and/or blocks that are read, processed, and/or emitted. These raw metrics can be tracked in performance of the set of test queries to generate the secondary indexing efficiency metrics 2715.

A block that is read, processed, and/or emitted can include values of multiple records included a given segment, where a given segment includes many blocks. For example, these blocks are implemented as the coding blocks within a segment discussed previously and/or are implemented as 4 Kilo-byte data blocks. These blocks can optionally be a fixed size, or can have variable sizes.

One of these raw metrics that can be tracked in performance of the set of test queries for a given segment can correspond to a "values read" metric. The "values read" metric can be tracked as a collection of value-identifiers for blocks and/or individual values included in the segment that were read from disk. In some cases, this metric has block-level granularity.

Another one of these raw metrics that can be tracked in performance of the set of test queries for a given segment can correspond to a "values processed" metric. The "values processed" metric can be tracked as a collection of value identifiers for blocks and/or individual records included in the segment that were processed by the IO operator. This collection of value identifiers corresponding to values processed by the IO operator is always a subset of the collection of value identifiers that were read, and may be smaller when indexing allows decompression of specific rows in a block. In bytes, this metric may be larger than bytes read due to decompression. This metric can also have metric also have block-level granularity in cases where certain compression schemes that do not allow random access are utilized.

Another one of these raw metrics that can be tracked in performance of the set of test queries for a given segment can correspond to a "values emitted" metric. The "values emitted" metric can be tracked as a map of a collection of value-identifiers which satisfy all predicates and are emitted upstream. For example, this can include the number of blocks outputted as output data blocks of the IO operator and/or of one or more IO level nodes. The predicates can correspond to all query predicates that are pushed-down to one or more IO operators of the query that are executed in accordance with an IO pipeline as discussed in further detail in conjunction with FIGS. 28A-29B.

The raw metrics tracked for each given segment can be utilized to calculate one or more efficiency values of the secondary indexing efficiency metrics 2715. The secondary indexing efficiency metrics 2715 can include an IO efficiency value for the given segment. The IO efficiency value is computed with block granularity, and can be calculated as a proportion of blocks read that have an emitted value. For example, the IO efficiency value can be calculated by dividing the number of unique blocks with at least one emitted value indicated in the "values emitted" metric by the number of unique blocks read indicated in the "values read" metric. A perfect value of 1 means that every block that was read was needed to satisfy the plan. IO efficiency values indicating higher proportions of values that are read also being emitted constitute better IO efficiency, and thus more favorable secondary indexing efficiency metrics 2715, than lower proportions of values that are read also being emitted.

The secondary indexing efficiency metrics 2715 can include an IO efficiency value for the given segment. The IO efficiency value can have a block granularity, and can be calculated as a proportion of blocks read that have an emitted value. For example, the IO efficiency value can be calculated by dividing the number of unique blocks with at least one emitted value indicated in the "values emitted" metric by the number of unique blocks read indicated in the "values read" metric. A perfect value of 1 means that every block that was read was needed to satisfy the plan. IO efficiency values indicating higher proportions of values that are read also being emitted constitute better IO efficiency, and thus more favorable secondary indexing efficiency metrics 2715, than IO efficiency values indicating lower proportions of values that are read also being emitted.

The secondary indexing efficiency metrics 2715 can include a processing efficiency value for the given segment. The processing efficiency value can have a byte granularity, and can be calculated as a proportion of bytes processed that are emitted as values. For example, the processing efficiency value can be calculated by dividing the sum of bytes emitted as indicated in the "values emitted" metric by the sum of bytes processed as indicated in the "values processed" metric. A perfect value of 1 means that every byte processed by the IO operator was needed to satisfy the plan. Processing efficiency values indicating higher proportions of bytes that are processed also being emitted constitute better processing efficiency, and thus more favorable secondary indexing efficiency metrics 2715, than processing efficiency values indicating lower proportions of bytes that are processed also being emitted.

The inefficient segment identification module 2724 can identify a subset of the segments 1-R as inefficient segments, illustrated in FIG. 27A as inefficient segments 1-S. These inefficient segments can be identified based on having unfavorable secondary indexing efficiency metrics 2715. For example, the secondary indexing efficiency metrics 2715 of a segment are identified as unfavorable based on the IO efficiency value being lower than, indicating lower efficiency than, and/or otherwise comparing unfavorably to a predetermined IO efficiency value threshold. As another example, the secondary indexing efficiency metrics 2715 of a segment are identified as unfavorable based on the processing efficiency value being lower than, indicating lower efficiency than, and/or otherwise comparing unfavorably to a predetermined processing efficiency value threshold. In some cases, none of the segments are identified as inefficient based on all having sufficient secondary indexing efficiency metrics 2715. In some cases, all of the segments are identified as inefficient based on all having insufficient secondary indexing efficiency metrics 2715.

The secondary indexing scheme selection module 2530 can generate secondary indexing scheme selection data 2532 for each of the set of inefficient segments 1-S. The secondary indexing scheme selection data 2532 for some or all of the inefficient segments 1-S can indicate a different secondary indexing scheme from their current different secondary indexing scheme.

The secondary indexing scheme selection module 2530 can be implemented in a same or similar fashion as discussed in conjunction with FIGS. 25A-26B. In some embodiments, the secondary indexing scheme selection module 2530 can further utilize the current secondary indexing scheme data 2731-2731-R, such as the current indexing type and/or segment layout information to make its selection. For example, the secondary indexing scheme selection module 2530 can perform analysis of the current secondary indexing scheme data 2731 for each given segment to automatically identify possible improvements, and/or can generate the secondary indexing scheme selection data 2532 for each given segment as a function of its current secondary indexing scheme data 2731.

As a particular example, a segment layout description for each segment can be extracted for correlation with efficiency metrics. This layout description can indicate the index types and parameters chosen for each column, along with the revision of the secondary indexing scheme selection module 2530 used to determine that layout.

In some embodiments, the segment indexing evaluation system 2710 can facilitate display of the current secondary indexing scheme data 2731 of inefficient segments 1-S to a user, for example, via a display device of client device 2601. This can include displaying the current indexing strategy and/or other layout information for the inefficient segments. This can include displaying their secondary indexing efficiency metrics 2715 and/or some or all of the raw metrics tracked in performing the test queries.

In some cases, the secondary indexing scheme selection module 2530 can generate the indexing scheme selection data 2532 based on user interaction with an interactive interface, such as interactive interface 2650 of client device 2601 and/or another client device utilized by an administrator, developer, or different user, in response to reviewing some or all of this displayed information. This can include prompting the user to select whether to adopt the new secondary indexing schemes selected for these segments or to maintain their current secondary indexing schemes. In some embodiments, the user can be prompted to enter and/or select proposed user-generated secondary indexing hint data 2620 for these poor-performing segments based on the current indexing strategy and/or other layout information. In some cases, proposed hint data can be automatically determined and displayed. This proposed hint data can be generated based on automatically generating system-generated secondary indexing hint data 2630, for example, based on the current secondary indexing scheme data 2731 and/or their poor efficiency. This proposed hint data can be automatically populated with recent user-generated secondary indexing hint data 2620 and/or system-generated secondary indexing hint data 2630 used to index newer segments, where these proposed hints that may be relevant to older segments as well.

In some embodiments, the secondary indexing scheme selection data 2532 for some or all of the inefficient segments 1-S is automatically utilized to generate respective secondary index data 2545 for inefficient segments 1-S via secondary index generator module 2540. This can include reformatting segment row data 2505 and/or otherwise changing the layout of the segment 2424 to accommodate the new secondary indexing scheme.

In other cases, the secondary indexing scheme selection data 2532 generated for some or all of the inefficient segments 1-S is considered a proposed secondary indexing scheme that undergoes evaluation prior to being adopted. The process discussed in conjunction with FIG. 27A can be repeated using the proposed new indexing strategies for these segments rather than the current secondary indexing scheme data.

FIG. 27B presents an embodiment of a segment indexing evaluation system 2710 that repeats this process for proposed new strategies indicated in secondary indexing scheme selection data 2532. Some or all features of the segment indexing evaluation system 2710 of FIG. 27B can be utilized to implement the segment indexing evaluation system 2710 of FIG. 27A and/or any other embodiment of the segment indexing evaluation system 2710 discussed herein.

The secondary indexing scheme selection data 2532 generated for some or all of the inefficient segments 1-S are processed via index efficiency metric generator module 2722 to generate secondary indexing efficiency metrics 2715 for the inefficient segments 1-S, indicating the level of efficiency that would be induced if the proposed secondary indexing scheme indicated in the secondary indexing scheme selection data 2532 were to be adopted. For example, virtual columns are determined for each segment 1-S in accordance with the proposed secondary indexing scheme, and these virtual columns are utilized to perform the set of test queries and generate the secondary indexing efficiency metrics 2715 indicating efficiency of the proposed secondary indexing scheme for each segment.

The inefficient segment identification module 2724 can be utilized to determine whether these proposed secondary indexing schemes are efficient or inefficient. This can include identifying a set of efficient segments based on these segments having favorable secondary indexing efficiency metrics 2715 for their proposed secondary indexing schemes. This can include identifying a set of inefficient segments based on these segments having unfavorable secondary indexing efficiency metrics 2715 for their proposed secondary indexing schemes, for example, based on comparison of the IO efficiency value and/or processing efficiency value to corresponding threshold values as discussed previously.

In some cases, determining whether a segment's secondary indexing efficiency metrics 2715 for their proposed secondary indexing schemes are favorable optionally includes comparing the secondary indexing efficiency metrics 2715 for the proposed secondary indexing scheme of the segment to the secondary indexing efficiency metrics 2715 for the current secondary indexing scheme. For example, a proposed secondary indexing schemes is only adopted for a corresponding segment if it has more favorable secondary indexing efficiency metrics 2715 than the secondary indexing efficiency metrics 2715 of the current secondary indexing scheme.

As proposed new indexing strategies render acceptable secondary indexing efficiency metrics for their corresponding segments, these segments can be re-indexed using their corresponding new indexing strategy. If the proposed new indexing strategies do not render acceptable secondary indexing efficiency metrics for their corresponding segments, the re-indexing attempt can be abandoned where their current indexing scheme is maintained, and/or additional iterations of this process can continue to evaluate additional proposed secondary indexing schemes for potential adoption in this fashion.

This is illustrated in FIG. 27B, where a set of inefficient segments 1-$S_i$ identified in an ith iteration of the process each have proposed secondary indexing schemes selected via secondary indexing scheme selection module 2530. A first subset of this set of inefficient segments, denoted as segments 1-T, have favorable secondary indexing efficiency metrics 2715 for their proposed new indexing strategies, and have secondary indexes generated accordingly. A second subset of this set of inefficient segments, denoted as segments 1-$S_{i+1}$, have unfavorable secondary indexing efficiency metrics 2715, and thus optionally have subsequently proposed secondary indexing schemes that are evaluated for adoption via an (i+1)th iteration.

In some embodiments, with each iteration, a new, hypothetical segment layout description for an existing segment corresponding to the proposed secondary indexing scheme for the existing segment can be presented to the presented to the user via interactive interface 2650. The interactive interface 2650 can optionally prompt the user to add or remove user-generated secondary indexing hint data 2620 in order to see the results of potential changes on the segment layout, where the process can be re-performed with user-supplied changes to the user-generated secondary indexing hint data 2620. This functionality can be ideal in enabling end-users, developers, and/or administrators to evaluate the effectiveness of user-generated secondary indexing hint data 2620.

In some embodiments, this process is performed to identify poor or outdated user-generated secondary indexing hint data 2620 supplied by users that rendered selection of secondary indexing schemes that caused respective segments to have poor efficiency metrics. In some cases, these poor hints are automatically removed from consideration in generating new segments and/or users are alerted that these hints are not effective via interactive interface 2650. In some cases, the heuristic functions and/or optimizations utilized by the secondary indexing scheme selection module 2530 are automatically updated over time to de-weight and/or adjust to the importance of user-provided hints relative to system-provided hints based on how effectively prior and/or current user-generated secondary indexing hint data 2620 improved efficiency relative to system-generated secondary indexing hint data 2630.

In some cases, the index efficiency metric generator module 2722 and inefficient segment identification module 2724 are utilized to evaluate proposed secondary indexing scheme selections for all newly generated segments. For example, the process implemented by the segment indexing evaluation system 2710 of in FIG. 27B can be utilized to implement the secondary indexing module 2510 of FIG. 25A and/or any other embodiment of the secondary indexing module 2510 discussed herein. In such cases, the secondary indexing scheme selection data 2532 generated for new segments is first evaluated via generation of corresponding secondary indexing efficiency metrics 2715 by applying the index efficiency metric generator module 2722 to the secondary indexing scheme selection data 2532, where multiple iterations of the process of FIG. 27B may ensure to ensure the ultimately selected secondary indexing scheme for each segment is expected to yield sufficiently efficient IO in query executions.

In some embodiments, space efficiency of index structures is alternatively or additionally evaluated. For example, a current index structure may induce efficient metrics for a given segment, but other index strategies with much cheaper storage requirements can be tested and determined to render favorable efficiency metrics. This can trigger re-indexing of segments to improve space efficiency without sacrificing IO efficiency or processing efficiency.

In such embodiments, instead of or in addition to identifying inefficient segments 1-S for re-indexing, the segment indexing evaluation system 2710 can optionally identify segments with unnecessarily complicated secondary indexing schemes and/or with secondary indexing schemes that require larger amounts of memory. In some cases, these segments can have their indexing schemes re-evaluated in a similar fashion to determine whether a less complicated and/or less memory intensive secondary indexing scheme could be utilized for the segment that would still yield favorable index efficiency metrics. The segment indexing evaluation system 2710 can identify such secondary indexing schemes for these and generate corresponding secondary index data 2545 for these segments accordingly.

FIG. 27C illustrates an example embodiment of the process performed by the segment indexing evaluation system 2710 to evaluate efficiency of one or more proposed secondary indexing schemes for corresponding segments. Some or all features and/or functionality of the segment indexing evaluation system 2710 can be utilized to implement the segment indexing evaluation system 2710 of FIG. 27A, FIG. 27B, and/or any other embodiment of the segment indexing evaluation system 2710 discussed herein.

In various embodiments, a segment indexing evaluation system includes at least one processor and a memory that stores operational instructions. The operational instructions, when executed by the at least one processor, cause the segment indexing evaluation system to generate secondary index efficiency metrics for a set of secondary indexing schemes corresponding to a set of segments stored in the database system based upon performing at least one query that accesses row data included in the set of segments. A first segment of the set of segments is selected for reindexing based on the secondary index efficiency metrics for a first one of the set of secondary indexing schemes corresponding to the first segment. A new set of secondary indexes are generated for the first segment based on applying a new secondary indexing scheme that is different from one of the set of secondary indexing schemes that corresponds to the first segment based on selecting the first segment for reindexing. The new set of secondary indexes are stored in conjunction with storage of the first segment. Execution of a query can be facilitated by utilizing the new set of secondary indexes to read at least one row from the first segment.

FIG. 27D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27D. In particular, a node 37 can utilize the query processing module 2435 to execute some or all of the steps of FIG. 27D. Some or all of the method of FIG. 27D can be performed by the segment indexing evaluation system 2710, for example, by implementing the index efficiency metric generator module 2722, the inefficient segment identification module 2724, and/or the secondary indexing scheme selection module 2530. Some or all of the method of FIG. 27D can be performed by the segment generator module 2506. In particular, some or all of the method of FIG. 27D can be performed by a secondary indexing scheme selection module 2530 and/or a secondary index generator module 2540 of a segment indexing module 2510. Some or all of the method of FIG. 27D can be performed via communication with and/or access to a segment storage system 2508, such as memory drives 2425 of one or more nodes 37. Some or all of the method of FIG. 27D can be performed via a query execution module 2504. Some or all of the steps of FIG. 27D can optionally be performed by any other processing module of the database system 10. Some or all of the steps of FIG. 27D can be performed to implement some or all of the functionality of the segment indexing evaluation module 2710 as described in conjunction with FIGS. 27A-27C. Some or all steps of FIG. 27D can be performed by database system 10 in accordance with other embodiments of the database system 10 and/or nodes 37 discussed herein. Some or all of the steps of FIG. 27D can be executed in conjunction with execution of some or all steps of FIG. 25E and/or FIG. 26B.

Step 2782 includes generating secondary index efficiency metrics for a set of secondary indexing schemes corresponding to a set of segments stored in the database system based upon performing at least one query that accesses row data included in the set of segments. Step 2784 includes selecting a first segment of the set of segments for reindexing based on the secondary index efficiency metrics for a first one of the set of secondary indexing schemes corresponding to the first segment. Step 2786 includes generating a new set of secondary indexes for the first segment based on applying a new secondary indexing scheme that is different from one of the set of secondary indexing schemes that corresponds to the first segment based on selecting the first segment for reindexing. Step 2788 includes storing the new set of secondary indexes in conjunction with storage of the first segment. Step 2790 includes facilitating execution of a query by utilizing the new set of secondary indexes to read at least one row from the first segment.

In various embodiments, at least one of the set of secondary indexing schemes is currently utilized in query executions for access to rows of the corresponding one of a set of segments. In various embodiments, at least one of the set of secondary indexing schemes is a proposed indexing scheme for the corresponding one of a set of segments.

In various embodiments, the method includes selecting the new secondary indexing scheme as a proposed indexing scheme for the first segment based on selecting the first segment for reindexing, and/or generating secondary index efficiency metrics for the new secondary indexing scheme based on selecting the new secondary indexing scheme as the proposed indexing scheme for the first segment. Generating the new set of secondary indexes for the first segment is based on the secondary index efficiency metrics for the new secondary indexing scheme being more favorable than the secondary index efficiency metrics for the first one of the set of secondary indexing schemes.

In various embodiments, the method includes selecting a second segment of the set of segments for reindexing based on the secondary index efficiency metrics for a second one of the set of secondary indexing schemes corresponding to the second segment. The method can include selecting a second new secondary indexing scheme as a proposed indexing scheme for the second segment based on selecting the second segment for reindexing. The method can include generating secondary index efficiency metrics for the second new secondary indexing scheme based on selecting the second new secondary indexing scheme as the proposed indexing scheme for the second segment. The method can include selecting a third new secondary indexing scheme as another proposed indexing scheme for the second segment based on the secondary index efficiency metrics for the second new secondary indexing scheme comparing unfavorably to a secondary index efficiency threshold. The method can include generating secondary index efficiency metrics for the third new secondary indexing scheme based on selecting the third new secondary indexing scheme as the another proposed indexing scheme for the second segment. The method can include generating a new set of secondary indexes for the second segment by applying the third new secondary indexing scheme based on the secondary index efficiency metrics for the third new secondary indexing scheme being more favorable than the secondary index efficiency metrics for the second new secondary indexing scheme.

In various embodiments, the method includes selecting a subset of the set of segments for reindexing that includes the first segment based on identifying a corresponding subset the set of secondary indexing schemes with secondary index efficiency metrics that compare unfavorably to a secondary index efficiency threshold.

In various embodiments, the method includes selecting the at least one query based on receiving select query predicates generated via user input and/or based on identifying common query predicates in a log of historically performed queries and/or a recent query predicates in a log of historically performed queries.

In various embodiments, the index efficiency metrics include: an IO efficiency metric, calculated for each segment as a proportion of blocks read from the each segment that have an emitted value in execution of the at least one query; and/or a processing efficiency metric calculated for each segment as a proportion of bytes read from the each segment that are emitted as values in execution of the at least one query.

In various embodiments, the method includes facilitating display, via an interactive interface, of a prompt to enter user-generated secondary indexing hint data for secondary indexing of the first segment based on selecting the first segment for reindexing. User-generated secondary indexing hint data is received based on user input to the prompt. The new secondary indexing scheme for the first segment is selected based on the user-generated secondary indexing hint data.

In various embodiments, the method includes determining to generate the secondary index efficiency metrics for a set of secondary indexing schemes corresponding to a set of segments. This determination can be based on: detecting degradation in query efficiency; introduction of a new secondary index type that can be implemented in reindexed segments, where the new secondary indexing scheme is selected as the a new secondary index type; introduction of a new heuristic and/or optimization function for implementation in selecting new indexing strategies to re-index segments, where the new secondary indexing scheme is selected based on utilizing heuristic and/or optimization function; receiving new user-provided secondary indexing hint data and/or new user-provided secondary indexing hint data system-provided hint data, where the secondary index efficiency metrics are generated to evaluate whether applying this new hint data would improve efficiency of existing segments; and/or determining other information. The secondary index efficiency metrics can be generated based on determining to generate the secondary index efficiency metrics.

In various embodiments, a non-transitory computer readable storage medium includes at least one memory section that stores operational instructions that, when executed by a processing module that includes a processor and a memory, causes the processing module to: generate secondary index efficiency metrics for a set of secondary indexing schemes corresponding to a set of segments stored in the database system based upon performing at least one query that accesses row data included in the set of segments; select a first segment of the set of segments for reindexing based on the secondary index efficiency metrics for a first one of the set of secondary indexing schemes corresponding to the first segment; generate a new set of secondary indexes for the first segment based on applying a new secondary indexing scheme that is different from one of the set of secondary indexing schemes that corresponds to the first segment based on selecting the first segment for reindexing; store the new set of secondary indexes in conjunction with storage of the first segment; and/or facilitate execution of a query by utilizing the new set of secondary indexes to read at least one row from the first segment.

FIGS. 28A-28C present embodiments of a query processing module 2802 that executes queries against dataset 2502 via a query execution module 2504. In particular, to guarantee that these queries execute correctly despite requiring IO performed on segments with different secondary indexing schemes selected and generated as discussed in conjunction with some or all features and/or functionality of the segment indexing module 2510 and/or the segment indexing evaluation system 2710, performing IO operators for each given segment is based on the secondary indexing for each given segment. To ensure all segments are uniformly read and filtered for a given query, despite having different secondary indexing schemes, all query predicates can be pushed to the IO operator level. The IO operators can be processed differently for different segments based on their respective indexes via IO pipelines determined for each segment, but are guaranteed to render the appropriate predicate-based filtering regardless of how and/or whether indexes are applied for each segment. This improves database systems by guaranteeing query resultants are correct in query executions, while enabling each segment to perform IO operators efficiently based on having their own secondary indexing scheme that may be different from that of other segments.

FIG. 28A illustrates an embodiment of a query processing module 2802 that includes an operator execution flow generator module 2803 and a query execution module 2504. Some or all features and/or functionality of the query execution module 2504 of FIG. 28A can be utilized to implement the query execution module 2504 of FIG. 25A and/or any other embodiment of the query execution module 2504 discussed herein.

The operator execution flow generator module 2803 can be implemented via one or more computing devices and/or via other processing resources and/or memory resources of the database system 10. The operator execution flow generator module 2803 can generate an operator execution flow 2817, indicating a flow of operators 2830 of the query to be performed by the query execution module 2504 to execute the query in accordance with a serial and/or parallelized ordering. Different portions of the operator execution flow 2817 can optionally be performed by nodes at different corresponding levels of the query execution plan 2405.

At the bottom of the operator execution flow 2817, one or more IO operators 2821 are included. These operators are performed first to read records required for execution of the query from corresponding segments. For example, the query execution module 2504 performs a query against dataset 2502 by accessing records of dataset 2502 in respective segments. As a particular example, nodes 37 at IO level 2416 each perform the one or more IO operators 2821 to read records from their respective segments.

Rather than generating a operator execution flow 2817 that with IO operators 2821 that are executed in an identical fashion across all segments, for example, by applying index probing or other use of indexes to filter rows uniformly across all IO operators for all segments, the execution of IO operators must be adapted to account for different secondary indexing schemes that are utilized for different segments. To guarantee query correctness, all IO operators must be guaranteed to filter the correct set of records when performing record reads in the same fashion.

This can be accomplished by pushing all of the query predicates 2822 of the given query down to the IO operators. Executing the IO operators via query execution module 2504 includes applying the query predicates 2822 to filter records from segments accordingly 2424. In particular, performing the IO operators to perform rows reads for different segment requires that the IO operators are performed differently. For example index probing operations or other filtering via IO operators may be possible for automatically applying query predicates 2822 in performing row reads for segment indexed via a first secondary indexing scheme. However, this same IO process may not be possible for a second segment indexed via a different secondary indexing scheme. In this case, an identical filtering step would be required after reading the rows from the second segment.

FIG. 28B illustrates an embodiment of a query execution module 2504 that accomplishes such differences in IO operator execution via selection of IO pipelines on a segment-by-segment basis. Some or all features and/or functionality of the query execution module 2504 of FIG. 28B can be utilized to implement the query execution module 2504 of FIG. 28A, and/or any other embodiment of the query execution module 2504 described herein.

The construction of an efficient IO pipeline for a given query and segment can be challenging. While a trivial scan-and-filter pipeline can satisfy many queries, most efficiency gains from building a IO pipeline that uses a combination of indexes, dependent sources, and filters to minimize unneeded IO. As a result, different elements must be used depending on the predicates involved, the indexes present in that segment, the presence or absence of variable-length skip lists, and the version of the cluster key index.

The query execution module 2504 can include an index scheme determination module 2832 that determines the secondary indexing scheme data 2833-1-2833-R indicating the secondary indexing scheme utilized for each of a set of segments 1-R to be accessed in execution of a given query. For example, the secondary indexing scheme data 2833-1-2833-R is mapped to the respective segments in memory accessible by the query execution module 2504, is received by the query execution module 2504, and/or is otherwise determined by the query execution module 2504. This can include extracting segment layout description data stored for each segment 1-R.

An IO pipeline generator module 2834 can select a set of IO pipelines 2835-1-2835-R for performance upon each segment 1-R to implement the IO operators of the operator execution flow 2817. In particular, each IO pipeline 2835 can be determined based on: the pushed to the IO operators in the operator execution flow 2817, and/or the secondary indexing scheme data 2833 for the corresponding segment. Different IO pipelines can be selected for different segments based on the different segments having different secondary indexing schemes.

An IO operator execution module 2840 can apply each IO pipeline 2835-1-2835-R to perform the IO operators of the operator execution flow 2817 for each corresponding segment 2424-1-2424-R. Performing a given IO pipeline can include accessing the corresponding segment in segment storage system 2508 to read rows, utilizing the segment's secondary indexing scheme as appropriate and/or as indicated by the IO pipeline. Performing a given IO pipeline can optionally include performing additional filtering operators in accordance with a serial and/or parallelized ordering, for example, based on the corresponding segment not having a secondary indexing scheme that corresponds to corresponding predicates. Performing a given IO pipeline can include ultimately generating a filtered record set emitted by the given IO pipeline 2835 as output. The output of one or more IO operators 2821 as a whole, when applied to all segments 1-R, corresponds to the union of the filtered record sets generated by applying each IO pipeline 2835-1-2835-R to their respective segment. This output can be input to one or more other operators 2830 of the operator execution flow 2817, such as one or more aggregations and/or join operators applied the read and filtered records.

In some embodiments, a given node 37 implements its own index scheme determination module 2832, its own IO pipeline generator module 2834, and/or its own IO operator execution module 2840 to perform IO operations upon its own set of segments 1-R. for example, each of a plurality of nodes 37 participating at the IO level 2416 of a corresponding query execution plan 2405 generates and executes IO pipelines 2835 for its own subset of a plurality of segments required for execution of the query, such as the ones of the plurality of segments stored in its memory drives 2425.

In some embodiments, the IO pipeline for a given segment is selected and/or optimized based on one or more criteria. For example, the serialized ordering of a plurality of columns to be sources via a plurality of corresponding IO operators is based on distribution information for the column, such as probability distribution function (PDF) data for the columns, for example, based on selecting columns expected to filter the greatest number of columns to be read and filtered via IO operators earlier in the serialized ordering than IO operators for other columns. As another example, the serialized ordering of a plurality of columns to be sources via a plurality of corresponding IO operators is based on the types secondary indexes applied to each column, where columns with more efficient secondary indexes and/or secondary indexing schemes that are more applicable to the set of query predicates 2822 are selected to be read and filtered via IO operators earlier in the serialized ordering than IO operators for other columns. As another example, index efficiency metrics and/or query efficiency metrics can be measured and tracked overtime for various query executions, where IO pipelines with favorable past efficiency and/or performance for a given segment and/or for types of secondary indexes are selected over other IO pipelines with less favorable past efficiency and/or performance.

FIG. 28C illustrates an example embodiment of an IO pipeline 2835. For example, the IO pipeline 2835 of FIG. 18C was selected, via IO pipeline generator module 2834, for execution via IO operator execution module 2840 upon a corresponding segment 2424 in conjunction with execution of a corresponding query. In this example, the corresponding query involves access to a dataset 2502 with columns colA, colB, colC, and colD. The predicates 2822 for this query that were pushed to the IO operators includes (colA>5 OR colB<=10) AND (colA<=3) AND (colC>=1).

As illustrated in FIG. 28C, the IO pipeline 2835 can include a plurality of pipeline elements, which can be implemented as various IO operators 2821 and/or filtering operators 2823. A serial ordering of the plurality of pipeline elements can be in accordance with a plurality of pipeline steps. Some of pipeline elements can be performed in parallel, for example, based on being included in a same pipeline step. This plurality of pipeline steps can be in accordance with subdividing portions of the query predicates 2822. IO operators performed in parallel can be based on logical operators included in the query predicates 2822, such as AND and/or OR operators. A latency until value emission can be proportional to the number of pipeline steps in the IO pipeline.

Each of the plurality of IO operators can be executed to access values of records 2422 in accordance with the query, and thus sourcing values of the segment as required for the query. Each of these IO operators 2821 can be denoted with a source, identifying which column of the dataset 2502 is to be accessed via this IO operator. In some cases, a column group of multiple columns is optionally identified as the source for some IO operators 2422, for example, when compound indexes are applied to this column group for the corresponding segment.

Each of these index source IO operators 2821, when executed for the given segment, can output a set of row numbers and/or corresponding values read from the corresponding segment. In particular, IO operators 2821 can utilize a set of row numbers to consider as input, which can be produced as output of one or more prior IO operators. The values produced by an IO operator can be decompressed in order to be evaluated as part of one or more predicates.

Depending on the type of index employed and/or the placement in the IO pipeline 2835, some IO operators 2821 may emit only row numbers, some IO operators 2821 may emit only data values, and/or some IO operators 2821 may emit both row and data values. Depending on the type of index employed, a source element can be followed by a filter that filters rows from a larger list emitted by the source element based on query predicates.

Some or all of the plurality of IO operators 2821 of the IO pipeline 2835 of a given segment can correspond to index sources that utilize primary indexes, cluster key indexes and/or secondary indexes of the corresponding segment to filter ones of the row numbers and/or corresponding values in their respective output when reading from the corresponding segment. These index source IO operators 2821 can further be denoted with an index type, identifying which type of indexing scheme is utilized for access to this source based on the type of indexing scheme was selected and applied to the corresponding column of the corresponding segment, and/or a predicate, which can be a portion of query predicates 2822 applicable to the corresponding source column to be applied when performing the IO upon the segment by utilizing the indexes.

These IO operators 2821 can utilize the denoted predicate as input for internal optimization. This filter predicate can be pushed down into each corresponding index, allowing them to implement optimizations. For example, bitmap indexes only need to examine the columns for a specific range or values.

These index source IO operators 2821 output only a subset of set of row numbers and/or corresponding value identified to meet the criteria of corresponding predicates based on utilizing the corresponding index type of the corresponding source for the corresponding segment. In this example, the IO operators 2821 sourcing colA, colB, and colC are each index source IO operators 2821.

Some or all of the plurality of IO operators 2821 of the IO pipeline 2835 of a given segment can correspond to table data sources. These table data source IO operators 2821 can be applied to columns without an appropriate index and/or can be applied to columns that are not mentioned in query predicates 2822. In this example, the IO operators 2821 sourcing colD is a table data source, based on colD not being mentioned in query predicates 2822. These table data source IO operators can perform a table scan to produce values for a given column. When upstream in the IO pipeline, these table data source IO operators 2821 can skip rows not included in their input list of rows received as output of a prior IO operator when performing the table scan. Some or all these IO operators 2821 can produce values for the cluster key for certain rows, for example, when only secondary indexes are utilized.

Some or all of the plurality of IO operators 2821 of the IO pipeline 2835 of a given segment can correspond to default value sources. These default source IO operators 2821 can always output a default value for a given source column when this column is not present in the corresponding segment.

The various index source, table data source, and default IO operators 2821 included in a given IO pipeline can correspond to various type of pipeline elements that can be included as elements of the IO pipeline. These types can include:

Cluster key index source pipeline element: This type of pipeline element implements a cluster key index search and scan and/or sources values from one or more cluster key columns. When upstream of another source, this IO operator returns values that correspond to the downstream rows that also match this element's predicates (if any)

Legacy clustery key index source pipeline element: This type of pipeline element can implement a cluster key index search and scan, and/or can source values for older segments without row numbers in the cluster key. In some cases, this type of pipeline element is not ever utilized upstream of other pipeline elements.

Inverted index source pipeline element: This type of pipeline element produces values for columns of non-compound types, and/or only row numbers for compound type.

A fixed length table source pipeline element: This type of pipeline element produces values in a fixed-length column. When upstream of another source, skipping blocks containing only rows that have already been filtered and returning only values corresponding to those rows.

A variable length scan table source pipeline element: this type of pipeline element Produces every value in a variable-length column without loading a skip list of row numbers to skip. This type of pipeline element can be faster than variable Length Table Source Pipeline elements. In some embodiments, this type is never used upstream of any other pipeline elements based on being less efficient in scanning a subset of rows.

A variable length table source pipeline element: this type of pipeline element produces values in a variable-length column when a skip list of row numbers to skip is present. In some embodiments, this type of pipeline element is always used upstream of another pipeline element based on efficiently skipping blocks that do not contain any row in the downstream list.

A default value source pipeline element: this type of pipeline element emits default values for a column for any row requested.

The IO pipeline 2835 can further include filtering operators 2823 that filter values outputted by sources serially before these filters based on portions of the query predicates 2822. The filtering operators 2823 can serve as a type of pipeline element that evaluates a predicate expression on each incoming row, filtering rows that do not pass. In some embodiments, every column in the provided predicate must be sourced by other pipeline elements downstream of this pipeline element. In particular, these filtering operators 2823 can be required for some segments that do not have secondary indexes for one or more columns indicated in the query predicates 2822, where the column values of all rows of such columns are first read via a table data source IO operator 2821, and where one or more corresponding filtering operators 2823 are applied to filter the rows accordingly. In some embodiments, the IO pipeline 2835 can further include logical operators such as AND and/or OR operators as necessary for the corresponding query predicates 2822.

In some embodiments, all possible secondary indexing schemes of the secondary indexing scheme option data 2531 that can be implemented in segments for use in query execution are required to receive a list of predicates to evaluate as input, and return a list of rows that pass those predicates as output, where execution of an index source IO operator includes utilizing the corresponding predicates of the of index source IO operator to evaluate return a list of rows that pass those predicates as output. These row lists can be filtered and/or merged together in the IO pipeline as different indexes are used for the same query via different IO operators. Once the final row list is calculated, columns that are required for the query, but do not yet have values generated by the pipeline, can be read off disk.

In some embodiments Variable length columns are stored as variable-length quantity (VLQ) prefixed regions in row order. For example, VLQs and row data can span across 4 Kilo-byte blocks. Seeking to a given row number can include starting at the first row and cursing through all of the data. Information on a per-LCK basis that enables seeking to the first byte in a variable length column for that key can be stored and utilized. However, in segments with high clustering this can be a large portion of the column span. In order to enable efficient row value lookups by row number for variable length columns, a row offset lookup structure for variable length columns can be included. These can be similar to the fixed length lookup structures used in decompression, but with extra variable-length specific information.

For example, a skip list can be built for every column. For variable length columns, the skip list can encode an extra byte offset of first row, and can be in accordance with a different structure than that of fixed length columns, a new skip list structure can be required. Performing IO can include loading skip lists for variable length columns in the query into memory. Given a row number, the first entry that has a larger first row number can be identified. The previous entry in the skip list can be accessed, and one or more blocks that contain the value can be read. In some cases, the subsequent block must always be read based on the end location of the row being unknown. In some cases, every variable length column read can include reads to two 4 Kilo-byte blocks. In some cases, each 4 Kilo-byte data block of segment row data 2505 can be generated to include block delta encoded row offsets and/or a byte offset of first row.

In some embodiments, For queries that use secondary indexes and require cluster key column emission but don't actually require to search the cluster key index, look up of cluster key values by row number can be implemented via the addition of row numbers in the primary cluster key index. This can include adding row ranges to index partition information in index headers and/or Adding row offset in the index. When IO is performed, the index partition a row falls into can be determined, a binary search for a cluster key that contains can be performed, and/or the cluster key can be emitted.

In this example, this example IO pipeline 2835 for this set of example query predicates 2822 can be generated for a first given segment based on colC having a cluster key (CK) index for the first given segment; based on colA having a bitmap index for the first given segment; and/or based on colB having a data-backed index for the first given segment. For example, these index types for colA and colB are secondary index types that were selected via the secondary indexing scheme selection module 2530 when the segment was generated and/or evaluated for re-indexing as discussed previously. The respective secondary index data 2545 for colA and colB of this first given segment was generated by the secondary index generator module accordingly to include a bitmap index for colA and a data-backed index for colB. When this IO pipeline 2835 for the first segment is executed, the secondary index data 2545 the bitmap index for colA and a data-backed index for colB of the secondary index data 2545 is accessed to perform their respective IO operators 2821.

While not illustrated, consider a second segment upon which this same query is performed. A different IO pipeline 2835 for this set of example query predicates 2822 can be generated for the second given segment based on the second given segment having different secondary indexing schemes for colA and colB. For example, colA has a bloom filter index and colB has not indexing. The IO operator 2821 sourcing colA in the IO pipeline 2835 for this second segment can thus be generated with an index type of a bloom filter, and/or can similarly the (colA<=3 OR colA>5) predicates. IO operator 2821 sourcing colA in the IO pipeline 2835 for this second segment can be a table data source IO operator based on colB having no secondary indexes in the second segment. A separate filtering operator 2823 can be applied serially after the table data source IO operator sourcing colB to apply the respective (colB<=10) predicate. In particular, this separate filtering operator 2823 can filter the outputted values received from the table data source IO operator for colB by selecting only the values that are less than or equal to 10.

IO operators 2821 and/or filtering operators 2823 further along the pipeline that are serially after prior IO operators 2821 and/or filtering operators 2823 in a serialized ordering of the IO pipeline can utilize output of prior IO operators 2821 and/or filtering operators 2823 as input. In particular, IO operators that receive row numbers from prior ones IO operators in the serial ordering can perform their reads by only accessing rows with the corresponding row numbers outputted by a prior IO operator.

Each pipeline element (e.g. IO operators, filter operators, and/or logical operators) of an IO pipeline can either to union or intersect its incoming row lists from prior pipeline elements in the IO pipeline. In some embodiments, an efficient semi-sparse row list representation can be utilized for fast sparse operations. In some embodiments, pipeline can be optimized to cache derived values (such as filtered row lists) to avoid re-computing them in subsequent pulls.

In this example, the IO operator 2821 sourcing colC outputs a first subset of row numbers of a plurality of row numbers of the segment based on identifying only rows with colC values greater than or equal to 1, based on utilizing the cluster key index for colC. The IO operator 2821 sourcing colA receives this first subset of the plurality of row numbers outputted by the IO operator 2821 sourcing colC, and only access rows with row numbers in the first subset. The first subset is further filtered into a second subset of the first subset by identifying rows with row numbers in the first subset with colA values that are either less than or equal to 3 of are greater than 5, based on utilizing the bitmap index for colA.

Similarly, the IO operator 2821 sourcing colB receives the first subset of the plurality of row numbers outputted by the IO operator 2821 sourcing colC, and also only access rows with row numbers in the first subset. The first subset is filtered into a third subset of the first subset by identifying rows with row numbers in the first subset with colB values that are either less than or equal to 10, based on utilizing the data-backed index for colB. The IO operator 2821 sourcing colB can be performed in parallel with the IO operator 2821 sourcing colA because neither IO operators is dependent on the other's output.

The union of the second subset and third subset are further filtered based on the filtering operators 2823 and logical operators to satisfy the required conditions of the query predicates 2822, where a final set of row numbers utilized as input to the final IO operator sourcing colD includes only the row numbers with values in colA, colB, and colC that satisfy the query predicates 2822. This final set of row numbers is thus utilized by the final IO operator sourcing colD to produce the values emitted for the corresponding segment, where this IO operator reads values of colD for only the row numbers indicated in its input set of row numbers.

In various embodiments, a query processing system includes at least one processor; and a memory that stores operational instructions. The operational instructions, when executed by the at least one processor, cause the query processing system to identify a plurality of predicates of a query for execution. A query operator flow for is generated a query by including the plurality of predicates in a plurality of IO operators of the query operator flow. Execution of the query is facilitated by, for each given segment of a set of segments stored in memory: generating an IO pipeline for each given segment based on a secondary indexing scheme of a set of secondary indexes of the each segment and based on plurality of predicates, and performing the plurality of IO operators upon each given segment by applying the IO pipeline to the each segment.

FIG. 28D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28D. In particular, a node 37 can utilize the query processing module 2435 to execute some or all of the steps of FIG. 28D, where multiple nodes 37 implement their own query processing modules 2435 to independently execute the steps of FIG. 28D, for example, to facilitate execution of a query as participants in a query execution plan 2405. Some or all of the method of FIG. 28D can be performed by the query processing system 2802, for example, by utilizing an operator execution flow generator module 2803 and/or a query execution module 2504. In particular, some or all of the method of FIG. 29B can be performed by the IO pipeline generator module 2834, the index scheme determination module 2832, and/or the IO operator execution module 2840. Some or all of the method of FIG. 28D can be performed via communication with and/or access to a segment storage system 2508, such as memory drives 2425 of one or more nodes 37. Some or all of the steps of FIG. 28D can optionally be performed by any other processing module of the database system 10. Some or all of the steps of FIG. 28D can be performed to implement some or all of the functionality of the segment processing module 2502 as described in conjunction with FIGS. 28A-28C. Some or all of the steps of FIG. 28D can be performed to implement some or all of the functionality regarding execution of a query via the plurality of nodes in the query execution plan 2405 as described in conjunction with FIGS. 24A-24E. Some or all steps of FIG. 28D can be performed by database system 10 in accordance with other embodiments of the database system 10 and/or nodes 37 discussed herein. Some or all steps of FIG. 28D can be performed in conjunction with some or all steps of FIG. 25E, FIG. 26B, and/or FIG. 27D. For example, some or all steps of FIG. 28D can be utilized to implement step 2598 of FIG. 25E and/or step 2790 of FIG. 27D.

Step 2882 includes identifying a plurality of predicates of a query for execution. Step 2884 includes generating a query operator flow for a query by including the plurality of predicates in a plurality of IO operators of the query operator flow. Step 2886 includes facilitating execution of the query to read a set of rows from a set of segments stored in memory.

Performing step 2886 can include performing steps 2888 and/or 2890 for each given segment of the set of segments. Step 2888 includes generating an IO pipeline for each given segment based on a secondary indexing scheme of a set of secondary indexes of the given segment, and based on the plurality of predicates. Step 2890 includes performing the plurality of IO operators upon the given segment by applying the IO pipeline to the given segment.

In various embodiments, the set of segments are stored in conjunction with different ones of a plurality of corresponding secondary indexing schemes. In various embodiments, a first IO pipeline is generated for a first segment of the set of segments, and a second IO pipeline is generated for a second segment of the set of segments. The first IO pipeline is different from the second IO pipeline based on the set of secondary indexes of the first segment being in accordance with a different secondary indexing scheme than the set of secondary indexes of the second segment.

In various embodiments, performing the plurality of IO operators upon at least one segment of the set of segments includes utilizing the set of secondary indexes of the at least one segment in accordance with the IO pipeline to read at least one row from the at least one segment. In various embodiments, performing the plurality of IO operators upon at least one segment of the set of segments includes filtering at least one row from inclusion in output of the plurality of IO operators based on the plurality of predicates. The set of rows is a proper subset of a plurality of rows stored in the plurality of segments based on the filtering of the at least one row. In various embodiments, the IO pipeline of at least one segment of the set of segments includes at least one source element and further includes at least one filter element, wherein the at least one filter element is based on at least some of the plurality of predicates.

In various embodiments, generating the IO pipeline for each segment includes selecting the IO pipeline from a plurality of valid IO pipeline options for each segment. In various embodiments selecting the IO pipeline from a plurality of valid IO pipeline options for each segment is based on index efficiency metrics generated for previously utilized IO pipelines of previous queries.

In various embodiments, the IO pipeline is generated for each given segment by one of the plurality of nodes that stores the given segment. Each of the plurality of IO operators are performed upon each segment by the one of the plurality of nodes that stores the given segment. A first node storing a first segment of the set of segments generates the IO pipeline for the first segment and performs the plurality of IO operators upon the first segment, and a second node storing a second segment of the set of segments generates the IO pipeline for the second segment and performs the plurality of IO operators upon the second segment.

In various embodiments, the query operator flow includes a plurality of additional operators, such as aggregation operators and/or join operators, for performance upon the set of rows read from the set of segments via performance of the plurality of IO operators. In various embodiments, the plurality of IO operators are performed by nodes at an IO level of a query execution plan, and these nodes send their output to other nodes at an inner level of the query execution plan, where these additional operators are performed by nodes at an inner level and/or root level of a query execution plan.

In various embodiments, a non-transitory computer readable storage medium includes at least one memory section that stores operational instructions that, when executed by a processing module that includes a processor and a memory, causes the processing module to: identify a plurality of predicates of a query for execution; generate a query operator flow for a query by including the plurality of predicates in a plurality of IO operators of the query operator flow; and/or facilitate execution of the query by, for each given segment of a set of segments stored in memory, generating an IO pipeline for each given segment based on a secondary indexing scheme of a set of secondary indexes of the each segment and based on plurality of predicates, and/or performing the plurality of IO operators upon each given segment by applying the IO pipeline to the each segment.

FIG. 29A illustrates an embodiment of an IO operator execution module 2840 that executes the example IO pipeline 2835 of FIG. 28C. Some or all features and/or functionality of the IO operator execution module 2840 of FIG. 29A can be utilized to implement the IO operator execution module 2840 of FIG. 28B and/or any other embodiments of the IO operator execution module 2840 discussed herein.

As discussed in conjunction with FIG. 28C, an IO pipeline 2835 for a given segment can have multiple IO operators 2821 for multiple corresponding sources. Each of these IO operators 2821 is responsible for making its own requests to the corresponding segment to access rows, for example, by applying a corresponding index and/or corresponding predicates. Each IO operator can thus generate their output as a stream of output, for example, from a stream of corresponding input row numbers outputted by one or more prior IO operators in the serialized ordering.

Each IO operator 2821 can maintain their own source queue 2855 based on the received flow of row numbers from prior sources. For example, as row numbers are received as output from a first IO operator for a first corresponding source, corresponding IO requests indicating these row numbers are appended to the source queue 2855 for a subsequent, second IO operator that is after the first IO operator in the serialized ordering. IO requests with lower row numbers are prioritized in the second IO operator's source queue 2855 are executed before IO requests higher row numbers, and/or IO requests are otherwise ordered by row number in source queues 2855 accordance with a common ordering scheme across all IO operators. In particular, to prevent pipeline stall, the source queues 2855 of all different IO operators can all be ordered in accordance with a shared ordering scheme, for example, where lowest row numbers in source queues 2855 can therefore be read first in source queues for all sources.

As each IO operator reads blocks from disk via a plurality of IO requests, they can each maintain an ordered list of completed and pending requests in their own source queue. The IO operators can serve both row lists and column views (when applicable) from that data.

The shared ordering scheme can be in accordance with an ordering of a shared IO request priority queue 2850. For example, the shared IO request priority queue 2850 is prioritized by row number, where lower row numbers are ordered before higher row numbers. This shared IO request priority queue 2850 can include all IO requests for the IO pipeline across all source queues 2855, prioritized by row number.

For example, the final IO operator 2821 sourcing colD can make requests and read values before the first IO operator 2821 sourcing colC has finished completing all requests to output row numbers of the segment based on the value of colC based on all IO operators making requests in accordance with the shared IO request priority queue 2850.

As a particular example, IO requests across the IO pipeline as a whole are made to the corresponding segment one at a time. At a given time, a lowest row number pending an IO request by one of the plurality of IO operators is read before any other pending IO requests with higher corresponding row numbers based on being most favorably ordered in the shared IO request priority queue 2850. This enables progress to be made for lower row numbers through the IO pipeline, for example, to conserve memory resources. In some embodiments, vectorized reads can be built from the priority queue when enough requests present and/or when IO is forced, for example, for final reads via a final IO operator in the serialized ordering of the pipeline.

The source queue 2855 of a given IO operator can include a plurality of pending IO and completed IO by the corresponding IO operator. For example, completed IO can persist in the corresponding IO operator's queue until the corresponding output, such as a row number or value is processed by a subsequent IO operator to generate its own output.

In general, each disk block needs to be read only once. Multiple row lists and column views can be served from a single block. The IO pipeline can support read-ahead within a pipeline and also into the next pipeline in order to maintain deep IO queues.

The priority queue ordering can be also utilized in cases of pipeline deadlock to enable progress on a current row need when more memory is needed: necessary memory blocks can be allocated by identifying the lowest priority completed IO in the priority queue. When more memory is available, IO operators can read-ahead to maintain a number of in-flight requests. During an out of memory (OOM) event, completed IO can be dropped and turned back into pending IO, which can be placed back in the request queue. In particular, in an OOM condition, read-ahead blocks may need to be discarded and re-read on the subsequent pull when resources are available. Higher row numbers can be discarded first in these cases, for example, from the tail of source queues 2855, to maintain forward progress. In some embodiments, because rows are pulled in order, column leveling is not an issue. In some embodiments, if the current completed IO for a source is dropped, the pipeline will stall until it can be re-read.

In various embodiments, a query processing system includes at least one processor and a memory that stores operational instructions. The operational instructions, when executed by the at least one processor, cause the query processing system to determine an IO pipeline that includes a serialized ordering of a plurality of IO operators for execution upon a segment in accordance with a set of query predicates. An IO request priority queue ordered by row number for a plurality of row-based IO for performance by the plurality of IO operators is maintained. Output for each of the plurality of IO operators is generated based on each of the plurality of row-based IO performing respective ones of the plurality of row-based IO in accordance with the IO request priority queue. A set of values of a proper subset of rows filtered from a plurality of rows stored in the segment are outputted, in accordance with the set of query predicates, based on the output of a last-ordered one of the plurality of IO operators in the serialized ordering.

FIG. 29B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29B. In particular, a node 37 can utilize the query processing module 2435 to execute some or all of the steps of FIG. 29B, where multiple nodes 37 implement their own query processing modules 2435 to independently execute the steps of FIG. 29B, for example, to facilitate execution of a query as participants in a query execution plan 2405. Some or all of the method of FIG. 29B can be performed by the query processing system 2802, for example, by utilizing an operator execution flow generator module 2803 and/or a query execution module 2504. In particular, some or all of the method of FIG. 29B can be performed by the IO pipeline generator module 2834, the index scheme determination module 2832, and/or the IO operator execution module 2840. Some or all of the method of FIG. 29B can be performed via communication with and/or access to a segment storage system 2508, such as memory drives 2425 of one or more nodes 37. Some or all of the steps of FIG. 29B can optionally be performed by any other processing module of the database system 10. Some or all of the steps of FIG. 29B can be performed to implement some or all of the functionality of the segment processing module 2502 as described in conjunction with FIGS. 28A-28C and/or FIG. 29B. Some or all of the steps of FIG. 29B can be performed to implement some or all of the functionality regarding execution of a query via the plurality of nodes in the query execution plan 2405 as described in conjunction with FIGS. 24A-24E. Some or all steps of FIG. 29B can be performed by database system 10 in accordance with other embodiments of the database system 10 and/or nodes 37 discussed herein. Some or all steps of FIG. 29B can be performed in conjunction with some or all steps of FIG. 25E, FIG. 26B, FIG. 27D, and/or FIG. 28D. For example, some or all steps of FIG. 29B can be utilized to implement step 2598 of FIG. 25E, step 2790 of FIG. 27D, and/or step 2890 of FIG. 28D.

Step 2982 includes determining an IO pipeline that includes a serialized ordering of a plurality of IO operators for execution upon a segment in accordance with a set of query predicates. Step 2984 includes maintaining an IO request priority queue ordered by row number for a plurality of row-based IO for performance by the plurality of IO operators. Step 2986 includes generating output for each of the plurality of IO operators based on each of the plurality of row-based IO performing respective ones of the plurality of row-based IO in accordance with the IO request priority queue. Step 2988 includes outputting a set of values of a subset of rows filtered from a plurality of rows stored in the segment, in accordance with the set of query predicates, based on the output of a last-ordered one of the plurality of IO operators in the serialized ordering.

In various embodiments, the subset of rows is a proper subset of the plurality of rows based on at least one row of the plurality of rows being filtered out by one of the plurality of IO operators due to not meeting the filtering requirements of the set of query predicates. Alternatively, the subset of rows includes all of the plurality of rows based on no rows in the plurality of rows being filtered out by any of the plurality of IO operators due to all rows in the plurality of rows meeting the filtering requirements of the set of query predicates. As another example, the subset of rows includes none of the plurality of rows based on all rows in the plurality of rows being filtered out by the plurality of IO operators due to no rows in the plurality of rows meeting the filtering requirements of the set of query predicates.

In various embodiments, subsequent ones of the plurality of IO operators in the serialized ordering generate their output by utilizing output of prior ones of the ones of the plurality of IO operators in the serialized ordering. In various embodiments, output of each of the plurality of IO operators includes a flow of data ordered by row number based on performing respective ones of the plurality of row-based IO in accordance with the IO request priority queue. In various embodiments, the flow of data outputted by each of the plurality of IO operators includes a flow of row numbers ordered by row number and/or a flow of values of at least one column of rows in the plurality of rows, ordered by row number.

In various embodiments, the segment includes a plurality of secondary indexes generated in accordance with a secondary indexing scheme. The proper subset of rows are filtered from a plurality of rows stored in the segment based on at least one of the plurality of IO operators generating its output as a filtered subset of rows read in its respective ones of the plurality of row-based IO by utilizing the plurality of secondary indexes.

In various embodiments, the plurality of secondary indexes includes a first set of indexes for a first column of the plurality of rows stored in the segment in accordance with a first type of secondary index, and the plurality of secondary indexes includes a second set of indexes for a second column of the plurality of rows stored in the segment in accordance with a second type of secondary index. A first one of the plurality of IO operators generates its output in accordance with a first predicate of the set of predicates corresponding to the first column by utilizing the first set of indexes, and a second one of the plurality of IO operators generates its output in accordance with a second predicate of the set of predicates corresponding to the second column by utilizing the second set of indexes.

In various embodiments, the IO pipeline further includes at least one filtering operator, and the proper subset of rows of the plurality of rows stored is further filtered in by the at least one filtering operator. In various embodiments, the at least one filtering operator is in accordance with one of the set of predicates corresponding to one column of the plurality of rows based on the segment not including any secondary indexes corresponding to the one column.

In various embodiments, generating output for each of the plurality of operator includes, via a first one of the plurality of IO operators, generating first output that includes a first set of row numbers as a proper subset of a plurality of row numbers of the segment via by performing a first set of row-based IO of the plurality of row-based IO in accordance with the IO request priority queue. Generating output for each of the plurality of operators can further include, via a second one of the plurality of IO operators that is serially ordered after the first one of the plurality of IO operators in the serialized ordering, generating second output that includes a second set of row numbers as a proper subset of the first set of row numbers by performing a second set of row-based IO of the plurality of row-based IO for only row numbers included in the first set of row numbers, in accordance with the IO request priority queue.

In various embodiments, wherein the first set of row-based IO includes reads to a first column of the plurality of rows, and the second set of row-based IO includes reads to a second column of the plurality of rows. The first set of row numbers are filtered from the plurality of row numbers by the first one of the plurality of IO operators based on applying a first one of the set of predicates to values of the first column. The second set of row numbers are filtered from first set of row numbers by the second one of the plurality of IO operators based on applying a second one of the set of predicates to values of the second column.

In various embodiments, the serialized ordering of the plurality of IO operators includes a parallelized set of IO operators that is serially after the first one of the plurality of IO operators. The parallelized set of IO operators includes the second one of the plurality of IO operators and further includes a third IO operator of the plurality of IO operators. Generating output for each of the plurality of operators can further include, via the third one of the plurality of IO operators, generating third output that includes a third set of row numbers as a second proper subset of the first set of row number of the segment by performing a second set of row-based IO of the plurality of row-based IO for only row numbers included in the first set of row numbers, in accordance with the IO request priority queue.

In various embodiments, the method further includes generating fourth output via a fourth one of the plurality of IO operators that is serially after the parallelized set of IO operators that corresponds to a proper subset of rows included in a union of outputs of the parallelized set of IO operators.

In various embodiments, respective ones of the plurality of row-based IO are maintained in a queue by the each of the plurality of IO operators in accordance the ordering of the IO request priority queue. In various embodiments, the queue maintained by the each given IO operator of the plurality of IO operators includes a set of IO competed by the given IO operator and further includes a set of IO pending completion by the given IO operator.

In various embodiments, the method includes detecting an out-of-memory condition has been met, and/or removing a subset of the plurality of row-based IO from the queues maintained by the each of the plurality of IO operators by selecting ones of the plurality of row-based IO that are least favorably ordered in the IO request priority queue. In various embodiments, at least one of the plurality of row-based IO removed from a queue maintained by one of the plurality of IO operators was already completed by the one of the one of the plurality of IO operators. The at least one of the plurality of row-based IO is added to the queue maintained by one of the plurality of IO operators as pending completion based on being removed from the queue in response to detecting that memory is again available. The one of the plurality of IO operators re-performs the at least one of the plurality of row-based IO based on being indicated in the queue as pending completion.

In various embodiments, a non-transitory computer readable storage medium includes at least one memory section that stores operational instructions that, when executed by a processing module that includes a processor and a memory, causes the processing module to: determine an IO pipeline that includes a serialized ordering of a plurality of IO operators for execution upon a segment in accordance with a set of query predicates; maintain an IO request priority queue ordered by row number for a plurality of row-based IO for performance by the plurality of IO operators; generate output for each of the plurality of IO operators based on each of the plurality of row-based IO performing respective ones of the plurality of row-based IO in accordance with the IO request priority queue; and/or output a set of values of a proper subset of rows filtered from a plurality of rows stored in the segment, in accordance with the set of query predicates, based on the output of a last-ordered one of the plurality of IO operators in the serialized ordering.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to"

indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processor of a database system, comprising:
    receiving user-generated secondary indexing hint data for a dataset from a client device, wherein the client device generated the user-generated secondary indexing hint data based on user input in response to at least one prompt displayed by an interactive interface displayed via a display device of the client device;
    generating a plurality of segments, wherein each segment of the plurality of segments includes a corresponding distinct subset of a set of rows of the dataset, wherein the corresponding distinct subset of the each segment includes, for each row of a corresponding plurality of rows included in the corresponding distinct subset, a plurality of column values corresponding to all of a plurality of columns of the dataset, and wherein the plurality of columns of the dataset includes at least a first given column, a second given column, and a third given column;
    automatically selecting, for each of the plurality of segments, a secondary indexing scheme from a plurality of secondary indexing options based on the user-generated secondary indexing hint data, wherein a first secondary indexing scheme is selected for a first segment of the plurality of segments indicating a first non-null subset of the plurality of columns selected for indexing, wherein the first non-null subset of the plurality of columns selected for indexing includes at least the first given column and the second given column, wherein the first non-null subset of the plurality of columns selected for indexing excludes at least the third given column, wherein a second secondary indexing scheme is selected for a second segment of the plurality of segments indicating a second non-null subset of the plurality of columns selected for indexing, wherein the second non-null subset of the plurality of columns selected for indexing includes at least the first given column and the third given column, and wherein the second non-null subset of the plurality of columns selected for indexing excludes at least the second given column;
    generating a set of pluralities of secondary indexes based on generating, for the each segment of the plurality of segments, a corresponding plurality of secondary indexes from the corresponding plurality of rows of the each segment in accordance with the secondary indexing scheme, wherein a first corresponding plurality of secondary indexes generated for the first segment of the plurality of segments includes a first corresponding secondary index for the first given column and another first corresponding secondary index for the second given column based on applying the first secondary indexing scheme, wherein the first corresponding plurality of secondary indexes generated for the first segment of the plurality of segments excludes a corresponding index for the third given column based on applying the first secondary indexing scheme, wherein a second corresponding plurality of secondary indexes generated for the second segment of the plurality of segments includes a second corresponding secondary index for the first given column and another second corresponding secondary index for the third given column based on applying the second secondary indexing scheme, and wherein the second corresponding plurality of secondary indexes generated for the second segment of the plurality of segments excludes a second corresponding index for the second given column based on applying the second secondary indexing scheme; and
    storing the plurality of segments and the set of pluralities of secondary indexes in memory.

2. The method of claim 1, wherein the user-generated secondary indexing hint data indicates query predicate trend data for future queries to be performed by at least one user against the dataset.

3. The method of claim 2, wherein the query predicate trend data indicates at least one of:
an ordered list of columns commonly queried together; or
a relative likelihood for a column to appear in a predicate.

4. The method of claim 1, wherein the user-generated secondary indexing hint data indicates estimated distribution data for a future plurality of rows of the dataset to be received by the database system for storage, and wherein the estimated distribution data indicates at least one of:
an estimated column cardinality of the future plurality of rows of the dataset; or
an estimated column distribution of the future plurality of rows of the dataset.

5. The method of claim 1, wherein the first non-null subset of the plurality of columns includes a first number of columns, wherein the first corresponding plurality of secondary indexes generated for the first segment corresponds to indexes for exactly the first number of columns based on applying the first secondary indexing scheme, wherein the second non-null subset of the plurality of columns includes a second number of columns, wherein the second corresponding plurality of secondary indexes generated for the second segment corresponds to indexes for exactly the second number of columns based on applying the second secondary indexing scheme, and wherein the first number of columns is one of: greater than the second number of columns, or less than the second number of columns.

6. The method of claim 1, further comprising:
automatically generating system-generated secondary indexing hint data for the dataset;
wherein automatically selecting the secondary indexing scheme is based on applying a heuristic function to the user-generated secondary indexing hint data and the system-generated secondary indexing hint data, and wherein the system-generated secondary indexing hint data indicates at least one of:
current column cardinality;
current column distribution; or
columns commonly queried together.

7. The method of claim 6, wherein the system-generated secondary indexing hint data is generated based on at least one of: accessing a log of previous queries performed upon the dataset, or generating statistical data for current column values of one or more columns of currently-stored rows of the dataset.

8. The method of claim 1, wherein the first secondary indexing scheme selected for the first segment indicates the first given column be indexed via a first index type, wherein the second secondary indexing scheme selected for the second segment indicates the first given column be indexed via a second index type that is different from the first index type, wherein the first corresponding secondary index for the first given column generated for the first segment is structured in accordance with the first index type based on applying the first secondary indexing scheme, and wherein the second corresponding secondary index for the first given column generated for the second segment is structured in accordance with the second index type based on applying the second secondary indexing scheme.

9. The method of claim 6, wherein the heuristic function is further applied to local distribution data generated for each segment.

10. The method of claim 1, further comprising:
removing at least some of the user-generated secondary indexing hint data based on system-generated secondary indexing hint data contradicting the user-generated secondary indexing hint data.

11. The method of claim 1, wherein the user-generated secondary indexing hint data excludes selection of a secondary indexing scheme to be applied to the plurality of segments.

12. The method of claim 1, further comprising:
receiving updated user-provided secondary indexing hint data from the client device;
wherein the secondary indexing scheme utilized for a more recently generated one of the plurality of segments is different from the secondary indexing scheme utilized for a less recently generated one of the plurality of segments based on receiving the updated user-provided secondary indexing hint data after generating a first one of the plurality of segments and before generating a second of the plurality of segments.

13. A segment indexing module comprises:
at least one processor; and
a memory that stores operational instructions that, when executed by the at least one processor, cause the segment indexing module to perform operations that include:
receiving user-generated secondary indexing hint data for a dataset from a client device, wherein the client device generated the user-generated secondary indexing hint data based on user input in response to at least one prompt displayed by an interactive interface displayed via a display device of the client device;
generate a plurality of segments, wherein each segment of the plurality of segments includes a corresponding distinct subset of a set of rows of the dataset, wherein the corresponding distinct subset of the each segment includes, for each row of a corresponding plurality of rows included in the corresponding distinct subset, a plurality of column values corresponding to all of a plurality of columns of the dataset, and wherein the plurality of columns of the dataset includes at least a first given column, a second given column, and a third given column;
automatically select, for each of the plurality of segments, a secondary indexing scheme from a plurality of secondary indexing options based on the user-generated secondary indexing hint data, wherein a first secondary indexing scheme is selected for a first segment of the plurality of segments indicating a first non-null subset of the plurality of columns selected for indexing, wherein the first non-null subset of the plurality of columns selected for indexing includes at least the first given column and the second given column, wherein the first non-null subset of the plurality of columns selected for indexing excludes at least the third given column, wherein a second secondary indexing scheme is selected for a second segment of the plurality of segments indicating a second non-null subset of the plurality of columns selected for indexing, wherein the second non-null subset of the plurality of columns selected for indexing includes at least the first given column and the third given column, and wherein the second non-null subset of the plurality of columns selected for indexing excludes at least the second given column;
generate a set of pluralities of secondary indexes based on generating, for the each segment of the plurality of segments, a corresponding plurality of secondary indexes from the corresponding plurality of rows of the each segment in accordance with the secondary indexing scheme, wherein a first corresponding plurality of secondary indexes generated for the first segment of the plurality of segments includes a first corresponding secondary index for the first given column and another first corresponding secondary index for the second given column based on applying the first secondary indexing scheme, wherein the first corresponding plurality of secondary indexes generated for the first segment of the plurality of segments excludes a corresponding index for the third given column based on applying the first secondary indexing scheme, wherein a second corresponding plurality of secondary indexes generated for the second segment of the plurality of segments includes a second corresponding secondary index for the first given column and another second corresponding secondary index for the third given column based on applying the second secondary indexing scheme, and wherein the second corresponding plurality of secondary indexes generated for the second segment of the plurality of segments excludes a second corresponding index for the second given column based on applying the second secondary indexing scheme; and store the plurality of segments and the set of pluralities of secondary indexes in memory.

14. The segment indexing module of claim 13, wherein the user-generated secondary indexing hint data indicates estimated distribution data for a future plurality of rows of the dataset to be received for storage.

15. The segment indexing module of claim 14, wherein the estimated distribution data indicates at least one of:
an estimated column cardinality of the future plurality of rows of the dataset; or
an estimated column distribution of the future plurality of rows of the dataset.

16. The segment indexing module of claim 13, wherein the operations further include:
automatically generating system-generated secondary indexing hint data for the dataset;
wherein automatically selecting the secondary indexing scheme is based on applying a heuristic function to the user-generated secondary indexing hint data and the system-generated secondary indexing hint data.

17. The segment indexing module of claim 16, wherein the system-generated secondary indexing hint data is generated based on at least one of: accessing a log of previous queries performed upon the dataset, or generating statistical data for current column values of one or more columns of currently-stored rows of the dataset.

18. The segment indexing module of claim 16, wherein the system-generated secondary indexing hint data indicates at least one of:
current column cardinality;
current column distribution; or
columns commonly queried together.

19. The segment indexing module of claim 16, wherein the heuristic function is further applied to local distribution data generated for each segment.

20. A non-transitory computer readable storage medium comprises:

at least one memory section that stores operational instructions that, when executed by a processing module that includes a processor and a memory, causes the processing module to:
receive a user-generated secondary indexing hint data for a dataset from a client device, wherein the client device generated the user-generated secondary indexing hint data based on user input in response to at least one prompt displayed by an interactive interface displayed via a display device of the client device;
generate a plurality of segments, wherein each segment of the plurality of segments includes a corresponding distinct subset of a set of rows of the dataset, wherein the corresponding distinct subset of the each segment includes, for each row of a corresponding plurality of rows included in the corresponding distinct subset, a plurality of column values corresponding to all of a plurality of columns of the dataset, and wherein the plurality of columns of the dataset includes at least a first given column, a second given column, and a third given column;
automatically select, for each of the plurality of segments, a secondary indexing scheme from a plurality of secondary indexing options based on the user-generated secondary indexing hint data, wherein a first secondary indexing scheme is selected for a first segment of the plurality of segments indicating a first non-null subset of the plurality of columns selected for indexing, wherein the first non-null subset of the plurality of columns selected for indexing includes at least the first given column and the second given column, wherein the first non-null subset of the plurality of columns selected for indexing excludes at least the third given column, wherein a second secondary indexing scheme is selected for a second segment of the plurality of segments indicating a second non-null subset of the plurality of columns selected for indexing, wherein the second non-null subset of the plurality of columns selected for indexing includes at least the first given column and the third given column, and wherein the second non-null subset of the plurality of columns selected for indexing excludes at least the second given column;
generate a set of pluralities of secondary indexes based on generating, for the each segment of the plurality of segments, a corresponding plurality of secondary indexes from the corresponding plurality of rows of the each segment in accordance with the secondary indexing scheme, wherein a first corresponding plurality of secondary indexes generated for the first segment of the plurality of segments includes a first corresponding secondary index for the first given column and another first corresponding secondary index for the second given column based on applying the first secondary indexing scheme, wherein the first corresponding plurality of secondary indexes generated for the first segment of the plurality of segments excludes a corresponding index for the third given column based on applying the first secondary indexing scheme, wherein a second corresponding plurality of secondary indexes generated for the second segment of the plurality of segments includes a second corresponding secondary index for the first given column and another second corresponding secondary index for the third given column based on applying the second secondary indexing scheme, and wherein the second corresponding plurality of secondary indexes generated for the second segment of the plurality of segments excludes a second corresponding index for the second given column based on applying the second secondary indexing scheme; and store the plurality of segments and the set of pluralities of secondary indexes in memory.

* * * * *